United States Patent
Huang et al.

(10) Patent No.: US 12,035,307 B2
(45) Date of Patent: Jul. 9, 2024

(54) MULTIPLEXING MULTI-BIT FEEDBACK AND SINGLE-BIT FEEDBACK ON AN UPLINK SHARED CHANNEL

(71) Applicant: QUALCOMM Incorporated, San Diego, CA (US)

(72) Inventors: Yi Huang, San Diego, CA (US); Peter Gaal, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/394,736

(22) Filed: Aug. 5, 2021

(65) Prior Publication Data
US 2023/0041715 A1 Feb. 9, 2023

(51) Int. Cl.
*H04W 72/1268* (2023.01)
*H04W 72/23* (2023.01)
(Continued)

(52) U.S. Cl.
CPC ....... *H04W 72/1268* (2013.01); *H04W 72/23* (2023.01); *H04B 7/0417* (2013.01); *H04B 7/0619* (2013.01)

(58) Field of Classification Search
CPC .............. H04W 72/1268; H04W 72/23; H04B 7/0417; H04B 7/0619; H04L 1/1614; H04L 1/1621; H04L 1/1896
See application file for complete search history.

(56) References Cited

U.S. PATENT DOCUMENTS

| 10,574,309 B2 * | 2/2020 | Akkarakaran ........ H04L 1/1671 |
| 2017/0273056 A1 * | 9/2017 | Papasakellariou .. H04W 52/281 |

(Continued)

FOREIGN PATENT DOCUMENTS

| CN | 112821990 A | * | 5/2021 |
| EP | 3657713 A1 | | 5/2020 |

(Continued)

OTHER PUBLICATIONS

International Search Report and Written Opinion—PCT/US2022/037183—ISA/EPO—dated Oct. 19, 2022.

*Primary Examiner* — Shah M Rahman
(74) *Attorney, Agent, or Firm* — Holland & Hart LLP

(57) ABSTRACT

Methods, systems, and devices for wireless communication are described. Some wireless communications systems may support configurations for grouping feedback information within a codebook. A user equipment (UE) may support one or more types of feedback. In some cases, the UE may generate subsets of feedback information within the codebook based on each type of feedback, which may increase overhead. To reduce overhead, the UE may receive signaling that indicates a configuration for grouping feedback information within a codebook. The UE may receive downlink messages that may be associated with a same set of uplink resources for transmitting a feedback message. The UE may generate a codebook to include one or more groups of feedback information in accordance with the configuration and based on the downlink messages. The UE may transmit the feedback message based on the codebook and via the set of uplink resources.

50 Claims, 20 Drawing Sheets

(51) Int. Cl.
*H04B 7/0417* (2017.01)
*H04B 7/06* (2006.01)

(56) References Cited

U.S. PATENT DOCUMENTS

| | | | |
|---|---|---|---|
| 2018/0019843 A1* | 1/2018 | Papasakellariou | H04L 1/1861 |
| 2018/0242286 A1* | 8/2018 | Song | H04L 1/0072 |
| 2019/0021088 A1* | 1/2019 | Zhang | H04L 1/1864 |
| 2019/0045489 A1* | 2/2019 | He | H04W 72/23 |
| 2019/0305894 A1* | 10/2019 | Hosseini | H04W 72/23 |
| 2019/0356455 A1* | 11/2019 | Yang | H04L 5/0055 |
| 2020/0052825 A1* | 2/2020 | Sarkis | H04W 72/121 |
| 2020/0059327 A1 | 2/2020 | Kini et al. | |
| 2020/0220666 A1* | 7/2020 | Xue | H04L 1/0061 |
| 2020/0228174 A1* | 7/2020 | Nam | H04L 5/005 |
| 2020/0229179 A1* | 7/2020 | Fan | H04W 72/21 |
| 2020/0313807 A1* | 10/2020 | Salem | H04L 1/1607 |
| 2020/0322097 A1* | 10/2020 | Hsieh | H04L 1/1896 |
| 2020/0322947 A1* | 10/2020 | Baldemair | H04W 72/20 |
| 2021/0021383 A1* | 1/2021 | Chen | H04W 72/23 |
| 2021/0050961 A1* | 2/2021 | Chen Larsson | H04L 1/1861 |
| 2021/0234643 A1* | 7/2021 | Wang | H04L 1/1887 |
| 2022/0039029 A1* | 2/2022 | Zhang | H04W 72/21 |
| 2022/0053532 A1* | 2/2022 | Baldemair | H04L 1/1854 |
| 2022/0116153 A1* | 4/2022 | Hosseini | H04L 5/0053 |
| 2022/0278809 A1* | 9/2022 | Papasakellariou | H04L 1/1861 |
| 2022/0377813 A1* | 11/2022 | Wang | H04W 72/0453 |
| 2023/0043337 A1 | 2/2023 | Huang et al. | |
| 2023/0074723 A1* | 3/2023 | Alfarhan | H04L 1/1685 |
| 2023/0087280 A1* | 3/2023 | Zhang | H04L 1/1864 370/329 |
| 2023/0156701 A1* | 5/2023 | Lei | H04L 1/1861 370/329 |

FOREIGN PATENT DOCUMENTS

| | | |
|---|---|---|
| WO | WO-2018204491 A1 | 11/2018 |
| WO | WO-2019099383 A1 | 5/2019 |
| WO | WO-2019226458 | 11/2019 |

\* cited by examiner

MULTIPLEXING MULTI-BIT FEEDBACK AND SINGLE-BIT FEEDBACK ON AN UPLINK SHARED CHANNEL

FIELD OF TECHNOLOGY

The following relates to wireless communication, including multiplexing multi-bit feedback and single-bit feedback on an uplink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may transmit a feedback message in response to a downlink message. The feedback message may include a single bit of feedback per transport block (TB) or per code block group (CBG) in the downlink message (e.g., which may be referred to as single-bit feedback). Alternatively, the feedback message may include multiple bits per TB or CBG (e.g., which may be referred to as multi-bit feedback or other terminology). In some cases, feedback for multiple downlink messages may be transmitted via a same uplink resource, and the UE may generate a codebook corresponding to the multiple downlink messages. Existing techniques, however, may not support a codebook structure for multiplexing multi-bit feedback with single-bit feedback into a single feedback message.

SUMMARY

The described techniques relate to improved methods, systems, devices, and apparatuses that support multiplexing multi-bit feedback and single-bit feedback on an uplink shared channel. Generally, the described techniques provide for a user equipment (UE) to group feedback information within a codebook to reduce overhead and UE complexity. A UE may receive one or more downlink messages and generate a codebook for reporting feedback pertaining to each of the downlink messages. The codebook may include two subcodebooks, and each subcodebook may include up to two subsubcodebooks. The subcodebooks and subsubcodebooks may each include subsets of the total feedback information included in the respective codebook. The subsets of feedback information may be grouped into the subcodebooks and subsubcodebooks based on one or more parameters associated with the feedback information, such as a type of the feedback information. If the UE supports both single-bit feedback and multi-bit feedback in a same feedback message, a number of subsubcodebooks supported by the UE for the feedback message may be relatively large (e.g., up to eight subsubcodebooks), which may add complexity to the feedback process at the UE.

To reduce overhead and complexity associated with generating relatively large quantities of feedback information, the UE may receive signaling that indicates a configuration for grouping feedback information (e.g., subcodebooks, subsubcodebooks) within the codebook. The UE may receive a first downlink message associated with a first quantity of bits and a second downlink message associated with a second quantity of bits. The first and second downlink messages may be associated with a same set of uplink resources for transmitting a feedback message (e.g., via a physical uplink control channel (PUCCH)), via a physical uplink shared channel (PUSCH)). The UE may generate a codebook based on decoding the first and second downlink messages. The codebook may include one or more groups of feedback information in accordance with the configuration. The one or more groups may be based on the first quantity of feedback bits and the second quantity of feedback bits. The UE may transmit a feedback message based on the codebook and via the set of uplink resources. The UE may thereby utilize the configuration to group feedback information within the codebook, which may reduce overhead and UE complexity.

A method for wireless communication at a user equipment (UE) is described. The method may include receiving signaling that indicates a configuration for grouping feedback information within a codebook, the codebook for reporting feedback pertaining to a set of multiple downlink messages received by the UE, receiving a first downlink message associated with a first quantity of feedback bits and a second downlink message associated with a second quantity of feedback bits, where the first downlink message and the second downlink message are associated with a same set of uplink resources for transmitting a feedback message, generating the codebook based on decoding the first downlink message and the second downlink message, the codebook including one or more groups of feedback information in accordance with the configuration, where the one or more groups are based on the first quantity of feedback bits and the second quantity of feedback bits, and transmitting the feedback message based on the codebook via the set of uplink resources.

An apparatus for wireless communication at a UE is described. The apparatus may include a processor, memory coupled with the processor, and instructions stored in the memory. The instructions may be executable by the processor to cause the apparatus to receive signaling that indicates a configuration for grouping feedback information within a codebook, the codebook for reporting feedback pertaining to a set of multiple downlink messages received by the UE, receive a first downlink message associated with a first quantity of feedback bits and a second downlink message associated with a second quantity of feedback bits, where the first downlink message and the second downlink message are associated with a same set of uplink resources for transmitting a feedback message, generate the codebook based on decoding the first downlink message and the second downlink message, the codebook including one or more groups of feedback information in accordance with the configuration, where the one or more groups are based on the first quantity of feedback bits and the second quantity of feedback bits, and transmit the feedback message based on the codebook via the set of uplink resources.

Another apparatus for wireless communication at a UE is described. The apparatus may include means for receiving signaling that indicates a configuration for grouping feedback information within a codebook, the codebook for reporting feedback pertaining to a set of multiple downlink messages received by the UE, means for receiving a first downlink message associated with a first quantity of feedback bits and a second downlink message associated with a second quantity of feedback bits, where the first downlink message and the second downlink message are associated with a same set of uplink resources for transmitting a feedback message, means for generating the codebook based on decoding the first downlink message and the second downlink message, the codebook including one or more groups of feedback information in accordance with the configuration, where the one or more groups are based on the first quantity of feedback bits and the second quantity of feedback bits, and means for transmitting the feedback message based on the codebook via the set of uplink resources.

A non-transitory computer-readable medium storing code for wireless communication at a UE is described. The code may include instructions executable by a processor to receive signaling that indicates a configuration for grouping feedback information within a codebook, the codebook for reporting feedback pertaining to a set of multiple downlink messages received by the UE, receive a first downlink message associated with a first quantity of feedback bits and a second downlink message associated with a second quantity of feedback bits, where the first downlink message and the second downlink message are associated with a same set of uplink resources for transmitting a feedback message, generate the codebook based on decoding the first downlink message and the second downlink message, the codebook including one or more groups of feedback information in accordance with the configuration, where the one or more groups are based on the first quantity of feedback bits and the second quantity of feedback bits, and transmit the feedback message based on the codebook via the set of uplink resources.

Some examples of the method, apparatuses, and non-transitory computer-readable medium described herein may further include operations, features, means, or instructions for identifying, from the configuration, a range of feedback bits associated with a first group of the one or more groups, the first group including two or more subsubcodebooks, where generating the codebook includes generating the codebook supporting inclusion of the two or more subsubcodebooks in the first group in accordance with the configuration, where each subsubcodebook of the two or more subsubcodebooks includes a respective quantity of feedback bits that may be within the range of feedback bits.

In some examples of the method, apparatuses, and non-transitory computer-readable medium described herein, generating the codebook may include operations, features, means, or instructions for generating the codebook including at least a first subcodebook and a second subcodebook, where the first subcodebook includes a first group of sub-subcodebooks that each include feedback information for one or more downlink messages having the first quantity of feedback bits, and where the second subcodebook includes a second group of subsubcodebooks that each include feedback information for one or more other downlink messages having the second quantity of feedback bits.

In some examples of the method, apparatuses, and non-transitory computer-readable medium described herein, the first subcodebook, the second subcodebook, or both correspond to multi-bit feedback information, single-bit feedback information, transport block (TB)-based feedback information, code block group (CBG)-based feedback information, or a combination thereof.

In some examples of the method, apparatuses, and non-transitory computer-readable medium described herein, generating the codebook may include operations, features, means, or instructions for generating the codebook including at least a first subcodebook and a second subcodebook, where the first subcodebook supports inclusion of a first group of feedback information for one or more downlink messages each having respective first quantities of feedback bits within a first range of feedback bits, and where the second subcodebook supports inclusion of a second group of feedback information for one or more other downlink messages each having respective second quantities of feedback bits within a second range of feedback bits.

In some examples of the method, apparatuses, and non-transitory computer-readable medium described herein, the first quantity of feedback bits may be within the first range of feedback bits associated with the first subcodebook, and the second quantity of feedback bits may be within the second range of feedback bits associated with the second subcodebook, the first subcodebook including feedback for the first downlink message and the second subcodebook including feedback for the second downlink message.

In some examples of the method, apparatuses, and non-transitory computer-readable medium described herein, the configuration indicates the first range of feedback bits and the second range of feedback bits.

In some examples of the method, apparatuses, and non-transitory computer-readable medium described herein, the first subcodebook, the second subcodebook, or both correspond to multi-bit feedback information, single-bit feedback information, TB-based feedback information, CBG-based feedback information, or a combination thereof.

Some examples of the method, apparatuses, and non-transitory computer-readable medium described herein may further include operations, features, means, or instructions for receiving one or more control messages scheduling the first downlink message and the second downlink message, where each control message of the one or more control messages includes a pair of downlink assignment indices (DAIs) for each group of the one or more groups of feedback information.

Some examples of the method, apparatuses, and non-transitory computer-readable medium described herein may further include operations, features, means, or instructions for receiving a control message scheduling the set of uplink resources, the control message including a set of multiple DAIs, where each DAI of the set of multiple DAIs indicates a quantity of bits for respective subsubcodebooks of the codebook.

Some examples of the method, apparatuses, and non-transitory computer-readable medium described herein may further include operations, features, means, or instructions for receiving a control message scheduling the set of uplink resources, the control message including a DAI that indicates a total quantity of feedback bits for a set of multiple subsubcodebooks of the codebook, where generating the codebook includes generating the codebook supporting inclusion of the total quantity of feedback bits in accordance with the DAI, where the total quantity of feedback bits includes at least the first quantity of feedback bits for the first downlink message concatenated with the second quantity of feedback bits for the second downlink message.

Some examples of the method, apparatuses, and non-transitory computer-readable medium described herein may further include operations, features, means, or instructions for performing an operation based on a value of the DAI, a result of the operation corresponding to the total quantity of feedback bits of the codebook.

Some examples of the method, apparatuses, and non-transitory computer-readable medium described herein may further include operations, features, means, or instructions for appending one or more bits to the codebook based on the value of the DAI and the operation.

Some examples of the method, apparatuses, and non-transitory computer-readable medium described herein may further include operations, features, means, or instructions for receiving a control message scheduling the set of uplink resources, the control message including a first DAI and a second DAI, where the first DAI indicates a third quantity of feedback bits corresponding to a first group of the one or more groups, and where the second DAI indicates a fourth quantity of feedback bits corresponding to a second group of the one or more groups, where generating the codebook includes generating the codebook supporting inclusion of the first group and the second group based on the third quantity of feedback bits and the fourth quantity of feedback bits, where the first group includes at least the first quantity of feedback bits for the first downlink message and the second quantity of feedback bits for the second downlink message.

In some examples of the method, apparatuses, and non-transitory computer-readable medium described herein, the configuration indicates that the first group includes a first subset of subcodebooks of a set of multiple subcodebooks of the codebook and that the second group includes a second subset of subcodebooks of the set of multiple subcodebooks.

In some examples of the method, apparatuses, and non-transitory computer-readable medium described herein, estimating, based on decoding one or more downlink messages including at least the first downlink message, a first number of missing bits for a first subcodebook of the first group and a second number of missing bits for a second subcodebook of the first group, where the first subcodebook and the second subcodebook may be each associated with respective feedback bit quantities.

Some examples of the method, apparatuses, and non-transitory computer-readable medium described herein may further include operations, features, means, or instructions for appending one or more bits to the first subcodebook, or the second subcodebook, or both.

In some examples of the method, apparatuses, and non-transitory computer-readable medium described herein, receiving the signaling may include operations, features, means, or instructions for receiving the signaling via radio resource control (RRC) signaling, or downlink control information (DCI), or a medium access control-control element (MAC-CE), or any combination thereof.

In some examples of the method, apparatuses, and non-transitory computer-readable medium described herein, generating the codebook may include operations, features, means, or instructions for generating a first subcodebook including feedback for the first downlink message and a second subcodebook including feedback for the second downlink message. Some examples of the method, apparatuses, and non-transitory computer-readable medium described herein may include operations, features, means, or instructions for determining that a first PUCCH resource for the first subcodebook at least partially overlaps with a second PUCCH resource for the second subcodebook, and multiplexing the first subcodebook and the second subcodebook on the set of uplink resources based on the determination, the set of uplink resources associated with a PUCCH.

In some examples of the method, apparatuses, and non-transitory computer-readable medium described herein, generating the codebook may include operations, features, means, or instructions for generating a first subcodebook including feedback for the first downlink message and a second subcodebook including feedback for the second downlink message. Some examples of the method, apparatuses, and non-transitory computer-readable medium described herein may include operations, features, means, or instructions for determining that a first PUCCH resource for the first subcodebook at least partially overlaps with a second PUCCH resource for the second subcodebook, multiplexing the first subcodebook and the second subcodebook on a third PUCCH resource based on the determination, and transmitting the codebook including the first subcodebook and the second subcodebook via the set of uplink resources based on the multiplexing, the set of uplink resources including PUSCH resources that may be at least partially overlapping with the third PUCCH resource.

In some examples of the method, apparatuses, and non-transitory computer-readable medium described herein, the codebook supports inclusion of single-bit feedback information corresponding to the first downlink message multiplexed with multi-bit feedback information corresponding to the second downlink message, and the first quantity of feedback bits includes the single-bit feedback information and the second quantity of feedback bits includes the multi-bit feedback information.

A method for wireless communication at a base station is described. The method may include transmitting, to a UE, signaling that indicates a configuration for grouping feedback information within a codebook, the codebook for reporting feedback pertaining to a set of multiple downlink messages, transmitting a first downlink message associated with a first quantity of feedback bits and a second downlink message associated with a second quantity of feedback bits, where the first downlink message and the second downlink message are associated with a same set of uplink resources for receiving a feedback message, and receiving, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

An apparatus for wireless communication at a base station is described. The apparatus may include a processor, memory coupled with the processor, and instructions stored in the memory. The instructions may be executable by the processor to cause the apparatus to transmit, to a UE, signaling that indicates a configuration for grouping feedback information within a codebook, the codebook for reporting feedback pertaining to a set of multiple downlink messages, transmit a first downlink message associated with a first quantity of feedback bits and a second downlink message associated with a second quantity of feedback bits, where the first downlink message and the second downlink message are associated with a same set of uplink resources for receiving a feedback message, and receive, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

Another apparatus for wireless communication at a base station is described. The apparatus may include means for transmitting, to a UE, signaling that indicates a configuration for grouping feedback information within a codebook, the codebook for reporting feedback pertaining to a set of multiple downlink messages, means for transmitting a first downlink message associated with a first quantity of feedback bits and a second downlink message associated with a second quantity of feedback bits, where the first downlink message and the second downlink message are associated with a same set of uplink resources for receiving a feedback message, and means for receiving, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

A non-transitory computer-readable medium storing code for wireless communication at a base station is described. The code may include instructions executable by a processor to transmit, to a UE, signaling that indicates a configuration for grouping feedback information within a codebook, the codebook for reporting feedback pertaining to a set of multiple downlink messages, transmit a first downlink message associated with a first quantity of feedback bits and a second downlink message associated with a second quantity of feedback bits, where the first downlink message and the second downlink message are associated with a same set of uplink resources for receiving a feedback message, and receive, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

Some examples of the method, apparatuses, and non-transitory computer-readable medium described herein may further include operations, features, means, or instructions for determining a range of feedback bits associated with a first group of the one or more groups, the first group including two or more subsubcodebooks, where the configuration indicates the range of feedback bits associated with the first group, and where the codebook includes the two or more subsubcodebooks in the first group in accordance with the configuration, and each subsubcodebook of the two or more subsubcodebooks includes a respective quantity of feedback bits that may be within the range of feedback bits.

In some examples of the method, apparatuses, and non-transitory computer-readable medium described herein, the codebook includes at least a first subcodebook and a second subcodebook, the first subcodebook supporting inclusion of a first group of subsubcodebooks that each include feedback information for one or more downlink messages having the first quantity of feedback bits, and the second subcodebook supporting inclusion of a second group of subsubcodebooks that each include feedback information for one or more other downlink messages having the second quantity of feedback bits.

In some examples of the method, apparatuses, and non-transitory computer-readable medium described herein, the first subcodebook, the second subcodebook, or both correspond to multi-bit feedback information, single-bit feedback information, TB-based feedback information, CBG-based feedback information, or a combination thereof.

In some examples of the method, apparatuses, and non-transitory computer-readable medium described herein, the codebook includes at least a first subcodebook and a second subcodebook, the first subcodebook supports inclusion of a first group of feedback information for one or more downlink messages each having respective first quantities of feedback bits within a first range of feedback bits, and the second subcodebook supports inclusion of a second group of feedback information for one or more other downlink messages each having respective second quantities of feedback bits within a second range of feedback bits.

In some examples of the method, apparatuses, and non-transitory computer-readable medium described herein, the first quantity of feedback bits may be within the first range of feedback bits associated with the first subcodebook, and the second quantity of feedback bits may be within the second range of feedback bits associated with the second subcodebook, the first subcodebook including feedback for the first downlink message and the second subcodebook including feedback for the second downlink message.

In some examples of the method, apparatuses, and non-transitory computer-readable medium described herein, the configuration indicates the first range of feedback bits and the second range of feedback bits.

In some examples of the method, apparatuses, and non-transitory computer-readable medium described herein, the first subcodebook, the second subcodebook, or both correspond to multi-bit feedback information, single-bit feedback information, TB-based feedback information, CBG-based feedback information, or a combination thereof.

Some examples of the method, apparatuses, and non-transitory computer-readable medium described herein may further include operations, features, means, or instructions for transmitting one or more control messages scheduling the first downlink message and the second downlink message, where each control message of the one or more control messages includes a pair of DAIs for each group of the one or more groups of feedback information.

Some examples of the method, apparatuses, and non-transitory computer-readable medium described herein may further include operations, features, means, or instructions for transmitting a control message scheduling the set of uplink resources, the control message including a set of multiple DAIs, where each DAI of the set of multiple DAIs indicates a quantity of bits for respective subsubcodebooks of the codebook.

Some examples of the method, apparatuses, and non-transitory computer-readable medium described herein may further include operations, features, means, or instructions for transmitting a control message scheduling the set of uplink resources, the control message including a DAI that indicates a total quantity of feedback bits for a set of multiple subsubcodebooks of the codebook, where the codebook includes the total quantity of feedback bits in accordance with the DAI, and where the total quantity of feedback bits includes at least the first quantity of feedback bits for the first downlink message concatenated with the second quantity of feedback bits for the second downlink message.

Some examples of the method, apparatuses, and non-transitory computer-readable medium described herein may further include operations, features, means, or instructions for performing an operation based on a value of the DAI, a result of the operation corresponding to the total quantity of feedback bits of the codebook.

In some examples of the method, apparatuses, and non-transitory computer-readable medium described herein, the codebook includes one or more bits appended to the codebook based on a value of the DAI and a modular operation.

Some examples of the method, apparatuses, and non-transitory computer-readable medium described herein may further include operations, features, means, or instructions for transmitting a control message scheduling the set of uplink resources, the control message including a first DAI and a second DAI, where the first DAI indicates a third quantity of feedback bits corresponding to a first group of the one or more groups, where the second DAI indicates a fourth quantity of feedback bits corresponding to a second group of the one or more groups, where the codebook includes the first group and the second group based on the third quantity of feedback bits and the fourth quantity of feedback bits, and where the first group includes at least the first quantity of feedback bits for the first downlink message and the second quantity of feedback bits for the second downlink message.

In some examples of the method, apparatuses, and non-transitory computer-readable medium described herein, the configuration indicates that the first group includes a first subset of subcodebooks of a set of multiple subcodebooks of the codebook and that the second group includes a second subset of subcodebooks of the set of multiple subcodebooks.

In some examples of the method, apparatuses, and non-transitory computer-readable medium described herein, the first group, the second group, or both, may be based on a function of a least common multiples of respective feedback bit quantities of subcodebooks in the respective group.

In some examples of the method, apparatuses, and non-transitory computer-readable medium described herein, transmitting the signaling may include operations, features, means, or instructions for transmitting the signaling via RRC signaling, or DCI, or a MAC-CE, or any combination thereof.

In some examples of the method, apparatuses, and non-transitory computer-readable medium described herein, the codebook includes a first subcodebook including feedback for the first downlink message and a second subcodebook including feedback for the second downlink message, and the feedback message may be received over a set of resources associated with a PUCCH and includes the first subcodebook multiplexed with the second subcodebook.

In some examples of the method, apparatuses, and non-transitory computer-readable medium described herein, the codebook includes single-bit feedback information corresponding to the first downlink message multiplexed with multi-bit feedback information corresponding to the second downlink message, and the first quantity of feedback bits includes the single-bit feedback information and the second quantity of feedback bits includes the multi-bit feedback information.

DETAILED DESCRIPTION

Figure 1:
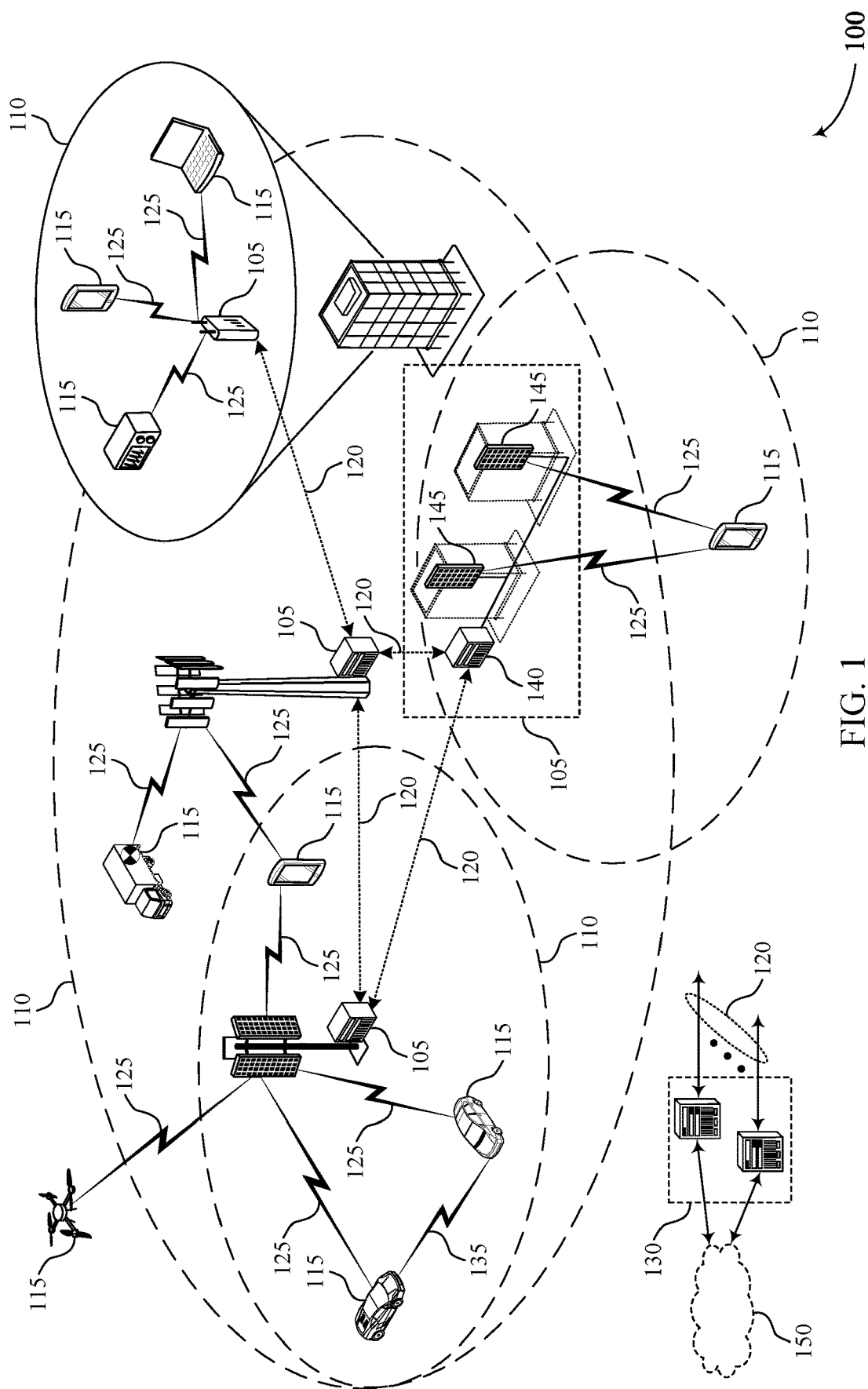
FIGS. 1 and 2 illustrate examples of wireless communications systems that support multiplexing multi-bit feedback and single-bit feedback on an uplink shared channel in accordance with aspects of the present disclosure.

A wireless communications system may include communication devices, such as a base station (e.g., an eNodeB (eNB), a next generation NodeB or a giga NodeB, any of which may be referred to as a gNB, or some other base station) or a user equipment (UE) that may support multiple radio access technologies. Examples of radio access technologies include 4G systems, such as LTE systems, and 5G systems, which may be referred to as New Radio (NR) systems. In the wireless communications system, a base station may transmit one or more downlink messages to a UE. The UE may transmit a feedback message in response to the one or more downlink messages. The feedback message may include a single bit of feedback per transport block (TB) or per code block group (CBG) in the downlink messages (which may be referred to as single-bit feedback). Alternatively, the feedback message may include multiple bits per TB or CBG (which may be referred to as multi-bit feedback). For example, the multi-bit feedback may indicate a one-bit acknowledgment (ACK) or negative acknowledgment (NACK) in addition to one or more bits to indication additional information, for example, related to channel state information (CSI). In one example, the one or more other bits may indicate information associated with a modulation and coding scheme (MCS) used for communications. The multi-bit feedback (e.g., including ACK/NACK and additional information) may be referred to as turbo-hybrid automatic repeat request (HARD) or some other terminology.

In some cases, feedback for multiple downlink messages may be transmitted via a same uplink resource, and the UE may generate a codebook corresponding to the multiple downlink messages. The UE may use the codebook to multiplex the feedback into a single uplink message. The UE may simultaneously support two codebooks that each correspond to one of a first or a second transmission reception point (TRP) of the base station, or to high priority traffic or low priority traffic, or the like. Each codebook may include two subcodebooks, and each subcodebook may further include up to two subsubcodebooks. The subcodebooks and subsubcodebooks may each include subsets of the total feedback information included in the respective codebook. The subsets of feedback information may be organized into the subcodebooks and subsubcodebooks based on one or more parameters associated with the feedback information. For example, if a UE supports multi-bit and single-bit feedback, a subcodebook may include two subsubcodebooks each related to one of the multi-bit feedback or the single-bit feedback. Each subsubcodebook may additionally correspond to one or more downlink assignment indices (DAIs). However, supporting eight subsubcodebooks and corresponding DAIs per UE may result in relatively high overhead and UE complexity.

To reduce UE complexity and overhead associated with simultaneous single-bit feedback and multi-bit feedback, a UE as described herein may receive a configuration for grouping feedback information within a codebook. In some examples, the configuration may indicate a grouping of feedback information within a codebook based on a quantity of bits associated with the feedback to support more efficient uplink and downlink DAI configurations. For example, subcodebooks, subsubcodebooks, or both that include a same or similar quantity of feedback bits may be grouped together and combined to reduce overhead. A downlink DAI counter and total downlink DAI may be shared by subcodebooks and subsubcodebooks in a same group.

An uplink control message that schedules a feedback occasion for a feedback message may include uplink DAI which may indicate a quantity of bits associated with the feedback message. In some examples, the uplink DAI described herein may indicate a total quantity of bits in all subcodebooks associated with a feedback occasion, or in each group of one or more groups of subcodebooks associated with a same feedback occasion. The base station and the UE may perform an operation (e.g., a modular operation at the base station and a similar, but reversed modular operation at the UE) to represent and identify, respectively, the total quantity of bits in the uplink DAI. In some examples, using the uplink DAI to indicate a total quantity of bits or a quantity of bits per group of subcodebooks may result in ambiguity regarding boundaries between subcodebooks. As such, the configuration for grouping feedback information (e.g., subcodebooks, subsubcodebooks) within a codebook may additionally, or alternatively, indicate which subcodebooks to combine into a group based on a common multiplier of respective bit quantities in each subcodebook. The UE may utilize a function associated with the bits per subcodebook to identify a quantity of bits per subcodebook in the group and any missing bits in each group. Such techniques for grouping subcodebooks and corresponding DAI may reduce overhead and improve communication reliability.

Aspects of the disclosure are initially described in the context of wireless communications systems. Additional aspects are described in the with reference to codebook configurations, a feedback timeline, feedback information configurations, and a process flow. Aspects of the disclosure are further illustrated by and described with reference to apparatus diagrams, system diagrams, and flowcharts that relate to multiplexing multi-bit feedback and single-bit feedback on an uplink shared channel.

FIG. 1 illustrates an example of a wireless communications system 100 that supports multiplexing multi-bit feedback and single-bit feedback on an uplink shared channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

A physical uplink control channel (PUCCH) may be mapped to a control channel defined by a code and consecutive resource blocks (RBs). Uplink control signaling may depend on the presence of timing synchronization for a cell. PUCCH resources for scheduling request (SR) and a channel quality indicator (CQI) reporting may be assigned (and revoked) through radio resource control (RRC) signaling.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may group feedback information within a codebook to reduce overhead and UE complexity. The UE 115 may receive one or more downlink messages from a base station 105. The UE 115 may generate a codebook for reporting feedback pertaining to each of the downlink messages. If the UE 115 supports both single-bit feedback and multi-bit feedback in a same feedback message, a codebook supported by the UE 115 for the feedback message may include a relatively large quantity of subcodebooks and subsubcodebooks (e.g., up to eight subsubcodebooks). To reduce overhead and complexity associated with generating the relatively large quantity of feedback information, the UE 115 may receive signaling from the base station 105. The signaling (e.g., control signaling) may indicate a configuration for grouping feedback information within the codebook. The UE 115 may receive a first downlink message associated with a first quantity of bits and a second downlink message associated with a second quantity of bits from the base station 105. The first and second downlink messages may be associated with a same set of uplink resources for transmitting a feedback message. The UE 115 may generate a codebook based on decoding the first and second downlink messages. The codebook may include one or more groups of feedback information (e.g., subcodebooks, subsubcodebooks) in accordance with the configuration. The one or more groups may be based on the first quantity of feedback bits and the second quantity of feedback bits. The UE 115 may transmit a feedback message to the base station 105 based on the codebook and via the set of uplink resources. The UE 115 may thereby utilize the configuration to group feedback information within the codebook, which may reduce overhead and UE complexity.

Figure 2:
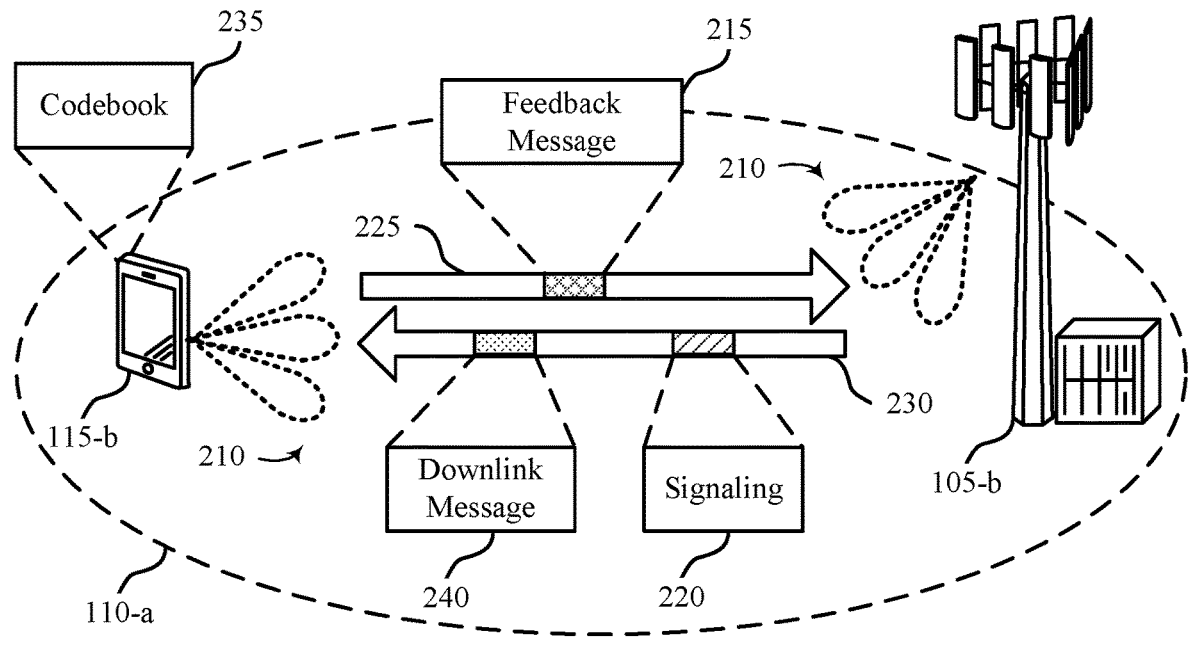

FIG. 2 illustrates an example of a wireless communications system 200 that supports multiplexing multi-bit feedback and single-bit feedback on an uplink shared channel in accordance with aspects of the present disclosure. The wireless communications system 200 may implement aspects of the wireless communications system 100. The wireless communications system 200 may include a base station 105-b having a corresponding coverage area 110-a and a UE 115-b, which may be examples of the corresponding devices described herein. In some aspects, the base station 105-b and the UE 115-b may wirelessly communicate with each other via an uplink communication link 225 and a downlink communication link 230. The base station 105-b and the UE 115-b may communicate using non-beamform communications and/or beamformed communications (e.g., using beams 210).

The UE 115-b may receive a downlink message 240 from the base station 105-b. The UE 115-b may transmit a feedback message 215 in response to the downlink message 240. The feedback message 215 may include a single bit of feedback per TB or per CBG in the downlink message 240. Alternatively, the feedback message 215 may include multiple bits per TB or CBG. For example, multi-bit feedback information may indicate a one-bit ACK/NACK in addition to one or more bits to indicate additional information, for example, related to CSI. Such multi-bit feedback (e.g., including ACK/NACK and additional information) may be referred to a turbo-HARQ or some other terminology (such as multi-bit feedback). In some cases, feedback for multiple downlink messages 240 may be transmitted via the same uplink resource, and the UE 115-b may generate a codebook 235 corresponding to the multiple downlink messages 240. The UE 115-b may use the codebook 235 to multiplex the feedback into a single uplink message. The UE 115-b may simultaneously support two codebooks 235 that each correspond to one of a first or a second TRP, or to high priority traffic (e.g., URLLC) or low priority traffic (e.g., eMBB). However, current techniques do not support codebook structures for multiplexing multi-bit feedback with single-bit feedback.

For example, this may include the UE 115-b supporting one (e.g., a single) HARQ-ACK codebook 235. The codebook 235 may be a type 1 codebook or type 2 codebook. Broadly, CBG-based physical downlink shared channel (PDSCH) and TB-based PDSCH may, at least in some aspects, use different HARQ-ACK subcodebooks. That is, the codebook 235 may include two subcodebooks, with one subcodebook being for TB-based PDSCH and the other subcodebook being for CBG-based PDSCH. For a type 2 codebook 235, the UE 115-b supporting simultaneous CBG and TB-based PDSCH may use two DAI pairs (e.g., a counter-DAI_CBG/total_DAI_CBG pair and a counter_DAI_TB/total_DAI_TB pair). In some aspects, a single TB PDSCH and a two TB PDSCH (where the TB may also be referred to as a codeword (CW) in some examples) may use the same HARQ-ACK subcodebook and the same DAI pair (e.g., for a type 2 codebook). For the type 2 codebook 235, if an active component carrier (CC) is configured to support two TBs, then the PDSCH on all active CCs may assume two-bit ACK/NACK feedback when constructing the HARQ-ACK subcodebook. In some examples for the type 2 codebook 235, the one TB and two TB PDSCH may use different subcodebooks and different DAI pairs. This may result in four subcodebooks (e.g., 2×2=4) and four independent DAIS pairs being used (e.g., to avoid complexity).

For the UE 115-b to support certain traffic types (e.g., URLLC and eMBB services), two HARQ-ACK codebooks 235 may be used. One codebook 235 may be associated with high priority (HP) traffic while the other codebook 235 may be associated with low priority (LP) traffic. For the UE 115-b to support multi-TRP-based traffic, again two codebooks 235 may be used. One codebook 235 for HARQ-ACK feedback for a first TRP (TRP1) and another codebook 235 for HARQ-ACK feedback for a second TRP (TRP2). In some examples, supporting certain traffic types (e.g., URLLC and eMBB) in addition to multiple TRPs may result in the UE 115-b using four codebooks 235 in its feedback. However, this may impose an increased processing or complexity burden on the UE 115-b and/or the base station 105-b, which may be undesirable. Accordingly, the UE 115-b may simultaneously support up to two codebooks 235 (comprising four subcodebooks, with each subcodebook comprising two subsubcodebooks), where four independent DAI pairs are used for a type 2 codebook. Again, current techniques do not support codebook structures for multiplexing multi-bit feedback with single-bit feedback by the UE 115-b.

For example, for each TB of a PDSCH (e.g., each TB of a downlink message 240), the UE 115-b may transmit multiple bits of feedback information in the feedback message 215 to provide additional information in addition to the one-bit ACK/NACK for the PDSCH. Examples of the additional information include, but are not limited to, the delta modulation and coding scheme (MCS) for a TB received with an MCS index (I_MCS). In some aspects, the delta MCS may be calculated from the difference between a target MCS (I_MCS_tgt) and the MCS used for the downlink transmission (I_MCS). Broadly, the target MCS (I_MCS_tgt) may correspond to the largest MCS index such that the estimated block error rate (BLER) for a TB received with an MCS index (I_MCS) would be smaller than or equal to a BLER target. Again, I_MCS may correspond to the MCS index of the received TB.

One example of how to extend the 1-bit feedback using two bits may include, but are not limited to, an ACK with the delta MCS+X (with respect to the MCS of the current PDSCH TB), where the X corresponds to an integer number indicating the change in the current MCS index to a target MCS index being X (e.g., from MCS index 4 to MCS index 6, where X would be two in this example). This may convey an indication that, although the UE 115-b was able to successfully receive and decode the TB, the channel conditions are such that subsequent downlink messages 240 would benefit from using a different MCS index. Another example may include an ACK with a delta MCS+0 (again with respect to the MCS of the current PDSCH TB). This may indicate that the channel conditions are such that no change to the current PDSCH TB MCS is needed. Another example may include a NACK with delta MCS−0. This may indicate that, although the UE 115-b was not able to successfully receive and decode the TB, the channel conditions are such that no change to the current PDSCH TB MCS index is needed (e.g., in the situation where something other than the channel conditions caused the UE 115-b to be unable to successfully receive and decode the downlink message 240). Yet another example may include a NACK with delta MCS −Y (also with respect to the current PDSCH TB). This may indicate that the UE 115-b was unable to successfully receive and decode the downlink message 240, and therefore the channel conditions are such that a lower MCS index value (e.g., corresponding to Y) may be needed for subsequent downlink messages 240.

Accordingly, the wireless communications system 200 may support CSI feedback and feedback enhancements. This may include an increase in the number of bits used in the feedback for reported subband CQI (e.g., such as a 3-bit differential subband CQI or 4-bit CQI). This may support and/or leverage turbo HARQ where the delta MCS is derived or otherwise determined based on PDSCH decoding. However, multiplexing single-bit (1-bit) and multi-bit HARQ-ACK feedback is not supported in some wireless communication systems.

Accordingly, aspects of the described techniques may support multiplexing single-bit (e.g., 1-bit) feedback with multi-bit feedback in a same feedback message 215. This may result in a scenario where two codebooks 235 are supported by the UE 115-b (e.g., a HP HARQ-ACK codebook and a LP HARQ-ACK codebook, or a TRP1 codebook and a TRP2 codebook). Each codebook 235 may include two subcodebooks, such as a subcodebook for TB based PDSCH and another subcodebook for CBG based PDSCH (e.g., a set of subcodebooks for HP vs LP HARQ-ACK, a set of subcodebooks for TRP1 HARQ-ACK vs TRP2 HARQ-ACK). Each subcodebook may include two subsubcodebooks, such as a subsubcodebook for single-bit feedback and a subsubcodebook for multi-bit feedback. For a two-codebook configuration, this would include two codebooks 235, with each codebook being formed by concatenating two subcodebooks (e.g., per TB/CBG). Each subcodebook may be formed by concatenating two subsubcodebooks (e.g., single-bit vs multi-bit feedback). In such examples, to support simultaneous single-bit feedback and multi-bit feedback, the UE 115-b may support up to eight subsubcodebooks that may, in some cases, be associated with relatively high overhead and UE complexity. Such a codebook configuration may be described in further detail elsewhere herein, including with reference to FIG. 3.

To reduce complexity, the UE 115-b may, in some aspects, receive signaling 220 from the base station 105-b that indicates a configuration for grouping feedback information (e.g., subcodebooks, subsubcodebooks) within a codebook 235. The configuration may indicate a granularity of feedback bit quantities or partition points for the UE 115-b to use for grouping feedback information. The UE 115-b may, in some examples, transmit a UE capability message to the base station 105-b via the uplink communication link 225. The UE capability message may indicate a capability of the UE 115-b to support grouping of feedback information within a codebook 235, and the configuration may be based on the capability of the UE 115-b. The UE 115-b may group one or more subsubcodebooks, subcodebooks, or both within a codebook 235 based on the configuration. In some examples, a group of feedback information may share an uplink and/or downlink DAI or a pair of uplink and/or downlink DAI, which may reduce overhead. Example configurations for grouping feedback information within a codebook 235 are described in further detail with reference to FIGS. 4, 5A, 5B, 6, 7A, and 7B.

Figure 3:
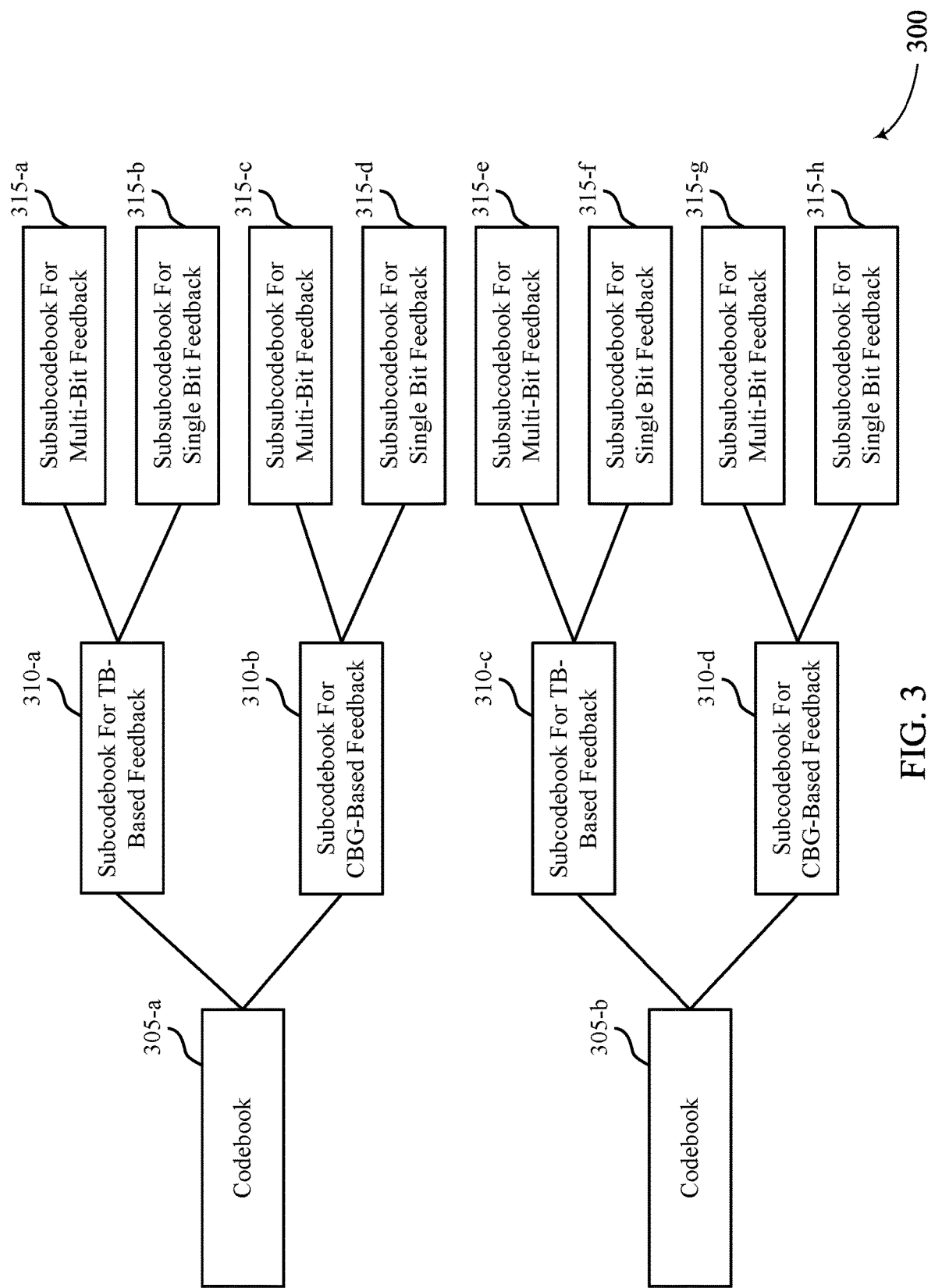
FIGS. 3, 4, 5A, and 5B illustrate examples of codebook configurations that support multiplexing multi-bit feedback and single-bit feedback on an uplink shared channel in accordance with aspects of the present disclosure.

FIG. 3 illustrates an example of a codebook configuration 300 that supports multiplexing multi-bit feedback and single-bit feedback on an uplink shared channel in accordance with aspects of the present disclosure. The codebook configuration 300 may illustrate an example configuration of codebooks 305, subcodebooks 310, and subsubcodebooks 315 associated with single-bit and multi-bit feedback generated by a UE 115 for transmission to a base station 105. The UE 115 and the base station 105 may represent examples of a UE and a base station as described with reference to FIGS. 1 and 2.

The UE 115 may generate two codebooks 305-a and 305-b to support multi-TRP communications or high priority and low priority communications. For example, the codebook 305-a may include feedback information for high priority communications, such as URLLC, and the codebook 305-b may include feedback information for low priority communications, such as eMBB. Alternatively, the codebook 305-a may include feedback information for downlink messages received from a first TRP and the codebook 305-b may include feedback information for downlink messages received from a second TRP. In some examples, the UE 115 may not support multi-TRP communications in addition to high and low priority communications simultaneously, which may provide for the UE 115 to support no more than two codebooks 305 at a time to reduce UE complexity.

The UE 115 may support feedback for TB-based PDSCH transmissions and CBG-based PDSCH transmissions. As such, each codebook 305 may include respective first and second subcodebooks 310 for the TB-based feedback and CBG-based feedback. The UE 115 may generate a first subcodebook 310 in each codebook 305, such as the subcodebooks 310-a and 310-c, to include feedback information for TB-based communications. The UE 115 may generate a respective second subcodebook 310 in each codebook 305, such as the subcodebooks 310-b and 310-d, to include feedback information for CBG-based communications. The UE 115 may support up to four subcodebooks 310 at a time.

The UE 115 may support multi-bit feedback and single-bit feedback. As such, each subcodebook 310 may include respective first and second subsubcodebooks 315 for the multi-bit feedback and the single-bit feedback. The UE 115 may generate a first subsubcodebook 315 in each subcodebook 310 to include multi-bit feedback information. For example, the subsubcodebooks 315-a, 315-c, 315-e, and 315-g may correspond to multi-bit feedback. The UE 115 may generate a second subsubcodebook 315 in each subcodebook 310 to include single-bit feedback information. For example, the subsubcodebooks 315-b, 315-d, 315-f, and 315-h may correspond to single-bit feedback.

The subsubcodebooks 315-a and 315-e may thereby correspond to multi-bit feedback per TB. The subsubcodebooks 315-c and 315-g may correspond to multi-bit feedback per CBG, which may include multiple bits of feedback information per CBG or multiple bits of feedback information for each CBG in a TB. For example, the UE 115 may generate the feedback based on averaging all of the CBGs in the TB, based on a decoding performance of a CBG (e.g., a worst decoding performance), or both. The subsubcodebooks 315-b and 315-f may correspond to single-bit feedback per TB, and the subsubcodebooks 315-d and 315-h may correspond to single-bit feedback per CBG.

The generation of eight subsubcodebooks 315 may correspond to relatively high overhead and UE complexity. As such, in some examples, the UE 115 may receive signaling that indicates a configuration for grouping feedback information within a codebook 305. The UE 115 may group one or more subsubcodebooks 315, subcodebooks 310, or both based on the configuration, which may reduce complexity and overhead. Examples of such configurations for grouping feedback information are described in further detail elsewhere herein, including with reference to FIGS. 4 through 7.

Figure 4:
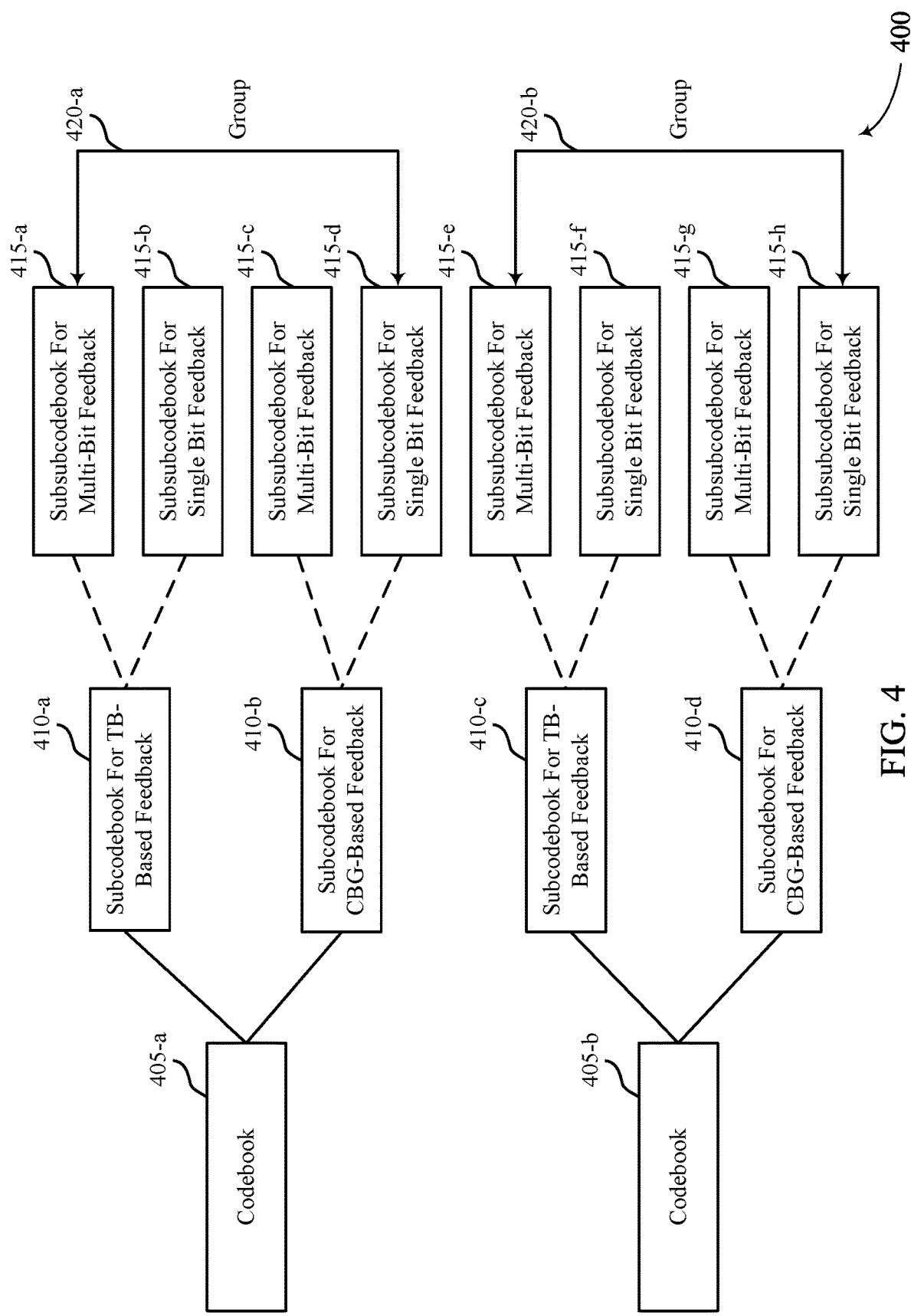

FIG. 4 illustrates an example of a codebook configuration 400 that supports multiplexing multi-bit feedback and single-bit feedback on an uplink shared channel in accordance with aspects of the present disclosure. The codebook configuration 400 may illustrate an example configuration of codebooks 405, subcodebooks 410, and subsubcodebooks 415 associated with single-bit and multi-bit feedback transmitted by a UE 115 to a base station 105. The UE 115 and the base station 105 may represent examples of a UE and a base station as described with reference to FIGS. 1 through 3. In some examples, the UE 115 may receive a configuration for grouping feedback information within a codebook 405.

The codebook configuration 400 may represent an example of the codebook configuration 300 described with reference to FIG. 3. For example, the UE 115 may generate the codebook 405-a to correspond to either high priority communications (e.g., URLLC communications) or a first TRP of the network and the codebook 405-b to correspond to either low priority communications (e.g., eMBB communications) or a second TRP of the network, as described with reference to FIG. 3. Each codebook 405 may include two respective subcodebooks 410. The UE 115 may generate the subcodebooks 410-a and 410-c for the codebooks 405-a and 405-b, respectively, to correspond to TB-based feedback. The UE 115 may generate the subcodebooks 410-b and 410-d for the codebooks 405-a and 405-b, respectively, to correspond to CBG-based feedback, as described with reference to FIG. 3. In some cases, the UE 115 may generate two subsubcodebooks 415 per subcodebook 410. For example, the UE 115 may generate the subsubcodebooks 415-a, 415-c, 415-e, and 415-g to include multi-bit feedback information and the subsubcodebooks 415-b, 415-d, 415-f, and 415-h to include single-bit feedback information. In the example of FIG. 4, the UE 115 may refrain from generating two subsubcodebooks 415 for each subcodebook 410 in accordance with a configuration for grouping feedback information. The UE 115 may thereby support relatively less subsubcodebooks 415 to reduce processing and overhead.

The UE 115 may receive signaling that indicates the configuration for grouping feedback information in one or more subsubcodebooks 415. Alternatively, the configuration for grouping the feedback information may be configured at the UE 115 (e.g., pre-configured). The configuration may provide for the UE 115 to reduce a quantity of subsubcodebooks 415 that the UE 115 generates based on a granularity of feedback information associated with each of the subsubcodebooks 415 (e.g., a number of feedback bits per PDSCH reception). The configuration may indicate a quantity of bits or a range of bit quantities that is associated with each subsubcodebook group 420.

For example, the UE 115 may generate the subcodebook 410-a to support inclusion of feedback information for a TB transmitted via a PDSCH. The UE 115 may generate the subsubcodebook 415-a to support inclusion of multi-bit feedback in response to the TB, such that the subsubcodebook 415-a may be associated with TB-based multi-bit feedback. Thus, the subsubcodebook 415-*a* may correspond to a first quantity, X, of feedback bits in a feedback message in response to the PDSCH (e.g., multi-bit feedback for a TB may include Xbits). The UE 115 may generate the subcodebook 410-*b* to support inclusion of feedback for each CBG transmitted via a PDSCH. The UE 115 may generate the subsubcodebook 415-*d* to support inclusion of single-bit feedback information in response to each CBG, such that the subsubcodebook 415-*d* may be associated with CBG-based single-bit feedback. The subsubcodebook 415-*d* may thereby correspond to a second quantity, Y, of feedback bits in the feedback message in response to the CBGs in the PDSCH. That is, if there are Y CBGs in the PDSCH, the UE 115 may generate a single bit of feedback per CBG.

Accordingly, the subsubcodebook 415-*a* and the subsubcodebook 415-*d* may each correspond to multiple bits of feedback information. If the values of X and Y are the same, or within a same range of bit quantities, the UE 115 may be configured to group the feedback information in the subsubcodebook 415-*a* with the feedback information in the subsubcodebook 415-*d*. The quantity of feedback bits or the range of feedback bit quantities may be indicated via the configuration. The UE 115 may thereby generate three subsubcodebooks 415 corresponding to the codebook 405-*a*. The three subsubcodebooks 415 may include the subsubcodebook 415-*b*, the subsubcodebook 415-*c*, and a third subsubcodebook 415 that is a combination of the subsubcodebooks 415-*a* and 415-*d*. The third subsubcodebook 415 may correspond to the group 420-*a*. The subsubcodebooks 415 in the group 420-*a* may share a same set of DAI (e.g., a same counter DAI and total DAI pair if the codebook 405-*a* is a type 2 codebook 405).

The UE 115 may similarly identify the group 420-*b* of the subsubcodebooks 415-*e* and 415-*h* based on a granularity of feedback information associated with each of the subsubcodebooks 415-*e* and 415-*h*. If the quantity of feedback bits associated with the subsubcodebooks 415-*e* and 415-*h* is the same, or is within a range of feedback bit quantities indicated via the configuration, the UE 115 may generate a single subsubcodebook 415 that includes both of the subsubcodebooks 415-*e* and 415-*g*.

Although the groups 420-*a* and 420-*b* are illustrated, it is to be understood that the UE 115 may group any subsubcodebooks 415 of a same codebook 405 based on the configuration and a granularity of feedback information associated with each subsubcodebook 415. For example, the UE 115 may group any of the subsubcodebooks 415-*a*, 415-*b*, 415-*c*, and 415-*d*. The UE 115 may refrain from grouping subsubcodebooks 415 that are associated with different codebooks 405 (e.g., the UE 115 may not group the subsubcodebook 415-*b* with the subsubcodebook 415-*f*). Additionally, or alternatively, the UE 115 may group any quantity of subsubcodebooks 415. For example, the UE 115 may group two, three, or four subsubcodebooks 415 within a same codebook.

The UE 115 may support relatively less subsubcodebooks 415 based on the configuration than if the UE 115 did not group the subsubcodebooks 415, which may reduce complexity and overhead. Additionally, each group 420 of subsubcodebooks 415 may share a same DAI pair (e.g., if the corresponding codebook 405 is a type 2 codebook), which may reduce overhead and improve utilization of communication resources.

Figure 5A:
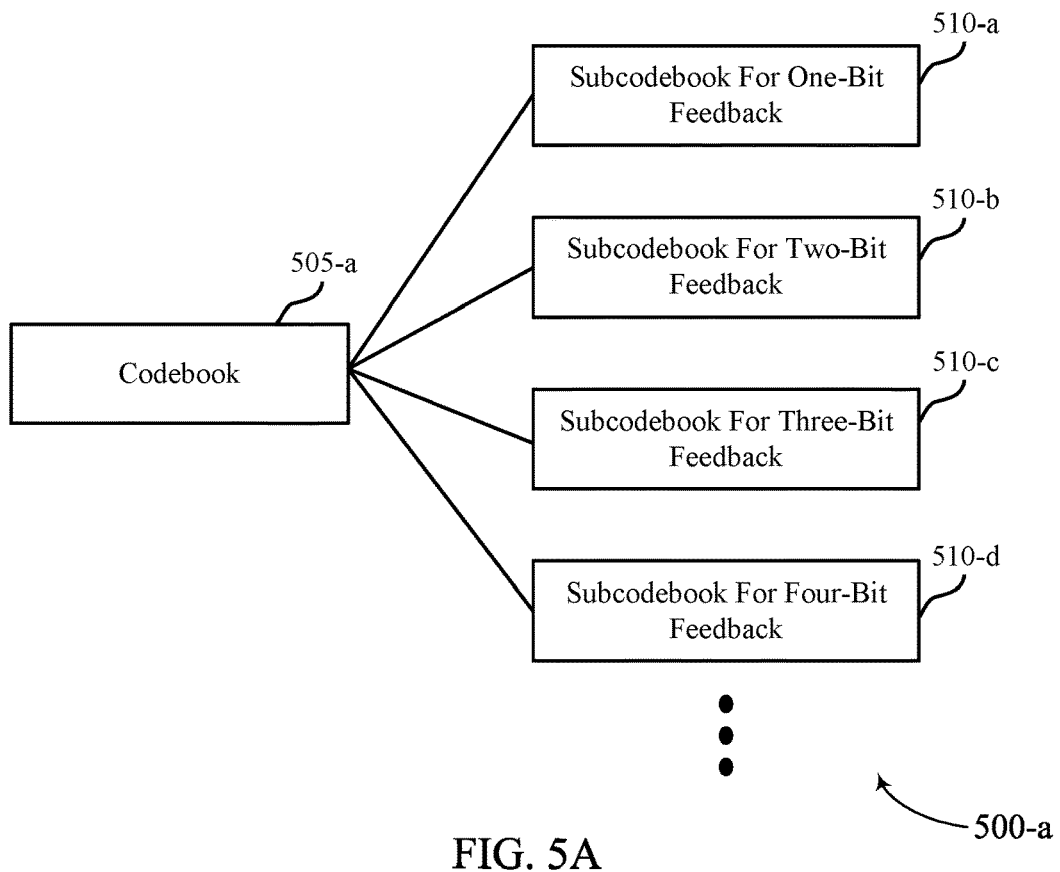
Figure 5B:
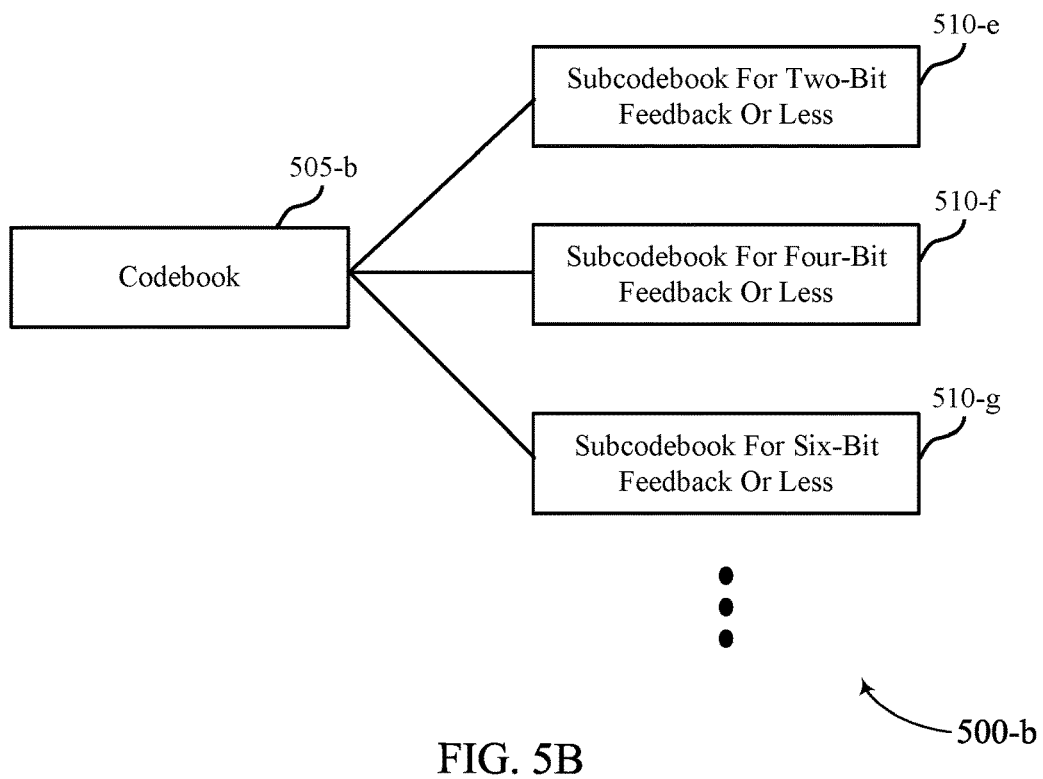

FIGS. 5A and 5B illustrate examples of codebook configurations 500 that supports multiplexing multi-bit feedback and single-bit feedback on an uplink shared channel in accordance with aspects of the present disclosure. The codebook configurations 500-*a* and 500-*b* may illustrate example configurations of codebooks 505 and subcodebooks 510 for feedback information transmitted by a UE 115 to a base station 105. The UE 115 and the base station 105 may represent examples of a UE and a base station as described with reference to FIGS. 1 through 4. In some examples, the UE 115 may identify a configuration for grouping feedback information within a codebook 505.

The codebook configurations 500-*a* and 500-*b* may represent examples of the codebook configuration 300 described with reference to FIG. 3. For example, the UE 115 may generate the codebooks 505-*a* and 505-*b* to correspond to one of high priority communications (e.g., URLLC communications), low priority communications (e.g., eMBB communications), a first TRP of the network, or a second TRP of the network, as described with reference to FIG. 3. In the examples of FIGS. 5A and 5B, the UE 115 may be configured to generate the subcodebooks 510 based on a quantity of feedback information associated with the subcodebooks 510.

FIG. 5A represents a first example codebook configuration 500-*a*. The codebook configuration 500-*a* may represent an example configuration in which the UE 115 may combine feedback information within a codebook 505-*a* based on a quantity of bits of the feedback information. For example, the UE 115 may be configured to generate each subcodebook 510 of the codebook 505-*a* to correspond to or include a same quantity of bits of feedback information per PDSCH. The UE 115 may receive signaling, such as RRC signaling, from a base station 105 that indicates the codebook configuration 500-*a*. In some examples, the signaling may include one or more parameters or information elements configured to convey the configuration and the granularity associated with the configuration. Additionally, or alternatively, the UE 115 may be configured with the codebook configuration 500-*a* (e.g., the UE 115 may be pre-configured to generate subcodebooks 510 based on a quantity of feedback bits).

The UE 115 may generate, in accordance with the codebook configuration 500-*a*, the subcodebook 510-*a* to support inclusion of one-bit of feedback information in a feedback message. The subcodebook 510-*a* may thereby support single-bit TB-based feedback (e.g., single-bit HARQ feedback per single TB PDSCH). The UE 115 may generate the subcodebook 510-*b* to support inclusion of two bits of feedback information in a feedback message. The subcodebook 510-*b* may thereby support three or more types of feedback information that correspond to a same feedback granularity (e.g., three or more subsubcodebooks may be grouped into the subcodebook 510-*b*). For example, the subcodebook 510-*b* may support TB-based multi-bit feedback in which the multi-bit feedback includes two bits per TB, CBG-based single-bit feedback for a single TB PDSCH that includes two CBGs, TB-based single-bit feedback for a PDSCH that includes two TBs, or any combination thereof. The UE 115 may generate the subcodebook 510-*c* to support inclusion of three-bit feedback information in a feedback message, the subcodebook 510-*d* to support inclusion of four-bit feedback information in a feedback message, one or more other subcodebooks 510 that support inclusion of one or more other quantities of bits of feedback information in a feedback message, or any combination thereof.

Each subcodebook 510 may share a pair of DAI (e.g., a pair of counter DAI and total DAI may be the same for each subcodebook 510). A value of the total DAI for a subcodebook 510 may be based on the quantity of feedback bits associated with the respective subcodebook 510, X, and a quantity of TBs per PDSCH, A (e.g., Total$_{DAI}$=A*X bits).

The UE 115 may thereby group feedback information within the codebook 505-a into one or more subcodebooks 510 based on the configuration. In some examples, the UE 115 may group one or more subsubcodebooks of the codebook 505-a based on a quantity or range of bits of feedback information, as described with reference to FIG. 4, and the UE 115 may subsequently group the subcodebooks 510 based on the codebook configuration 500-a and the respective feedback bit quantities. Additionally, or alternatively, the UE 115 may generate the subcodebooks 510 in accordance with the codebook configuration 500-a prior to grouping the subsubcodebooks. Although four subcodebooks 510 and corresponding bit quantities are illustrated, it is to be understood that the UE 115 may generate any quantity of subcodebooks 510 to correspond to any quantity of feedback bits.

FIG. 5B represents a second example codebook configuration 500-b. The codebook configuration 500-b may represent an example configuration in which the UE 115 may combine feedback information within a codebook 505-b based on a range of bits of the feedback information (e.g., a granularity for partitioning the feedback bits per PDSCH may be relatively coarse, such as [2, 4, 6, 8, . . . ]). For example, the UE 115 may be configured to generate each subcodebook 510 of the codebook 505-b to correspond to or include a range of bits of feedback information per PDSCH. The UE 115 may receive signaling from a base station 105 that indicates the codebook configuration 500-b. Additionally, or alternatively, the UE 115 may be configured with the codebook configuration 500-b (e.g., the UE 115 may be pre-configured to generate subcodebooks 510 based one or more ranges of feedback bit quantities).

The UE 115 may generate the subcodebook 510-e to support inclusion of two bits of feedback information or less in a feedback message (e.g., zero bits, one bit, or two bits). The subcodebook 510-e may thereby support one or more types of feedback information that correspond to two or less bits of feedback information (e.g., one or more subsubcodebooks may be grouped into the subcodebook 510-e). For example, the subcodebook 510-e may support TB-based single-bit feedback for a single TB PDSCH, TB-based multi-bit feedback that corresponds to two bits per TB for a PDSCH that includes two TBs, CBG-based single-bit feedback for a single TB PDSCH that includes two CBGs, TB-based single-bit feedback for a PDSCH that includes two TBs, or any combination thereof. If the subcodebook 510-e supports feedback that includes one or zero bits, the UE 115 may pad the feedback information with one or two bits, such that the feedback information includes two bits before placing the feedback information in the subcodebook 510-e.

The UE 115 may generate the subcodebook 510-f to support four bits of feedback information or less (e.g., three bits or four bits of feedback information) and the subcodebook 510-g to support six bits of feedback information or less (e.g., five bits or six bits of feedback information). The UE 115 may additionally, or alternatively, generate one or more other subcodebooks 510 to support one or more other ranges of feedback bits. In some examples, the UE 115 may generate a fourth subcodebook 510 (not pictured in FIG. 5B) that corresponds to seven or more feedback bits (e.g., remaining feedback information after generating the subcodebooks 510-e, 510-f, and 510-g).

Although the subcodebooks 510 in FIG. 5B are partitioned by ranges of two bits, it is to be understood that the UE 115 may be configured to partition the subcodebooks 510 based on any range of feedback bits. The base station 105 may configure the granularity for partitioning the subcodebooks 510 (e.g., partition points of the number of feedback bits per PDSCH). For example, the base station 105 may transmit signaling, such as RRC signaling, to the UE 115 to indicate the codebook configuration 500-b and a granularity associated with the codebook configuration 500-b. In some examples, the signaling may include one or more parameters or information elements configured to convey the configuration and the granularity.

If the UE 115 generates feedback information that includes a quantity of bits within a range, but less than a maximum number of bits in the range, the UE 115 may pad some number of bits to the feedback information to reach the maximum number of bits in the range. The UE 115 may subsequently put the padded feedback information into the respective subcodebook 510. By padding the feedback information, each subcodebook 510 may share a DAI pair (e.g., a DAI counter and a total DAI).

The UE 115 may thereby group feedback information within the codebook 505-b into one or more subcodebooks 510 based on the configuration. In some examples, the UE 115 may group one or more subsubcodebooks of the codebook 505-b based on a quantity or range of bits of feedback information, as described with reference to FIG. 4, and the UE 115 may subsequently group the subcodebooks 510 based on the grouping of the subsubcodebooks and the ranges of feedback bit quantities. Additionally, or alternatively, the UE 115 may generate the subcodebooks 510 in accordance with the codebook configuration 500-b prior to grouping the subsubcodebooks.

The codebook configurations 500-a and 500-b may support partitioning of subcodebooks 510 based on a granularity of feedback information. The UE 115 may be configured with a procedure or one or more rules for determining which feedback information to include in each subcodebook 510 based on the codebook configuration 500-a or the codebook configuration 500-b. The codebook configurations 500 may thereby provide for the UE 115 to support relatively less subcodebooks 510 and subsubcodebooks than if the UE 115 did not receive the configurations and to share DAI indications between the feedback information for each subcodebook 510, which may reduce processing and overhead.

Figure 6:
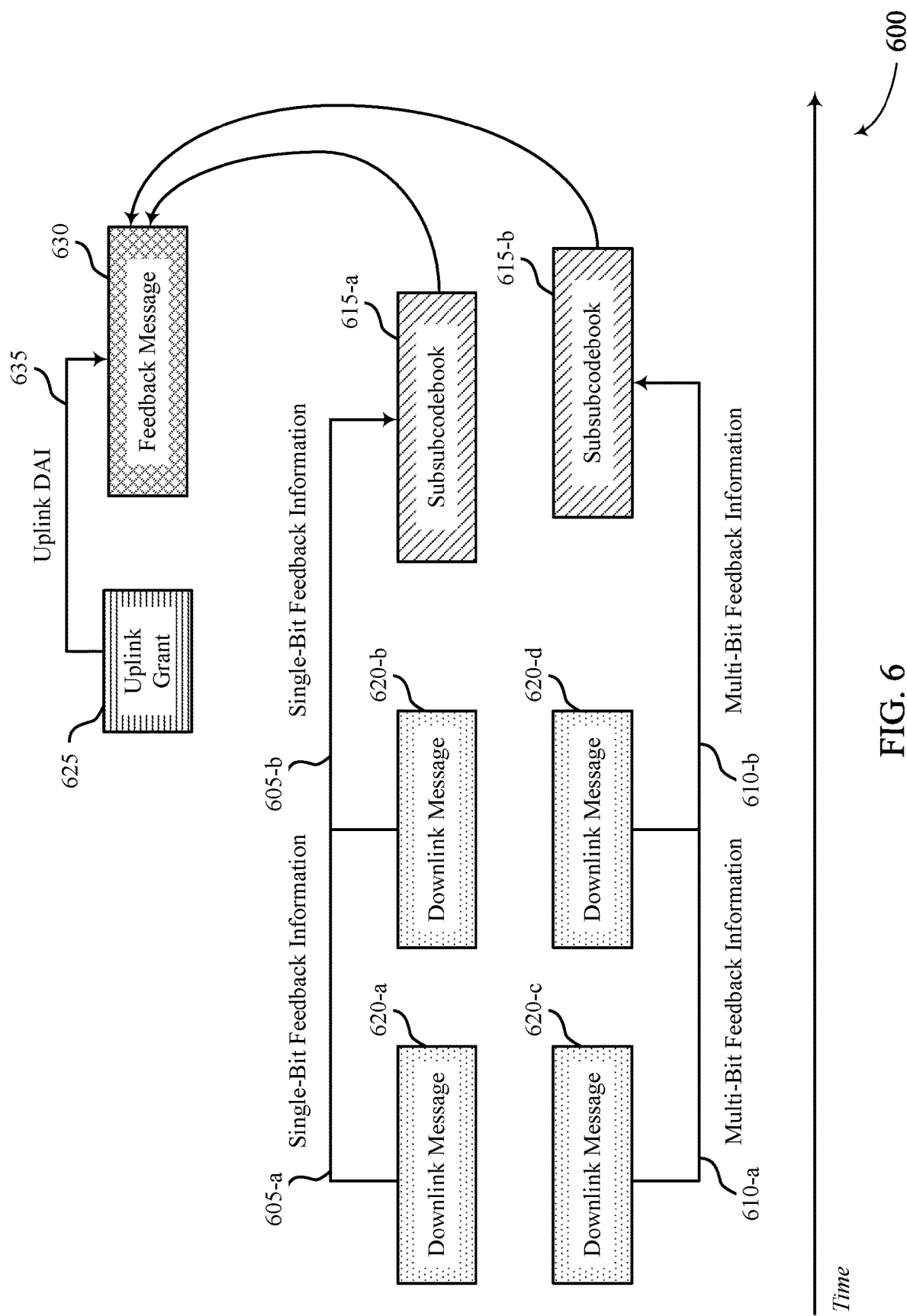
FIG. 6 illustrates an example of a feedback timeline that supports multiplexing multi-bit feedback and single-bit feedback on an uplink shared channel in accordance with aspects of the present disclosure.

FIG. 6 illustrates an example of a feedback timeline 600 that supports multiplexing multi-bit feedback and single-bit feedback on an uplink shared channel in accordance with aspects of the present disclosure. The feedback timeline 600 may implement aspects of the wireless communications systems 100 and 200 or may be implemented by aspects of the wireless communications systems 100 and 200 as described with reference to FIGS. 1 and 2, respectively. For example, the feedback timeline 600 may illustrate example timing for communications between a base station 105 and a UE 115, which may be examples of a base station and a UE as described with reference to FIGS. 1 through 5. In some examples, the UE 115 may multiplex single-bit feedback information 605 with multi-bit feedback information 610 in a single feedback message 630.

The UE 115 may support both single-bit feedback and multi-bit feedback. That is, the UE 115 may be configured to transmit the single-bit feedback information 605-a and 605-b for the downlink messages 620-a and 620-b and the multi-bit feedback information 610-a and 610-b for the downlink messages 620-c and 620-d. In the example of FIG. 6, the UE 115 may support carrier aggregation, and the feedback type may be configured on a per-carrier basis. For example, the UE 115 may support a first component carrier and a second component carrier. The base station 105 may configure the first component carrier with single-bit feedback (e.g., one-bit HARQ-ACK per TB) and the second component carrier with multi-bit feedback (e.g., multiple bits HARQ-ACK per TB). Although the multi-bit feedback and single-bit feedback are illustrated on a per-component carrier basis, it is to be understood that the configuration of multi-bit feedback and single-bit feedback may be provided on a per-UE basis, a per-codebook basis, or some other basis for configuring the different types of feedback.

The UE 115 may receive one or more downlink control messages, such as downlink control information (DCI), to schedule the one or more downlink messages 620. Each DCI may schedule a respective downlink message 620 and one or more uplink resources (e.g., physical uplink shared channel (PUSCH) or PUCCH resources) for transmitting feedback in response to the respective downlink message 620. The DCI may additionally indicate a type of feedback that is configured for the respective downlink message 620 and a pair of DAI associated with the respective downlink message 620 (e.g., a counter DAI and a total DAI). In the example of FIG. 6, a first DCI that schedules the downlink message 620-a and a second DCI that schedules the downlink message 620-b may indicate a same set of uplink resources for the UE 115 to use for transmitting a subsubcodebook 615-a corresponding to single-bit feedback in response to the downlink messages 620-a and 620-b. A third DCI that schedules the downlink message 620-c and a fourth DCI that schedules the downlink message 620-d may indicate a same set of uplink resources for the UE 115 to use for transmitting a subsubcodebook 615-b corresponding to multi-bit feedback in response to the downlink messages 620-c and 620-d.

The UE 115 may generate the subsubcodebooks 615-a and 615-b based on the respective downlink messages 620. The subsubcodebook 615-a may include one bit of feedback information per PDSCH (e.g., per downlink message 620). For example, the subsubcodebook 615-a may include the single-bit feedback information 605-a for the downlink message 620-a (e.g., a single TB PDSCH) and the single-bit feedback information 605-b for the downlink message 620-b (e.g., a single TB PDSCH). The subsubcodebook 615-b may include a configured quantity, X, of bits of feedback information per PDSCH. For example, the subsubcodebook 615-b may include the multi-bit feedback information 610-a for the downlink message 620-c and the multi-bit feedback information 610-b for the downlink message 620-d (e.g., Xbits of feedback information per single TB PDSCH). In some examples, the UE 115 may multiplex two or more subsubcodebooks 615 or subcodebooks into a same uplink resource. For example, if a first PUCCH resource for a first subcodebook at least partially overlaps a second PUCCH resource for a second subcodebook, the UE 115 may multiplex the first and second subcodebooks onto a same PUCCH resource.

An uplink grant 625 (e.g., an uplink scheduling DCI) may schedule PUSCH resources for a feedback message 630 in response to the downlink messages 620-a, 620-b, 620-c, and 620-d. In some examples, the uplink grant 625 and the PUSCH resources may be on a third component carrier that is different from the first and second component carriers on which the downlink messages 620 are received. The PUCCH resources for the subsubcodebooks 615-a and 615-b may be at least partially overlapping in the time domain with the one or more PUSCH resources allocated for the feedback message 630. The UE 115 may multiplex the single-bit feedback information 605 of the subsubcodebook 615-a with the multi-bit feedback information 610 of the subsubcodebook 615-b into a same codebook based on the PUCCH resources carrying the subsubcodebooks 615 overlapping with the same PUSCH resources. The UE 115 may transmit the feedback message 630 via the PUSCH resources based on the codebook. In some examples (not pictured in FIG. 6), the PUCCH resource(s) for conveying the subcodebooks may not overlap with any PUSCH resources. In such cases, the UE 115 may transmit the feedback message 630 including the concatenated subcodebooks via the PUCCH resources.

The uplink grant 625 may indicate, to the UE 115, an uplink DAI 635. The uplink DAI 635 may be an example of a total DAI that may indicate a quantity of downlink messages 620 that are associated with feedback information that should be included in a codebook used to transmit the feedback message 630. That is, the uplink DAI 635 may indicate how many bits of feedback information should be included in the feedback message 630. If the UE 115 supports both TB-based PDSCH transmissions and CBG-based PDSCH transmissions, the uplink DAI 635 may include two DAIS.

A first DAI may indicate a quantity of TBs per PDSCH for the TB-based feedback and a second DAI may indicate a quantity of CBGs per PDSCH for the CBG-based feedback. For example, the first DAI may indicate a value of X for a first subcodebook that corresponds to TB-based feedback, which may indicate that the UE 115 received X downlink messages 620, where each downlink message 620 corresponds to a TB-based PDSCH. The first DAI value may indicate that the UE 115 should generate Xbits of feedback information in the feedback message 630 (e.g., one bit ACK or NACK per PDSCH). The second DAI may indicate a value of X for a second subcodebook that corresponds to CBG-based feedback, which may indicate that the UE 115 received X downlink messages 620, where each downlink message 620 corresponds to a CBG-based PDSCH. The second DAI may indicate that the UE 115 should generate X*Y bits of feedback information for the feedback message 630, where Y may correspond to a quantity of CBGs per PDSCH (e.g., Y bits of ACK or NACK per PDSCH).

The UE 115 may generate the first and second subcodebooks based on the first and second DAI values. The UE 115 may generate a codebook that includes the first and second subcodebooks. The UE 115 may transmit the feedback message 630 based on the codebook. The feedback message 630 may include the total quantity of bits indicated by both the first and second DAI. The uplink DAI 635 may thereby be configured to support TB-based PDSCH and CBG-based PDSCH simultaneously. However, some configurations for the uplink DAI 635 may not support TB-based PDSCH, CBG-based PDSCH, single-bit feedback, and multi-bit feedback simultaneously.

The uplink DAI 635 as described herein may be configured to support the four types of feedback simultaneously based on a grouping of subcodebooks at the UE 115. For example, the uplink DAI 635 may include one or more respective DAI values that each indicate a quantity of bits for each subsubcodebook 615 of the UE 115, a single DAI value that indicates a total quantity of bits for a codebook of the UE 115, one or more DAI values that each indicate a quantity of bits for a group of subcodebooks of the UE 115, or any combination thereof.

In some examples, the uplink DAI 635 may include a DAI field for each subsubcodebook 615 supported by the UE 115. For example, the uplink grant 625 may include four DAI fields. A first DAI field may indicate a quantity of downlink messages 620 (e.g., PDSCHs) associated with a first sub-subcodebook 615 for multi-bit feedback and TB-based PDSCH, such as the subsubcodebook 615-*b* (e.g., if the downlink messages 620-*a* and 620-*b* are each TB-based PDSCH). The first subsubcodebook 615 may be an example of the subsubcodebooks 315-*a* and 315-*e* in FIG. 3. A second DAI field may indicate a quantity of downlink messages 620 associated with a second subsubcodebook 615 for multi-bit feedback and CBG-based PDSCH. The second subsubcodebook 615 may be an example of the subsubcodebooks 315-*c* and 315-*g* in FIG. 3. A third DAI field may indicate a quantity of downlink messages 620 associated with a third subsubcodebook 615 for single-bit feedback and TB-based PDSCH, such as the subsubcodebook 615-*a* (e.g., if the downlink messages 620-*c* and 620-*d* are each TB-based PDSCH). The third subsubcodebook 615 may be an example of the subsubcodebooks 315-*b* and 315-*f* in FIG. 3. A fourth DAI field may indicate a quantity of downlink messages 620 associated with a fourth subsubcodebook 615 for single-bit feedback and CBG-based PDSCH. The fourth subsubcodebook 615 may be an example of the subsubcodebooks 315-*d* and 315-*h* in FIG. 3.

If the UE 115 supports multi-TRP communications or high and low priority communications, the UE 115 may generate two codebooks and up to eight subsubcodebooks 615, as described with reference to FIG. 3. In such cases, the uplink grant 625 may include up to eight uplink DAI fields to indicate quantities of PDSCHs and corresponding bits for each subsubcodebook 615 of the UE 115. The UE 115 may receive the uplink DAI 635 including the eight uplink DAI fields and generate the feedback message 630 based on the uplink DAI 635. However, the overhead associated with receiving eight uplink DAI values via an uplink grant 625 may be relatively high. In one example, each uplink DAI field may include two bits, such that the uplink grant 625 may include 16 bits configured to convey the uplink DAI 635, which may result in increased overhead, UE complexity, and processing.

In some examples, to reduce a quantity of uplink DAI fields, the uplink DAI 635 may convey a single DAI value that indicates a total quantity of bits associated with the feedback message 630. The value of the uplink DAI 635 may thereby correspond to a total quantity of feedback bits in a codebook supported by the UE 115 (e.g., a codebook size). The base station 105 may identify a quantity of bits associated with each of the downlink messages 620-*a*, 620-*b*, 620-*c*, and 620-*d*, and the base station 105 may repurpose the DAI field in the uplink grant 625 to indicate the total quantity of bits (e.g., instead of a quantity of PDSCHs). For example, if a value of the uplink DAI 635 is six, the UE 115 may determine to include six bits of feedback information in the feedback message 630.

The size of a codebook (e.g., the total quantity of bits) may be relatively large (e.g., up to 256 bits). The DAI field in the uplink grant 625 may include up to eight bits to represent a range of possible values for the codebook (e.g., [0,255]), which may result in relatively high overhead. To reduce overhead, in some examples, the base station 105 may utilize a modular operation to indicate the codebook size. The UE 115 may receive the uplink DAI 635 and perform a reverse of the modular operation to derive the codebook size from the value of the uplink DAI 635.

To identify whether a modular operation was performed on the uplink DAI 635, the UE 115 may compare an estimated codebook size, Y, with the value indicated by the uplink DAI 635, X The UE 115 may estimate the codebook size based on the DCI (e.g., downlink grants) and corresponding downlink DAI for each of the downlink messages 620. For example, the UE 115 may generate the subsubcodebooks 615 and subcodebooks of the codebook based on the total DAI and DAI counters indicated via the DCI for each downlink message 620. If the UE 115 determines to multiplex the subsubcodebooks 615 into a same feedback message 630, the UE 115 may generate a concatenated codebook and assume the length of the concatenated codebook is Y.

In some examples, the uplink DAI 635 may include a quantity of bits, K (e.g., a bit width), and the value of the uplink DAI 635 may be less than or the same as $2^{K-1}$ (e.g., $0 \leq X \leq 2^{K-1}$). If the estimated codebook size is less than the value indicated by the uplink DAI 635 (e.g., Y<X), the UE 115 may determine the base station 105 did not perform a modular operation on the uplink DAI 635 and the codebook size is the same as the value indicated by the uplink DAI 635. The UE 115 may append bits to the codebook until the codebook has the same size as the value of the uplink DAI 635 (e.g., the UE 115 may append X-Y dummy bits). If the estimated codebook size is greater than the value indicated by the uplink DAI 635 (e.g., Y>X), the UE 115 may determine that the codebook size is $X+L*2^K$, where L may represent a smallest positive integer such that $X+L*2^K \geq Y$. The UE 115 may append bits to the codebook until the codebook has the same size as the determined codebook size (e.g., the UE 115 may append $X+L*2^K-Y$ dummy bits to the codebook).

If the codebook size is incorrect (e.g., if the UE 115 includes more or less feedback information in the codebook), the base station 105 may experience error or ambiguity associated with decoding the PUSCH. As such, by indicating the size of the codebook via the uplink DAI 635, the base station 105 may provide for the UE 115 to include the correct quantity of feedback bits in the codebook and the corresponding feedback message 630, which may support efficient PUSCH decoding. The value of the uplink DAI 635 may indicate beginning and ending boundaries of the codebook, but the uplink DAI 635 may not indicate subcodebook or subsubcodebook boundaries within the codebook. As such, if the UE 115 fails to receive or decode a downlink scheduling DCI, the UE 115 may generate the codebook to include an incorrect order of feedback information (e.g., for type 2 codebooks which may be generated based on the DAI counters indicated via the downlink DCI).

For example, if the UE 115 does not receive a downlink DCI, the UE 115 may identify a quantity of bits that are missing from the codebook based on the uplink DAI 635, but the UE 115 may not know which subcodebooks or subsubcodebooks 615 in the codebook contribute to the missing bits. In one example, if six bits are missing from a codebook, the six missing bits could be missing from any one of the subcodebooks in the codebook, or a portion of the six bits could be missing from a first subcodebook and a second portion of the six bits could be missing from a second subcodebook of the codebook, or any combination of bits could be missing from any of the subcodebooks. The UE 115 may not identify which subcodebooks to append the missing bits to, and the UE 115 may instead append dummy bits to an end of the codebook, which may result in errors when the base station 105 decodes the feedback message 630.

In the example of FIG. 6, the uplink DAI 635 may indicate a value of six (e.g., there may be six bits of feedback information in the codebook for the feedback message 630). If the UE 115 does not receive a DCI that schedules the downlink message 620-*b*, the UE 115 may generate the codebook by concatenating the single-bit feedback information 605-a for the downlink message 620-a, the multi-bit feedback information 610-a for the downlink message 620-c (e.g., two bits of ACK or NACK), and the multi-bit feedback information 610-b for the downlink message 620-d (e.g., two bits of ACK or NACK). The UE 115 may identify that a bit is missing from the codebook based on the DAI value of six, and the UE 115 may append a single dummy bit to an ending portion of the codebook. However, the base station 105 may expect the feedback message 630 to include the single-bit feedback information 605-b for the downlink message 620-b. As such, the base station 105 may read the feedback message 630 incorrectly. For example, the base station 105 may read the multi-bit feedback information 610-a for the downlink message 620-c and assume the feedback information corresponds to the downlink message 620-b, because the base station 105 may expect the single-bit feedback information 605-b to be included in the feedback message 630 where the multi-bit feedback information 610-b is included.

To improve codebook generation and reduce ambiguity, the UE 115 may be configured to group subcodebooks, and the uplink grant 625 may include multiple uplink DAI fields, where each uplink DAI 635 indicates a quantity of bits associated with a group of subcodebooks. By indicating the quantity of bits per group of subcodebooks, the base station 105 and the UE 115 may identify missing bits more efficiently and improve communication reliability as compared with the uplink DAI 635 indicating a total quantity of bits in a codebook. The configuration of uplink DAI 635 to indicate groups of subcodebooks is described in further detail elsewhere herein, including with reference to FIGS. 7A and 7B.

Figure 7A:
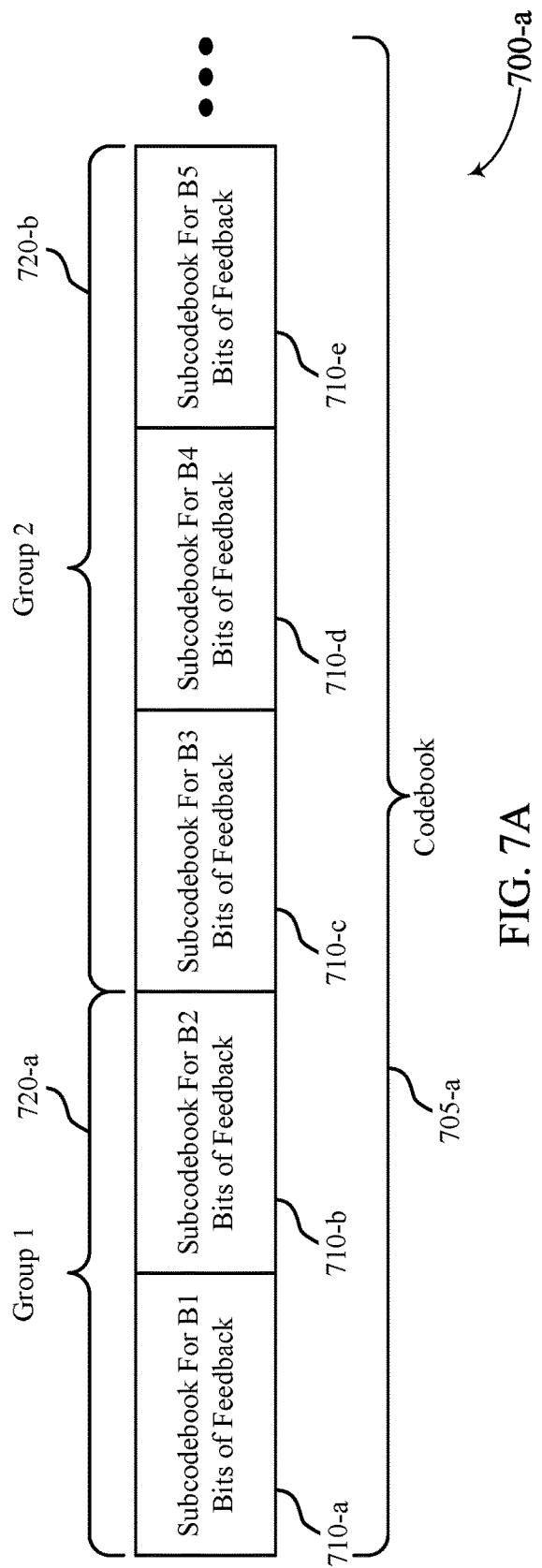
FIGS. 7A and 7B illustrate examples of feedback information configurations that support multiplexing multi-bit feedback and single-bit feedback on an uplink shared channel in accordance with aspects of the present disclosure.
Figure 7B:
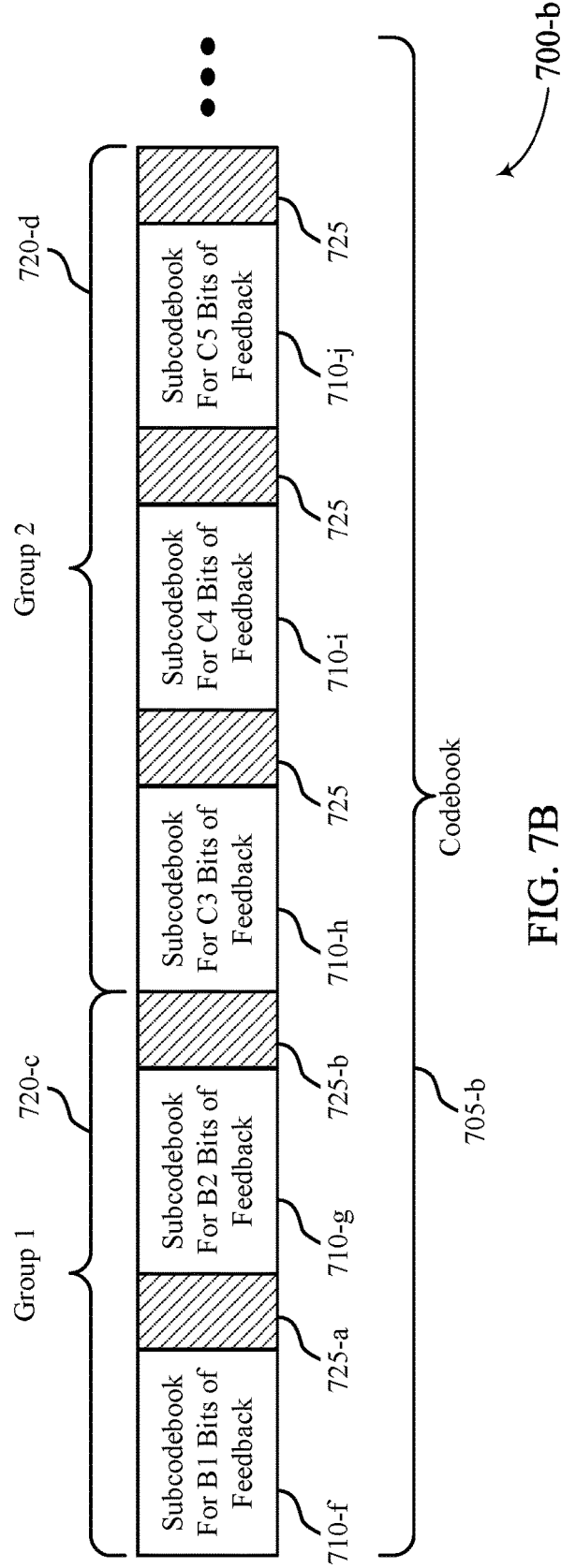

FIGS. 7A and 7B illustrate examples of feedback information configurations 700 that support multiplexing multi-bit feedback and single-bit feedback on an uplink shared channel in accordance with aspects of the present disclosure. The feedback information configurations 700-a and 700-b may implement aspects of the wireless communications systems 100 and 200 or may be implemented by aspects of the wireless communications systems 100 and 200 as described with reference to FIGS. 1 and 2, respectively. For example, the feedback information configurations 700-a and 700-b may illustrate example configurations for feedback information that may be transmitted from a UE 115 to a base station 105, which may be examples of a base station and a UE as described with reference to FIGS. 1 through 6. In some examples, the feedback information configurations 700-a and 700-b may provide for a UE 115 to concatenate multiple subcodebooks 710 into a single codebook 705 for reporting feedback pertaining to downlink messages received by the UE 115. The codebook 705 and subcodebooks 710 may be examples of codebooks and subcodebooks as described with reference to FIGS. 1 through 6.

FIG. 7A illustrates an example feedback information configuration 700-a. The feedback information configuration 700-a illustrates an example configuration for grouping subcodebooks 710 of a codebook 705-a to reduce overhead. The codebook 705-a may include one or more subcodebooks 710 (e.g., the subcodebooks 710-a, 710-b, 710-c, 710-d, 710-e, and one or more other subcodebooks 710). Each subcodebook 710 may correspond to a quantity of feedback information bits, as described with reference to FIGS. 2 through 6. That is, each subcodebook 710 may include a quantity, $B_i$, of feedback bits per PDSCH. Each subcodebook 710 may correspond to a respective index, i, (e.g., a subcodebook where i=1, 2, ... M, and M is the total quantity of subcodebooks 710 in the codebook 705-a).

To improve feedback generation and communication reliability, the UE 115 may be configured to partition the subcodebooks 710 into different subcodebook groups 720, such as the groups 720-a and 720-b. Each subcodebook group 720 may share a same uplink DAI, which may be an example of the uplink DAI 635 described with reference to FIG. 6. The uplink DAI may indicate a quantity of feedback bits associated with the respective group 720. In some examples, the base station 105 may utilize a modular operation to convey a value of the uplink DAI for each group 720. The modular operation may be an example of the modular operation described with reference to FIG. 6.

The base station 105 may transmit signaling (e.g., RRC, MAC-CE, or DCI) that indicates the groups 720 to the UE 115. In some examples, the signaling may indicate, to the UE 115, how to form the groups 720. For example, the signaling may indicate that the groups 720 are formed based on a difference between feedback granularities for each subcodebook 710 in the group 720 being relatively high. That is, the groups 720 may be formed based on a function of a least common multiple of respective feedback bit quantities of the subcodebooks 710 in the group 720. In the example of FIG. 7A, the base station 105 may determine to include the subcodebook 710-a and the subcodebook 710-b (e.g., a pair of subcodebooks $C_i$ and $C_j$ that include B and $B_j$ bits of feedback information, respectively) in the group 720-a based on a least common multiplier of the quantity of bits of feedback information in the subcodebooks 710-a and 710-b being above a threshold value (e.g., a least common multiplier of B and $B_j$ may be maximized).

By receiving uplink DAI in accordance with the subcodebook groups 720, the UE 115 may reduce potential for error when generating the codebook 705-a as compared with a codebook generation when the UE 115 receives an uplink DAI that indicates a total quantity of bits in a codebook 705. For example, if the UE 115 misses a DCI that schedules a downlink message associated with the subcodebook 710-b, there may be some error with the feedback information for the subcodebook 710-b, but the UE 115 may correctly transmit feedback information for the remaining subcodebooks 710 in the codebook 705-a based on a respective uplink DAI that indicates boundaries for the group 720-b.

FIG. 7B illustrates an example feedback information configuration 700-b. The feedback information configuration 700-b illustrates an example configuration for grouping subcodebooks 710 of a codebook 705-b to reduce overhead. The codebook 705-b may include one or more subcodebooks 710 (e.g., the subcodebooks 710-f, 710-g, 710-h, 710-i, 710-j, and one or more other subcodebooks 710). Each subcodebook 710 may include a quantity, B of feedback bits per PDSCH.

The groups 720-c and 720-d of subcodebooks 710 illustrated in the feedback information configuration 700-b may be formed in accordance with a function of least common multiples of the respective feedback bit quantities of the subcodebooks 710 in the group, as described with reference to FIG. 7A. The subcodebook groups 720 may additionally share an uplink DAI that may indicate a quantity of feedback bits associated with the respective group 720, as described with reference to FIG. 7A.

In the example of FIG. 7B, the UE 115 may identify a quantity of feedback bits that are missing from the codebook 705-b, and the UE 115 may determine which subcodebooks 710 correspond to the missing feedback bits. The UE 115 may append one or more dummy bits 725 to the identified subcodebooks 710 to improve alignment between subcodebooks 710 within the codebook 705-b, such that the base station 105 may accurately receive and decode the codebook 705-b. In some examples, the dummy bits 725 illustrated in FIG. 7B may include zero bits. That is, the UE 115 may not append dummy bits 725 to each subcodebook 710. The UE 115 may identify the missing bits based on the grouping of subcodebooks 710.

For example, the UE 115 may receive uplink DAI that indicates a quantity of bits in each group 720 of subcodebooks 710 within the codebook 705-b, such as the groups 720-c and 720-d. The UE 115 may generate the subcodebooks 710-f, 710-g, 710-h, 710-i, and 710-j based on downlink DCIs that indicate respective DAI counters for each of the subcodebooks 710. The UE 115 may concatenate the subcodebooks 710-f and 710-g to form the group 720-c, and the UE 115 may concatenate the subcodebooks 710-h, 710-i, and 710-j to form the group 720-d. The UE 115 may determine a quantity of missing feedback information bits in each group 720 based on a difference between the quantity of bits indicated via the uplink DAI for the respective group 720 and the quantity of bits in the concatenated subcodebooks 710. The quantity of missing bits in a group 720 may be represented by Z.

Each group 720 may include a quantity, M, of subcodebooks 710, and each subcodebook 710 may correspond to a respective index, i, (e.g., a subcodebook $C_i$, where i=1, 2, ... M). For example, the group 720-d may include three subcodebooks 710, and the subcodebooks 710-h, 710-I, and 710-j may correspond to indices $C_1$, $C_2$, and $C_3$, respectively. For each subcodebook a PDSCH may correspond to $B_i$ bits of feedback information. For example, the subcodebooks 710-h, 710-i, and 710-j may include $B_1$, $B_2$, and $B_3$ bits of information, respectively. The UE 115 may identify a set of DCI and corresponding PDSCHs that the UE 115 missed in each subcodebook 710 based on a function of a least common multiplier of the respective feedback bit quantities of the subcodebooks 710-h, 710-i, and 710-j in the group 720-d. The function may be represented by Equation 1.

$$\Sigma_{i=1}^{M} X_i B_i = Z \quad \text{Equation (1)}$$

The UE 115 may determine a set, $x_i$, that satisfies Equation 1, where $x_i$ represents a set of missing DCI or PDSCHs in the group 720-d, and Z represents the quantity of missing bits in the group 720-d. Each value of x in the set $x_i$ may represent a quantity of missing bits for the subcodebook 710 that corresponds to the index i (e.g., a value of $x_1$ may represent a quantity of missing feedback bits for the subcodebook 710-h in the group 720-d). If the base station 105 groups the subcodebooks 710 based on a highest least common multiplier of the respective feedback bit quantities of each subcodebook 710, as described with reference to FIG. 7A, the UE 115 may identify a single set of $x_i$ that satisfies Equation 1.

In some examples, however, the UE 115 may identify multiple solutions for $x_i$. The quantity of solutions for $x_i$ may increase as the least common multiplier between respective quantities of feedback bits per subcodebook 710 in a group 720 decreases. In such cases, the UE 115 may select any solution of $x_i$. That is, the UE 115 may treat the case as an error case, and the UE 115 may refrain from appending dummy bits 725 to the respective subcodebook 710 (e.g., subcodebook $C_i$). Additionally, or alternatively, the UE 115 may select a solution of $x_i$ that maximizes a sum of all values of the set $x_i$. The sum of all values of the set $x_i$ may be calculated according to Equation 2.

$$\Sigma_{i=1}^{M} x_i \quad \text{Equation (2)}$$

In the example of FIG. 7B, the UE 115 may identify a quantity of bits to include in the dummy bits 725-a and 725-b appended to the end of the subcodebooks 710-f and 710-g in the group 720-c. If the subcodebook 710-f corresponds to three bits of feedback information (e.g., $B_1$=3), and the subcodebook 710-g corresponds to five bits of feedback information (e.g., $B_2$=5), and the UE 115 determines that there are Z bits of missing feedback information in the group 720-c, the UE 115 may determine the quantities of missing bits in the subcodebooks 710-f and 710-g based on Equation 1 (e.g., $x_1$*3+$x_2$*5=Z, where $x_1$ corresponds to the missing bits for the subcodebook 710-f and $x_2$ corresponds to the missing bits for the subcodebook 710-g).

If there are three missing bits in the group 720-c (e.g., Z=3), a unique solution to Equation 1 may be $x_1$=1 and $x_2$=0. The UE 115 may thereby append one dummy bit 725-a to the subcodebook 710-f and zero dummy bits 725-b to the subcodebook 710-g. If there are 15 missing bits in the group 720-c (e.g., Z=15), a first solution to Equation 1 may be $x_1$=5 and $x_2$=0. A second solution to Equation 1 may be or $x_1$=0 and $x_2$=3. The UE 115 may, in some examples, select the second solution based on the second solution minimizing Equation 2 (e.g., 0+3<5+0). The UE 115 may append zero dummy bits 725-a to the subcodebook 710-f and three dummy bits 725-b to the subcodebook 710-g accordingly.

By grouping the subcodebooks 710 based on a greatest least common multiplier of respective quantities of feedback information bits for each subcodebook 710 in a group 720, the base station 105 and the UE 115 may improve alignment between subcodebooks 710 within a codebook 705, which may improve communication reliability and reduce latency. The UE 115 may be configured to group the subcodebooks 710 and utilize one or more equations to identify a quantity of dummy bits 725 to append to each subcodebook 710 in a group 720 to ensure the total quantity of bits in each group 720 is accurate.

Figure 8:
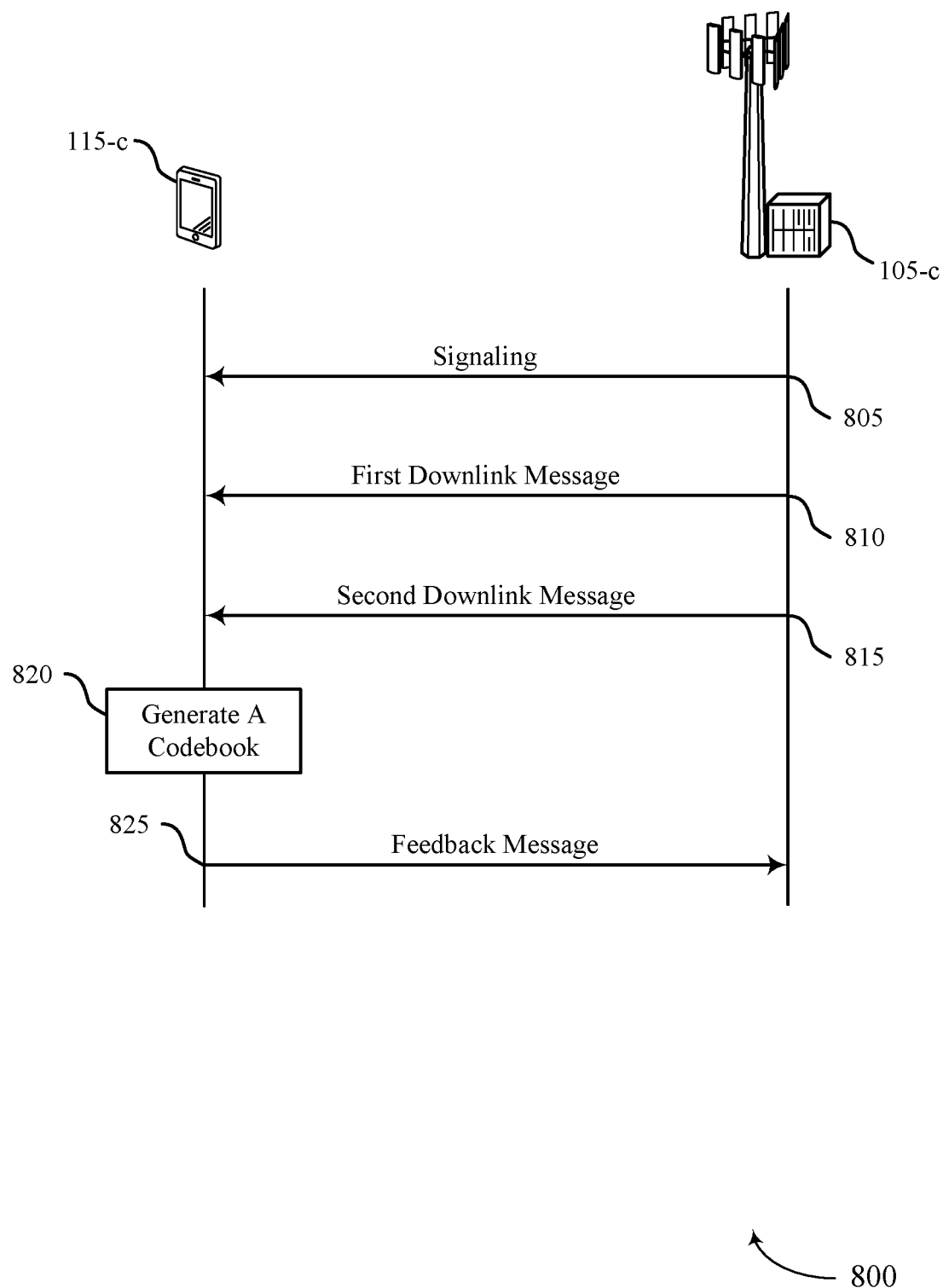
FIG. 8 illustrates an example of a process flow that supports multiplexing multi-bit feedback and single-bit feedback on an uplink shared channel in accordance with aspects of the present disclosure.

FIG. 8 illustrates an example of a process flow 800 that supports multiplexing multi-bit feedback and single-bit feedback on an uplink shared channel in accordance with aspects of the present disclosure. The process flow 800 may implement aspects of the wireless communications systems 100 and 200 or may be implemented by aspects of the wireless communications systems 100 and 200 as described with reference to FIGS. 1 and 2, respectively. For example, the process flow 800 may implement or be implemented by a base station 105-c and a UE 115-c, which may be examples of a base station and a UE as described with reference to FIGS. 1 through 7. In the following description of the process flow 800, the operations between the base station 105-c and the UE 115-c may be performed in different orders or at different times. Some operations may also be left out of the process flow 800, or other operations may be added. Although the base station 105-c and the UE 115-c are shown performing the operations of the process flow 800, some aspects of some operations may also be performed by one or more other wireless devices.

At 805, the base station 105-c may transmit signaling to the UE 115-c. The signaling may indicate a configuration for grouping feedback information (e.g., grouping subcodebooks, grouping subsubcodebooks) within a codebook. In some examples, the codebook may be for reporting feedback pertaining to a set of downlink messages received by the UE 115-c. The signaling may be an example of RRC signaling, a MAC-CE, DCI, or some other signaling. The UE 115-c may, in some examples, transmit a UE capability message to the base station 105-c to indicate a capability of the UE 115-c to support grouping feedback information within a codebook. In such cases, the configuration may be based on the capability of the UE 115-c.

In some examples, the configuration for grouping feedback information may indicate a range of feedback bits associated with a respective group, a quantity of feedback bits associated with a respective group, a function for forming groups of feedback information, or any combination thereof. The UE 115-c may generate the codebook to include one or more subcodebooks, subsubcodebooks, or both, based on the configuration for grouping the feedback information. Example configurations for grouping feedback information are described in further detail with reference to FIGS. 3 through 7.

At 810, the base station 105-c may transmit a first downlink message to the UE 115-c. The first downlink message may be associated with a first quantity of feedback bits. At 815, the base station 105-c may transmit a second downlink message to the UE 115-c. The second downlink message may be associated with a second quantity of feedback bits. The first downlink message and the second downlink message may be associated with a same set of uplink resources for transmitting a feedback message.

In some examples, the base station 105-c may transmit first and second control messages, such as DCI, to schedule the first and second downlink messages. The first and second control messages may additionally schedule respective sets of uplink resources for the UE 115-c to use for transmitting feedback in response to the downlink messages, where the respective sets of uplink resources may be the same, or may be at least partially overlapping in time. The first and second control messages may each include one or more DAIs, such as a counter DAI and a total DAI, as described with reference to FIG. 2. The DAIs may indicate a quantity of bits associated with each downlink message.

At 820, the UE 115-c may generate the codebook based on decoding the first downlink message and the second downlink message. In particular, the first downlink message and the second downlink message may be received as coded data blocks, and the UE 115 c may attempt to decode the first downlink message and the second downlink message, for example, based on an error correction code. In some cases, the UE 115 c may have functionality to correct one or more transmission errors in one or both of the first downlink message and the second downlink message (e.g., using forward error correction or other techniques). In some other cases, however, transmission errors identified by decoding the first downlink message and/or the second downlink message may not be correctable, thus resulting in retransmission of one or more portions of a downlink message. In either case, feedback information may be generated by the UE 115 c to indicate, to the base station 105 c, data that was decoded correctly and/or data that was not decoded correctly. Thus, the UE 115 c may generate a codebook based on whether the first downlink message, the second downlink message, or both were decoded successfully. The codebook may include one or more groups of feedback information in accordance with the configuration. The one or more groups may be based on the first quantity of feedback bits associated with the first downlink message and the second quantity of feedback bits associated with the second downlink message. In some cases, a processor of the UE 115 c may generate the codebook based on decoding the downlink messages.

At 825, the UE 115-c may transmit the feedback message to the base station 105-c. The UE 115-c may transmit the feedback message based on the codebook and via the set of uplink resources. In some examples, the UE 115-c may transmit the codebook to the base station 105-c via the feedback message. The feedback message may include single-bit feedback information, multi-bit feedback information, or both multiplexed together. The feedback message may be in response to TB-based downlink transmissions, CBG-based downlink transmissions, or both. That is, by grouping the feedback information within the codebook based on the configuration, the UE 115-c may support multiple types of feedback with reduced overhead and UE complexity than if the UE 115-c did not group the feedback information. The feedback message may be transmitted, for example, using a transceiver of the UE 115-c. Likewise, the feedback message may be received by the base station 105-c using a transceiver of the base station 105-c.

Figure 9:
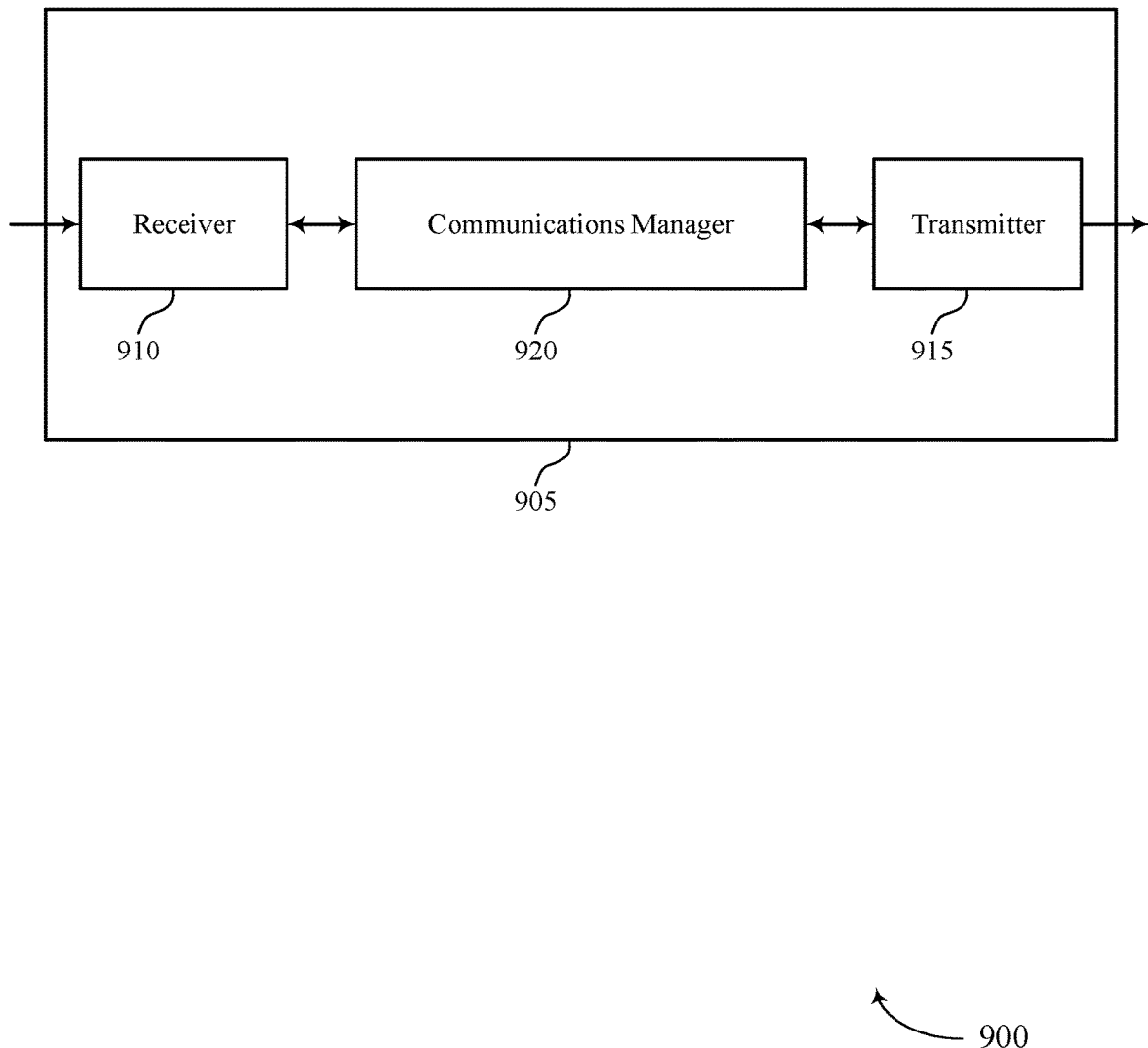
FIGS. 9 and 10 show block diagrams of devices that support multiplexing multi-bit feedback and single-bit feedback on an uplink shared channel in accordance with aspects of the present disclosure.

FIG. 9 shows a block diagram 900 of a device 905 that supports multiplexing multi-bit feedback and single-bit feedback on an uplink shared channel in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiplexing multi-bit feedback and single-bit feedback on an uplink shared channel). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiplexing multi-bit feedback and single-bit feedback on an uplink shared channel). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of multiplexing multi-bit feedback and single-bit feedback on an uplink shared channel as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving signaling that indicates a configuration for grouping feedback information within a codebook, the codebook for reporting feedback pertaining to a set of multiple downlink messages received by the UE. The communications manager 920 may be configured as or otherwise support a means for receiving a first downlink message associated with a first quantity of feedback bits and a second downlink message associated with a second quantity of feedback bits, where the first downlink message and the second downlink message are associated with a same set of uplink resources for transmitting a feedback message. The communications manager 920 may be configured as or otherwise support a means for generating the codebook based on decoding the first downlink message and the second downlink message, the codebook including one or more groups of feedback information in accordance with the configuration, where the one or more groups are based on the first quantity of feedback bits and the second quantity of feedback bits. The communications manager 920 may be configured as or otherwise support a means for transmitting the feedback message based on the codebook via the set of uplink resources.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources. The device 905 may receive signaling indicating a configuration for grouping feedback information within a codebook. The processor of the device 905 may support relatively less subcodebooks or subsubcodebooks within the codebook in accordance with the configuration than if the processor did not receive the configuration for grouping feedback information, which may reduce overhead, processing and power consumption associated with the processing. Additionally, or alternatively, the processor may generate the codebook based on one or more uplink or downlink DAI that may be shared by each group of feedback information, which may provide for efficient utilization of communication resources and reduced processing.

Figure 10:
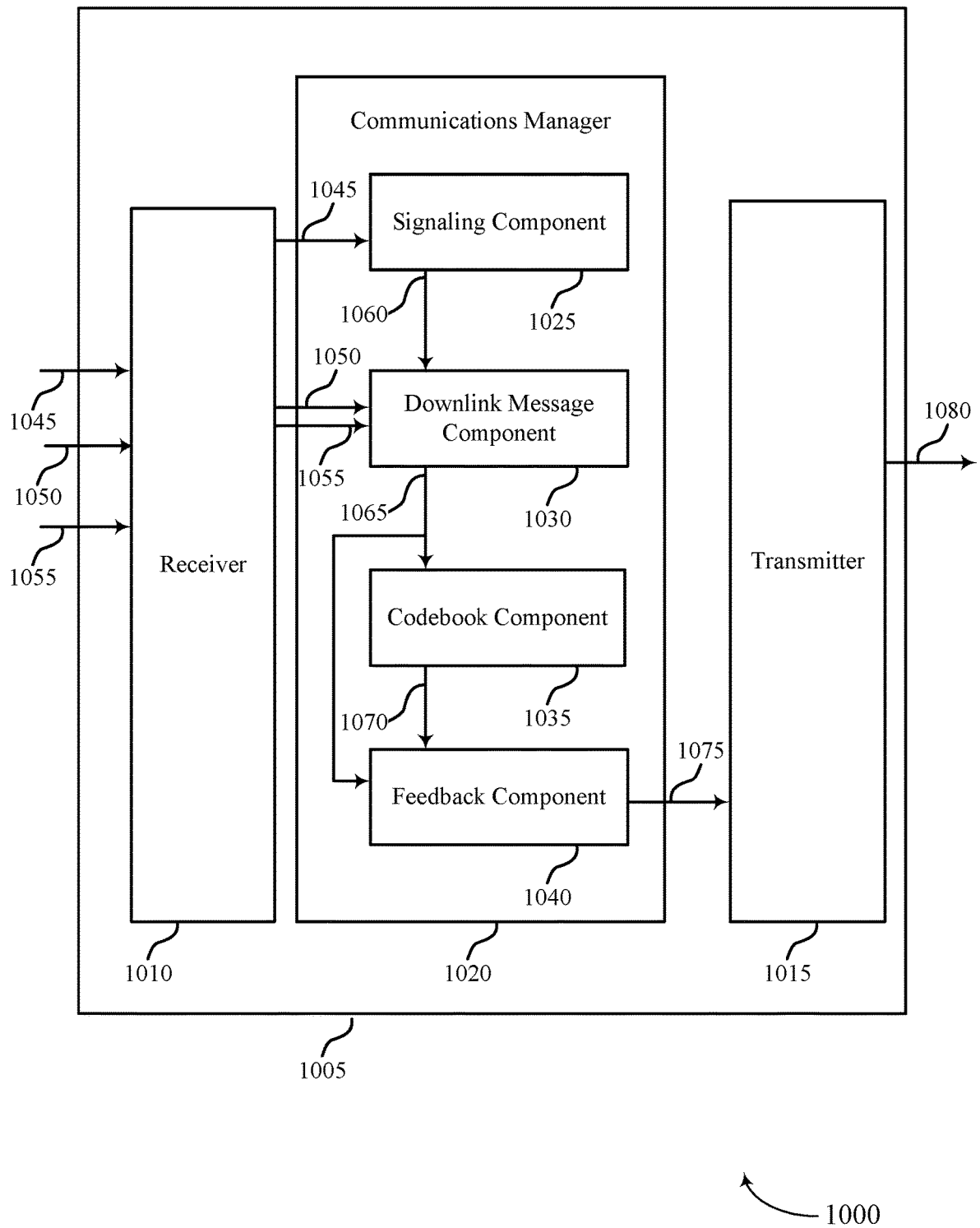

FIG. 10 shows a block diagram 1000 of a device 1005 that supports multiplexing multi-bit feedback and single-bit feedback on an uplink shared channel in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiplexing multi-bit feedback and single-bit feedback on an uplink shared channel). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiplexing multi-bit feedback and single-bit feedback on an uplink shared channel). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of multiplexing multi-bit feedback and single-bit feedback on an uplink shared channel as described herein. For example, the communications manager 1020 may include a signaling component 1025, a downlink message component 1030, a codebook component 1035, a feedback component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may receive, via the receiver 1010, signaling 1045 from a base station 105. The signaling 1045 may indicate a configuration for grouping feedback information within a codebook for reporting feedback pertaining to a set of downlink messages received by the device 1005. The communications manager 1020 may additionally receive, via the receiver 1010, a first downlink message 1050 and a second downlink message 1055 transmitted to the device 1005 from a base station 105. The first downlink message 1050 may be associated with a first quantity of feedback bits and the second downlink message 1055 may be associated with a second quantity of feedback bits. In some examples, the signaling 1045, the first downlink message 1050, and the second downlink message 1055 may be passed on to other components of the device 1005. For example, the receiver 1010 may electrically send the signaling 1045, the first downlink message 1050, and the second downlink message 1055 to the signaling component 1025.

The signaling component 1025 may receive, from the receiver 1010, the signaling 1045. The signaling component 1025 may forward an indication of the configuration 1060 for grouping the feedback information to the downlink message component 1030. The downlink message component 1030 may receive, from the receiver 1010, the first downlink message 1050, the second downlink message 1055, or both. The downlink message component 1030 may decode the first downlink message 1050 and the second downlink message 1055. Based on the decoding, the downlink message component 1030 may identify that the first downlink message 1050 and the second downlink message 1055 are associated with a same set of uplink resources for transmitting a feedback message. The downlink message component 1030 may electrically send the decoded information 1065 of the first downlink message 1050 and the second downlink message 1055 to the codebook component 1035, the feedback component 1040, or both. In some examples, the decoded information 1065 may include an indication of the configuration 1060.

The codebook component 1035 may receive, from the downlink message component 1030, the decoded information 1065. The codebook component 1035 may generate, based on the decoded information 1065, a codebook 1070 including one or more groups of feedback information in accordance with the configuration. The one or more groups may be based on the first quantity of feedback bits and the second quantity of feedback bits. The codebook component 1035 may electrically send the codebook 1070 to the feedback component 1040.

The feedback component 1040 may receive the decoded information 1065 from the downlink message component 1030, the codebook 1070 from the codebook component 1035, or both. The feedback component 1040 may generate a feedback message 1075 based on the decoded information 1065, the codebook 1070, or both. In some examples, the feedback message 1075 may include the codebook 1070. The feedback component 1040 may electrically send the feedback message 1075 to the transmitter 1015. The transmitter 1015 may receive, from the feedback component 1040, the feedback message 1075.

The communications manager 1020, via the transmitter 1015, may transmit the output signals 1080, which may include the feedback message 1075, to a base station 105 based on the codebook 1070 and via the set of uplink resources.

Figure 11:
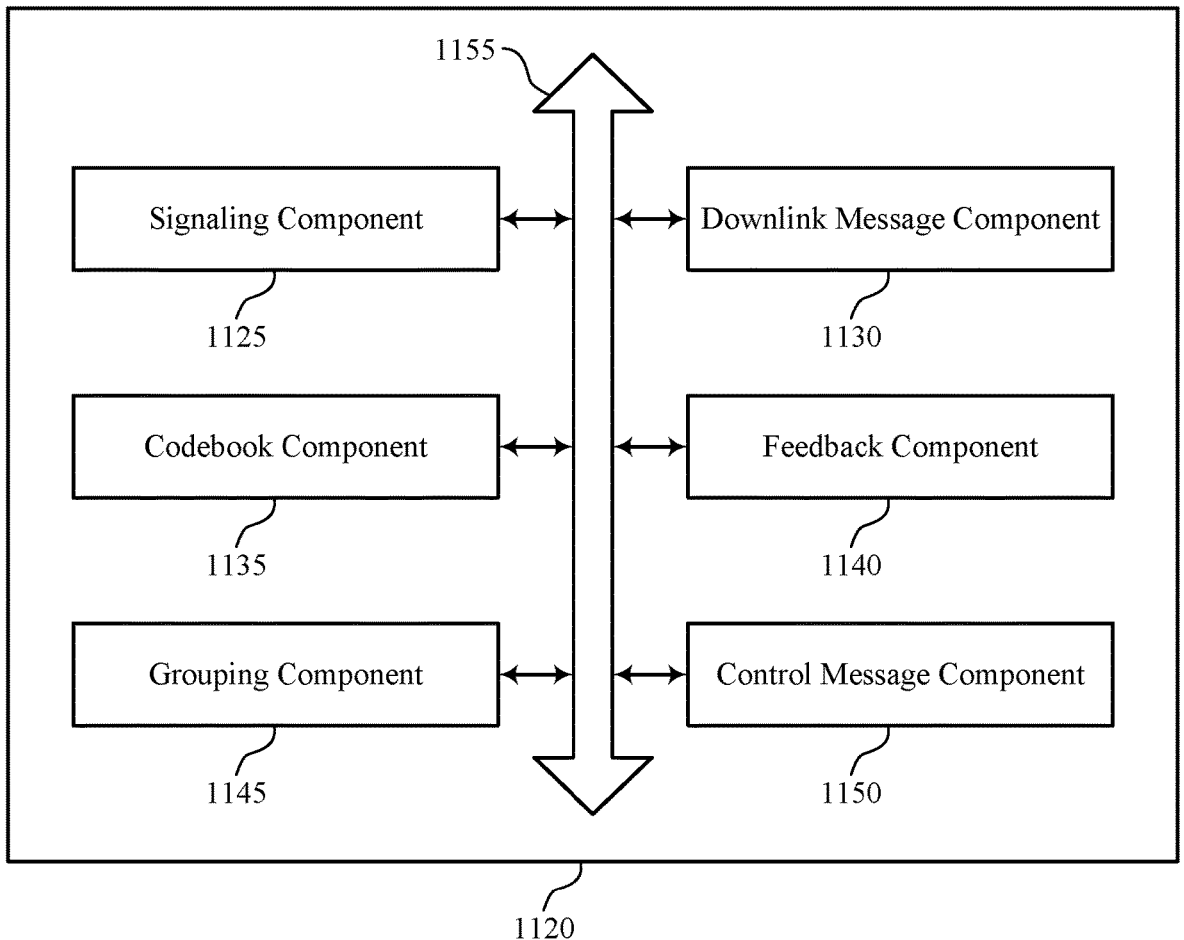
FIG. 11 shows a block diagram of a communications manager that supports multiplexing multi-bit feedback and single-bit feedback on an uplink shared channel in accordance with aspects of the present disclosure.

FIG. 11 shows a block diagram 1100 of a communications manager 1120 that supports multiplexing multi-bit feedback and single-bit feedback on an uplink shared channel in accordance with aspects of the present disclosure. The communications manager 1120 may be an example of aspects of a communications manager 920, a communications manager 1020, or both, as described herein. The communications manager 1120, or various components thereof, may be an example of means for performing various aspects of multiplexing multi-bit feedback and single-bit feedback on an uplink shared channel as described herein. For example, the communications manager 1120 may include a signaling component 1125, a downlink message component 1130, a codebook component 1135, a feedback component 1140, a grouping component 1145, a control message component 1150, or any combination thereof. Each of these components may communicate, directly or indirectly, with one another (e.g., via one or more buses 1155).

The communications manager 1120 may support wireless communication at a UE in accordance with examples as disclosed herein. The signaling component 1125 may be configured as or otherwise support a means for receiving signaling that indicates a configuration for grouping feedback information within a codebook, the codebook for reporting feedback pertaining to a set of multiple downlink messages received by the UE. The signaling component 1125 may send, to the downlink message component 1130, the codebook component 1135, the grouping component 1145, or any combination thereof via the bus 1155, an indication of the configuration. The downlink message component 1130 may be configured as or otherwise support a means for receiving a first downlink message associated with a first quantity of feedback bits and a second downlink message associated with a second quantity of feedback bits, where the first downlink message and the second downlink message are associated with a same set of uplink resources for transmitting a feedback message. The downlink message component 1130 may send, to the codebook component 1135 via the bus 1155, decoded information of the first and second downlink messages. The codebook component 1135 may be configured as or otherwise support a means for generating the codebook based on the decoded information of the first downlink message and the second downlink message, the codebook including one or more groups of feedback information in accordance with the configuration, where the one or more groups are based on the first quantity of feedback bits and the second quantity of feedback bits. The codebook component 1135 may send, to the feedback component 1140 via the bus 1155, the codebook. The feedback component 1140 may be configured as or otherwise support a means for transmitting the feedback message based on the codebook via the set of uplink resources.

In some examples, the grouping component 1145 may be configured as or otherwise support a means for identifying, from the configuration, a range of feedback bits associated with a first group of the one or more groups, the first group including two or more sub subcodebooks. In some examples, the grouping component 1145 may be configured as or otherwise support a means for generating the codebook supporting inclusion of the two or more subsubcodebooks in the first group in accordance with the configuration, where each subsubcodebook of the two or more subsubcodebooks includes a respective quantity of feedback bits that is within the range of feedback bits.

In some examples, to support generating the codebook, the grouping component 1145 may be configured as or otherwise support a means for generating the codebook including at least a first subcodebook and a second subcodebook, where the first subcodebook includes a first group of subsubcodebooks that each include feedback information for one or more downlink messages having the first quantity of feedback bits, and where the second subcodebook includes a second group of subsubcodebooks that each include feedback information for one or more other downlink messages having the second quantity of feedback bits.

In some examples, the first subcodebook, the second subcodebook, or both correspond to multi-bit feedback information, single-bit feedback information, transport block-based feedback information, code block group-based feedback information, or a combination thereof.

In some examples, to support generating the codebook, the grouping component 1145 may be configured as or otherwise support a means for generating the codebook including at least a first subcodebook and a second subcodebook, where the first subcodebook supports inclusion of a first group of feedback information for one or more downlink messages each having respective first quantities of feedback bits within a first range of feedback bits, and where the second subcodebook supports inclusion of a second group of feedback information for one or more other downlink messages each having respective second quantities of feedback bits within a second range of feedback bits.

In some examples, the first quantity of feedback bits is within the first range of feedback bits associated with the first subcodebook. In some examples, the second quantity of feedback bits is within the second range of feedback bits associated with the second subcodebook, the first subcodebook including feedback for the first downlink message and the second subcodebook including feedback for the second downlink message. In some examples, the configuration indicates the first range of feedback bits and the second range of feedback bits.

In some examples, the first subcodebook, the second subcodebook, or both correspond to multi-bit feedback information, single-bit feedback information, TB-based feedback information, CBG-based feedback information, or a combination thereof.

In some examples, the control message component 1150 may be configured as or otherwise support a means for receiving one or more control messages scheduling the first downlink message and the second downlink message, where each control message of the one or more control messages includes a pair of DAIs for each group of the one or more groups of feedback information. In some examples, the control message component 1150 may send, to the downlink message component 1130 via the bus 1155, an indication of the one or more control messages and the respective DAIs.

In some examples, the control message component 1150 may be configured as or otherwise support a means for receiving a control message scheduling the set of uplink resources, the control message including a set of multiple DAIs, where each DAI of the set of multiple DAIs indicates a quantity of bits for respective subsubcodebooks of the codebook. In some examples, the control message component 1150 may send, to the downlink message component 1130 via the bus 1155, an indication of the one or more control messages and the respective DAIs.

In some examples, the control message component 1150 may be configured as or otherwise support a means for receiving a control message scheduling the set of uplink resources, the control message including a DAI that indicates a total quantity of feedback bits for a set of multiple subsubcodebooks of the codebook. In some examples, the control message component 1150 may send, to the codebook component 1135, the feedback component 1140, or both via the bus 1155, an indication of the control message and the DAI. In some examples, the codebook component 1135 may be configured as or otherwise support a means for generating the codebook supporting inclusion of the total quantity of feedback bits in accordance with the DAI, where the total quantity of feedback bits includes at least the first quantity of feedback bits for the first downlink message concatenated with the second quantity of feedback bits for the second downlink message.

In some examples, the feedback component 1140 may be configured as or otherwise support a means for performing an operation based on a value of the DAI, a result of the operation corresponding to the total quantity of feedback bits of the codebook. In some examples, the feedback component 1140 may be configured as or otherwise support a means for appending one or more bits to the codebook based on the value of the DAI and the operation.

In some examples, the control message component 1150 may be configured as or otherwise support a means for receiving a control message scheduling the set of uplink resources, the control message including a first DAI and a second DAI, where the first DAI indicates a third quantity of feedback bits corresponding to a first group of the one or more groups, and where the second DAI indicates a fourth quantity of feedback bits corresponding to a second group of the one or more groups. In some examples, the control message component 1150 may send, to the grouping component 1145 via the bus 1155, an indication of the control message and the DAI. In some examples, the grouping component 1145 may be configured as or otherwise support a means for generating the codebook supporting inclusion of the first group and the second group based on the third quantity of feedback bits and the fourth quantity of feedback bits, where the first group includes at least the first quantity of feedback bits for the first downlink message and the second quantity of feedback bits for the second downlink message.

In some examples, the configuration indicates that the first group includes a first subset of subcodebooks of a set of multiple subcodebooks of the codebook and that the second group includes a second subset of subcodebooks of the set of multiple subcodebooks.

In some examples, the grouping component 1145 may be configured as or otherwise support a means for estimating, based on decoding one or more downlink messages including at least the first downlink message, a first number of missing bits for a first subcodebook of the first group and a second number of missing bits for a second subcodebook of the first group, where the first subcodebook and the second subcodebook are each associated with respective feedback bit quantities. The grouping component 1145 may send, to the feedback component 1140 via the bus 1155, an indication of the first and second numbers of missing bits.

In some examples, to support receiving the signaling, the signaling component 1125 may be configured as or otherwise support a means for receiving the signaling via RRC signaling, or DCI, or a MAC-CE, or any combination thereof.

In some examples, to support generating the codebook, the feedback component 1140 may be configured as or otherwise support a means for generating a first subcodebook including feedback for the first downlink message and a second subcodebook including feedback for the second downlink message. In some examples, to support generating the codebook, the feedback component 1140 may be configured as or otherwise support a means for determining that a first PUCCH resource for the first subcodebook at least partially overlaps with a second PUCCH resource for the second subcodebook. In some examples, to support generating the codebook, the feedback component 1140 may be configured as or otherwise support a means for multiplexing the first subcodebook and the second subcodebook on the set of uplink resources based on the determination, the set of uplink resources associated with a PUCCH.

In some examples, to support generating the codebook, the feedback component 1140 may be configured as or otherwise support a means for generating a first subcodebook including feedback for the first downlink message and a second subcodebook including feedback for the second downlink message. In some examples, to support generating the codebook, the feedback component 1140 may be configured as or otherwise support a means for determining that a first PUCCH resource for the first subcodebook at least partially overlaps with a second PUCCH resource for the second subcodebook. In some examples, to support generating the codebook, the feedback component 1140 may be configured as or otherwise support a means for multiplexing the first subcodebook and the second subcodebook on a third PUCCH resource based on the determination. In some examples, to support generating the codebook, the feedback component 1140 may be configured as or otherwise support a means for transmitting the codebook including the first subcodebook and the second subcodebook via the set of uplink resources based on the multiplexing, the set of uplink resources including PUSCH resources that are at least partially overlapping with the third PUCCH resource.

In some examples, the codebook supports inclusion of single-bit feedback information corresponding to the first downlink message multiplexed with multi-bit feedback information corresponding to the second downlink message. In some examples, the first quantity of feedback bits includes the single-bit feedback information and the second quantity of feedback bits includes the multi-bit feedback information.

Figure 12:
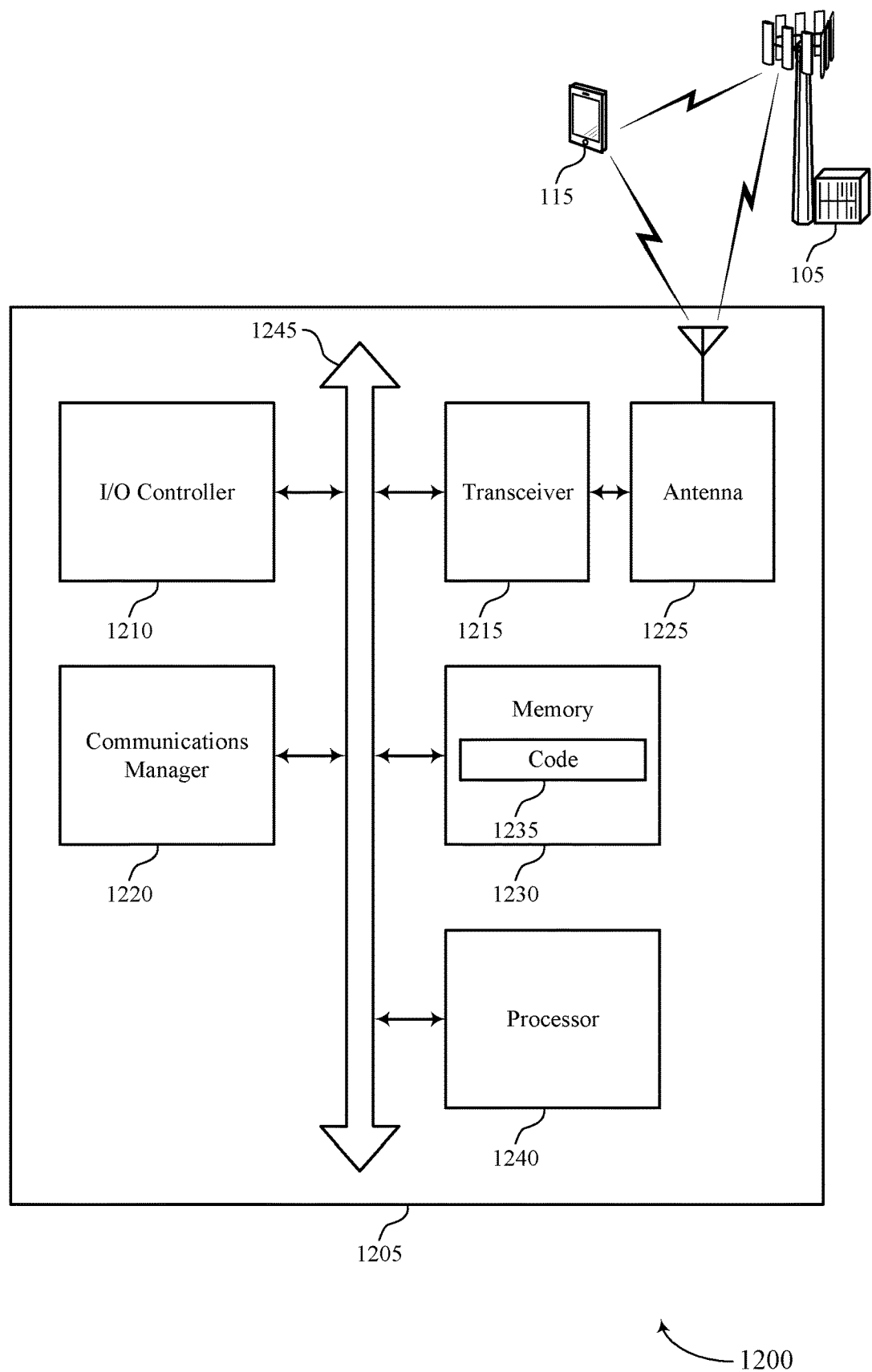
FIG. 12 shows a diagram of a system including a device that supports multiplexing multi-bit feedback and single-bit feedback on an uplink shared channel in accordance with aspects of the present disclosure.

FIG. 12 shows a diagram of a system 1200 including a device 1205 that supports multiplexing multi-bit feedback and single-bit feedback on an uplink shared channel in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiplexing multi-bit feedback and single-bit feedback on an uplink shared channel). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving signaling that indicates a configuration for grouping feedback information within a codebook, the codebook for reporting feedback pertaining to a set of multiple downlink messages received by the UE. The communications manager 1220 may be configured as or otherwise support a means for receiving a first downlink message associated with a first quantity of feedback bits and a second downlink message associated with a second quantity of feedback bits, where the first downlink message and the second downlink message are associated with a same set of uplink resources for transmitting a feedback message. The communications manager 1220 may be configured as or otherwise support a means for generating the codebook based on decoding the first downlink message and the second downlink message, the codebook including one or more groups of feedback information in accordance with the configuration, where the one or more groups are based on the first quantity of feedback bits and the second quantity of feedback bits. The communications manager 1220 may be configured as or otherwise support a means for transmitting the feedback message based on the codebook via the set of uplink resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multiplexing multi-bit feedback and single-bit feedback on an uplink shared channel as described herein, or the processor 1240 and the memory 1230 may be otherwise configured to perform or support such operations.

Figure 13:
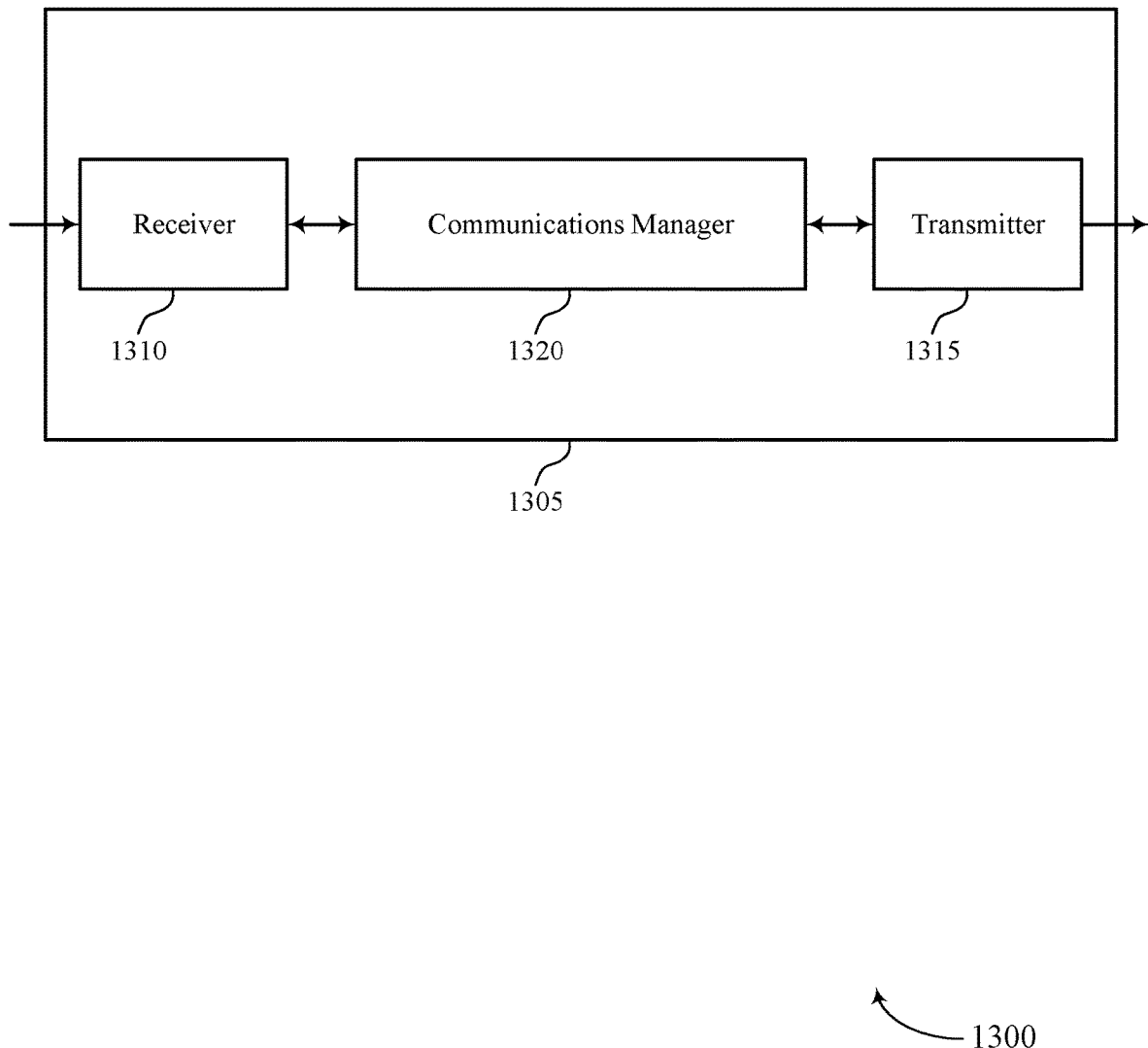
FIGS. 13 and 14 show block diagrams of devices that support multiplexing multi-bit feedback and single-bit feedback on an uplink shared channel in accordance with aspects of the present disclosure.

FIG. 13 shows a block diagram 1300 of a device 1305 that supports multiplexing multi-bit feedback and single-bit feedback on an uplink shared channel in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to multiplexing multi-bit feedback and single-bit feedback on an uplink shared channel). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to multiplexing multi-bit feedback and single-bit feedback on an uplink shared channel). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of multiplexing multi-bit feedback and single-bit feedback on an uplink shared channel as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, to a UE, signaling that indicates a configuration for grouping feedback information within a codebook, the codebook for reporting feedback pertaining to a set of multiple downlink messages. The communications manager 1320 may be configured as or otherwise support a means for transmitting a first downlink message associated with a first quantity of feedback bits and a second downlink message associated with a second quantity of feedback bits, where the first downlink message and the second downlink message are associated with a same set of uplink resources for receiving a feedback message. The communications manager 1320 may be configured as or otherwise support a means for receiving, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

Figure 14:
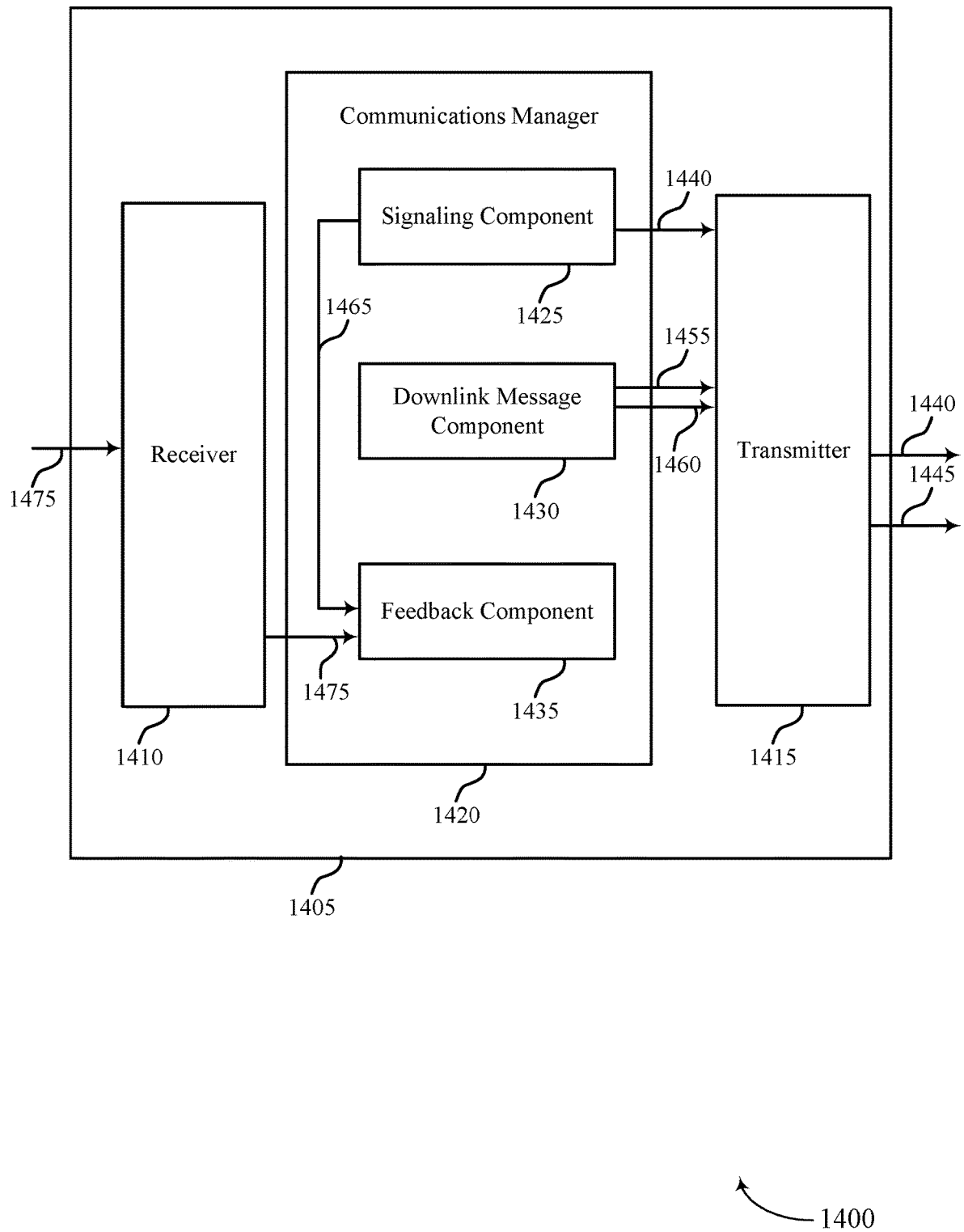

FIG. 14 shows a block diagram 1400 of a device 1405 that supports multiplexing multi-bit feedback and single-bit feedback on an uplink shared channel in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to multiplexing multi-bit feedback and single-bit feedback on an uplink shared channel). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to multiplexing multi-bit feedback and single-bit feedback on an uplink shared channel). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of multiplexing multi-bit feedback and single-bit feedback on an uplink shared channel as described herein. For example, the communications manager 1420 may include a signaling component 1425, a downlink message component 1430, a feedback component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the signaling component 1425 may be configured as or otherwise support a means for generating signaling 1440 that indicates a configuration for grouping feedback information within a codebook, the codebook for reporting feedback pertaining to a set of multiple downlink messages. The signaling component 1425 may electrically send the signaling 1440 to the transmitter 1415. The communications manager 1420 may be configured as or otherwise support a means for transmit, via the transmitter 1415, the signaling to a UE 115.

The downlink message component 1430 may be configured as or otherwise support a means for generating a first downlink message 1455 associated with a first quantity of feedback bits and a second downlink message 1460 associated with a second quantity of feedback bits, where the first downlink message 1455 and the second downlink message 1460 are associated with a same set of uplink resources for receiving a feedback message. The downlink message component 1430 may electrically send the first downlink message 1455 and the second downlink message 1460 to the transmitter 1415. The communications manager 1420 may be configured as or otherwise support a means for transmitting, via the transmitter 1415, output signals 1445 to a UE 115 that include the first downlink message 1455, the second downlink message 1460, or both.

The receiver 1410 may be configured as or otherwise support a means for receiving, from the UE 115, the feedback message 1475 based on the codebook via the set of uplink resources, the codebook supporting inclusion of one or more groups of feedback information in accordance with the configuration, where the one or more groups are based on the first quantity of feedback bits and the second quantity of feedback bits. The receiver 1410 may electrically send the feedback message 1475 to the feedback component 1435. In some examples, the signaling component 1425 may forward an indication 1465 of the configuration for grouping feedback information within a codebook to the feedback component 1435, and the feedback component 1435 may decode the feedback message based on the indication 1465.

Figure 15:
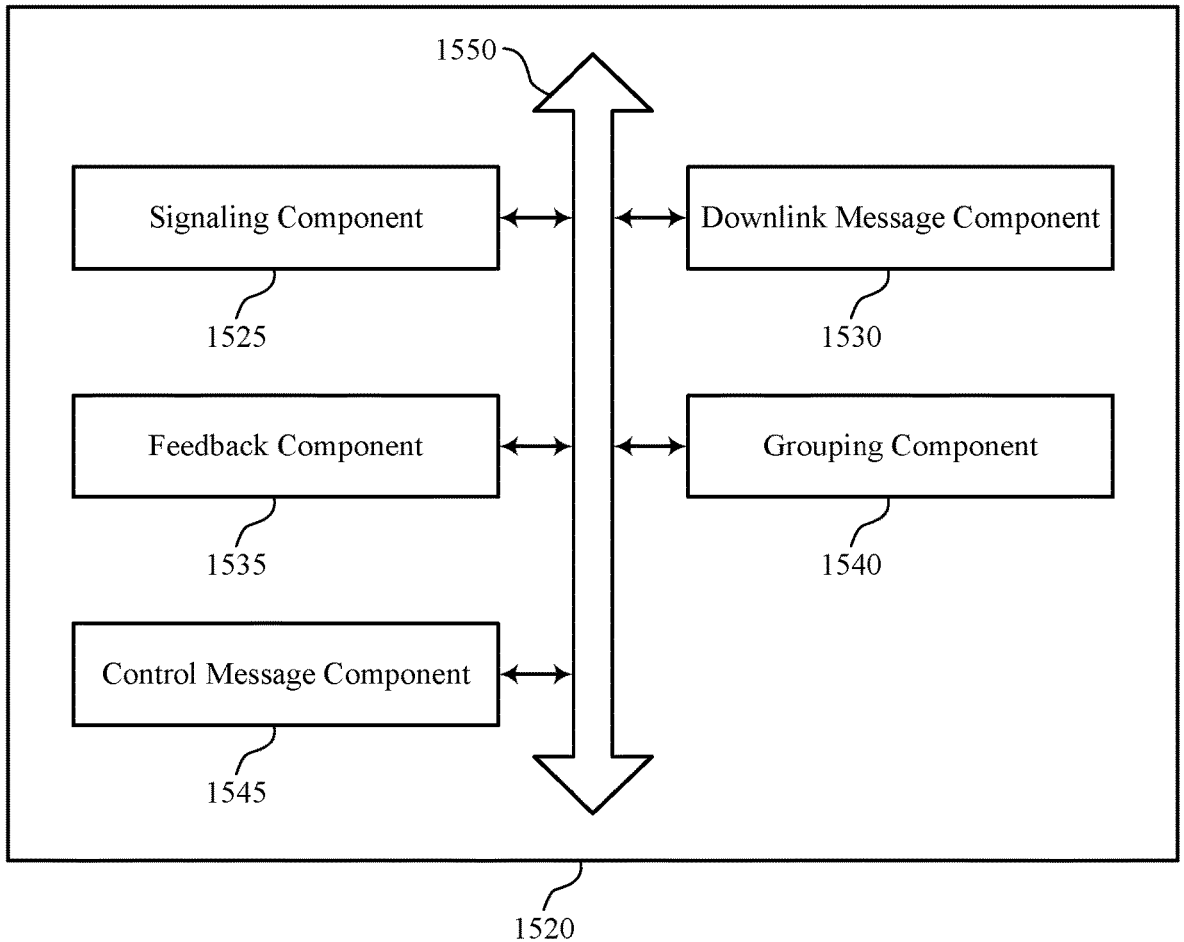
FIG. 15 shows a block diagram of a communications manager that supports multiplexing multi-bit feedback and single-bit feedback on an uplink shared channel in accordance with aspects of the present disclosure.

FIG. 15 shows a block diagram 1500 of a communications manager 1520 that supports multiplexing multi-bit feedback and single-bit feedback on an uplink shared channel in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of multiplexing multi-bit feedback and single-bit feedback on an uplink shared channel as described herein. For example, the communications manager 1520 may include a signaling component 1525, a downlink message component 1530, a feedback component 1535, a grouping component 1540, a control message component 1545, or any combination thereof. Each of these components may communicate, directly or indirectly, with one another (e.g., via one or more buses 1550).

The communications manager 1520 may support wireless communication at a base station in accordance with examples as disclosed herein. The signaling component 1525 may be configured as or otherwise support a means for transmitting, to a UE, signaling that indicates a configuration for grouping feedback information within a codebook, the codebook for reporting feedback pertaining to a set of multiple downlink messages. In some examples, the signaling component 1525 may send an indication of the configuration to one or more other components of the device 1505 via the bus 1550. The downlink message component 1530 may be configured as or otherwise support a means for transmitting a first downlink message associated with a first quantity of feedback bits and a second downlink message associated with a second quantity of feedback bits, where the first downlink message and the second downlink message are associated with a same set of uplink resources for receiving a feedback message. The feedback component 1535 may be configured as or otherwise support a means for receiving, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

In some examples, the grouping component 1540 may be configured as or otherwise support a means for determining a range of feedback bits associated with a first group of the one or more groups, the first group including two or more subsubcodebooks, where the configuration indicates the range of feedback bits associated with the first group, and where the codebook includes the two or more subsubcodebooks in the first group in accordance with the configuration, and each subsubcodebook of the two or more subsubcodebooks includes a respective quantity of feedback bits that is within the range of feedback bits.

In some examples, the codebook includes at least a first subcodebook and a second subcodebook. In some examples, the first subcodebook supporting inclusion of a first group of subsubcodebooks that each include feedback information for one or more downlink messages having the first quantity of feedback bits. In some examples, the second subcodebook supporting inclusion of a second group of subsubcodebooks that each include feedback information for one or more other downlink messages having the second quantity of feedback bits. In some examples, the first subcodebook, the second subcodebook, or both correspond to multi-bit feedback information, single-bit feedback information, transport block-based feedback information, code block group-based feedback information, or a combination thereof.

In some examples, the codebook includes at least a first subcodebook and a second subcodebook. In some examples, the first subcodebook supports inclusion of a first group of feedback information for one or more downlink messages each having respective first quantities of feedback bits within a first range of feedback bits. In some examples, the second subcodebook supports inclusion of a second group of feedback information for one or more other downlink messages each having respective second quantities of feedback bits within a second range of feedback bits.

In some examples, the first quantity of feedback bits is within the first range of feedback bits associated with the first subcodebook. In some examples, the second quantity of feedback bits is within the second range of feedback bits associated with the second subcodebook, the first subcodebook including feedback for the first downlink message and the second subcodebook including feedback for the second downlink message. In some examples, the configuration indicates the first range of feedback bits and the second range of feedback bits.

In some examples, the first subcodebook, the second subcodebook, or both correspond to multi-bit feedback information, single-bit feedback information, transport block-based feedback information, code block group-based feedback information, or a combination thereof.

In some examples, the control message component 1545 may be configured as or otherwise support a means for transmitting one or more control messages scheduling the first downlink message and the second downlink message, where each control message of the one or more control messages includes a pair of DAIs for each group of the one or more groups of feedback information. In some examples, the control message component 1545 may send an indication of the DAIs to the downlink message component 1530 via the bus 1550.

In some examples, the control message component 1545 may be configured as or otherwise support a means for transmitting a control message scheduling the set of uplink resources, the control message including a set of multiple DAIs, where each DAI of the set of multiple DAIs indicates a quantity of bits for respective subsubcodebooks of the codebook. In some examples, the control message component 1545 may send an indication of the DAIs to the downlink message component 1530 via the bus 1550.

In some examples, the control message component 1545 may be configured as or otherwise support a means for transmitting a control message scheduling the set of uplink resources, the control message including a DAI that indicates a total quantity of feedback bits for a set of multiple subsubcodebooks of the codebook, where the codebook includes the total quantity of feedback bits in accordance with the DAI, and where the total quantity of feedback bits includes at least the first quantity of feedback bits for the first downlink message concatenated with the second quantity of feedback bits for the second downlink message. In some examples, the control message component 1545 may send an indication of the DAI to the downlink message component 1530 via the bus 1550.

In some examples, the feedback component 1535 may be configured as or otherwise support a means for performing an operation based on a value of the DAI, a result of the operation corresponding to the total quantity of feedback bits of the codebook. In some examples, the codebook includes one or more bits appended to the codebook based on a value of the DAI and a modular operation.

In some examples, the control message component 1545 may be configured as or otherwise support a means for transmitting a control message scheduling the set of uplink resources, the control message including a first DAI and a second DAI, where the first DAI indicates a third quantity of feedback bits corresponding to a first group of the one or more groups, where the second DAI indicates a fourth quantity of feedback bits corresponding to a second group of the one or more groups, where the codebook includes the first group and the second group based on the third quantity of feedback bits and the fourth quantity of feedback bits, and where the first group includes at least the first quantity of feedback bits for the first downlink message and the second quantity of feedback bits for the second downlink message.

In some examples, the configuration indicates that the first group includes a first subset of subcodebooks of a set of multiple subcodebooks of the codebook and that the second group includes a second subset of subcodebooks of the set of multiple subcodebooks. In some examples, In some examples, the first group, the second group, or both, may be based on a function of a least common multiples of respective feedback bit quantities of subcodebooks in the respective group.

In some examples, to support transmitting the signaling, the signaling component 1525 may be configured as or otherwise support a means for transmitting the signaling via RRC signaling, or DCI, or a MAC-CE, or any combination thereof.

In some examples, the codebook includes a first subcodebook including feedback for the first downlink message and a second subcodebook including feedback for the second downlink message. In some examples, the feedback message is received over a set of resources associated with a PUCCH and includes the first subcodebook multiplexed with the second subcodebook.

In some examples, the codebook includes single-bit feedback information corresponding to the first downlink message multiplexed with multi-bit feedback information corresponding to the second downlink message. In some examples, the first quantity of feedback bits includes the single-bit feedback information and the second quantity of feedback bits includes the multi-bit feedback information.

Figure 16:
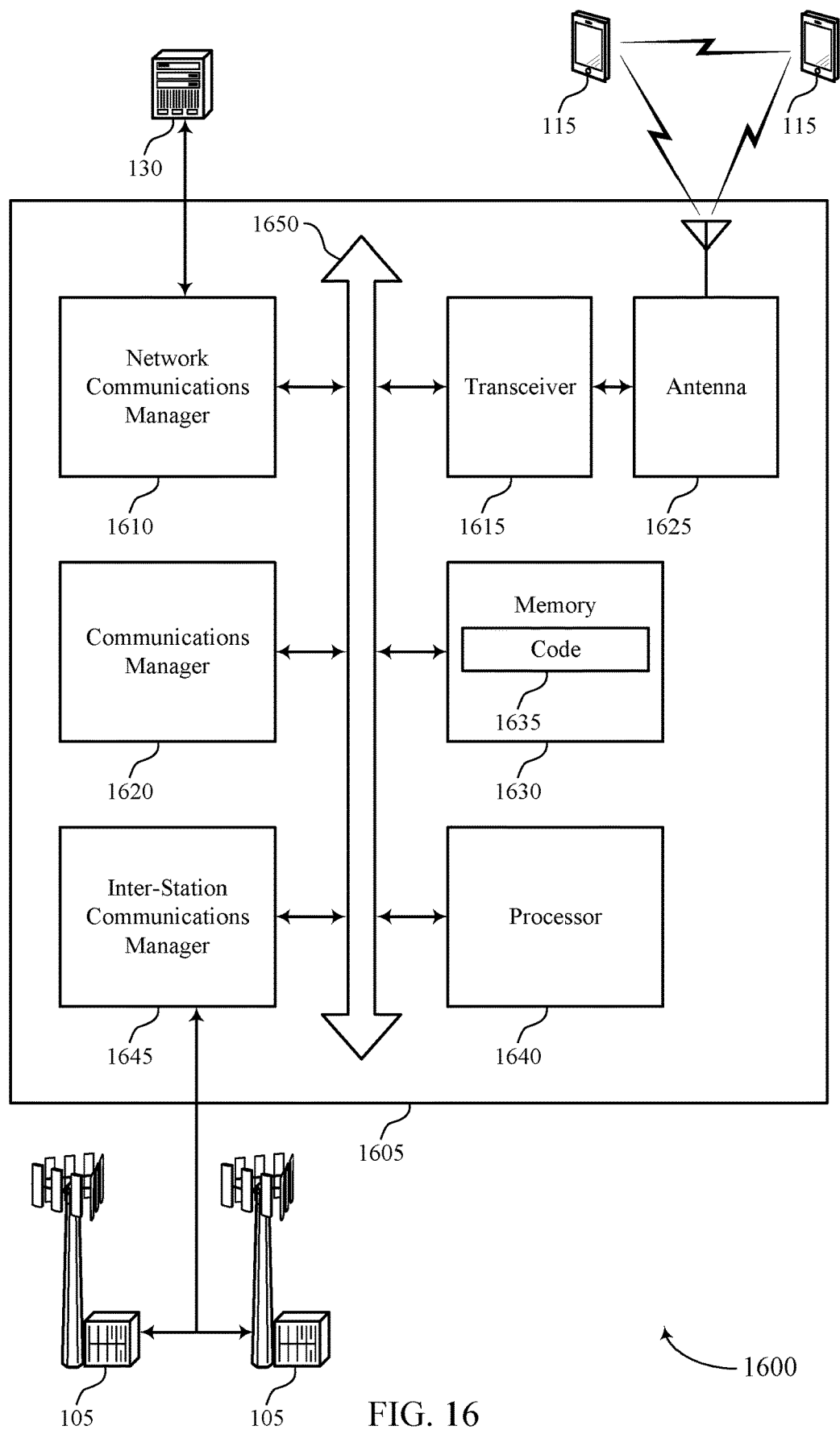
FIG. 16 shows a diagram of a system including a device that supports multiplexing multi-bit feedback and single-bit feedback on an uplink shared channel in accordance with aspects of the present disclosure.

FIG. 16 shows a diagram of a system 1600 including a device 1605 that supports multiplexing multi-bit feedback and single-bit feedback on an uplink shared channel in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting multiplexing multi-bit feedback and single-bit feedback on an uplink shared channel). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, to a UE, signaling that indicates a configuration for grouping feedback information within a codebook, the codebook for reporting feedback pertaining to a set of multiple downlink messages. The communications manager 1620 may be configured as or otherwise support a means for transmitting a first downlink message associated with a first quantity of feedback bits and a second downlink message associated with a second quantity of feedback bits, where the first downlink message and the second downlink message are associated with a same set of uplink resources for receiving a feedback message. The communications manager 1620 may be configured as or otherwise support a means for receiving, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of multiplexing multi-bit feedback and single-bit feedback on an uplink shared channel as described herein, or the processor 1640 and the memory 1630 may be otherwise configured to perform or support such operations.

Figure 17:
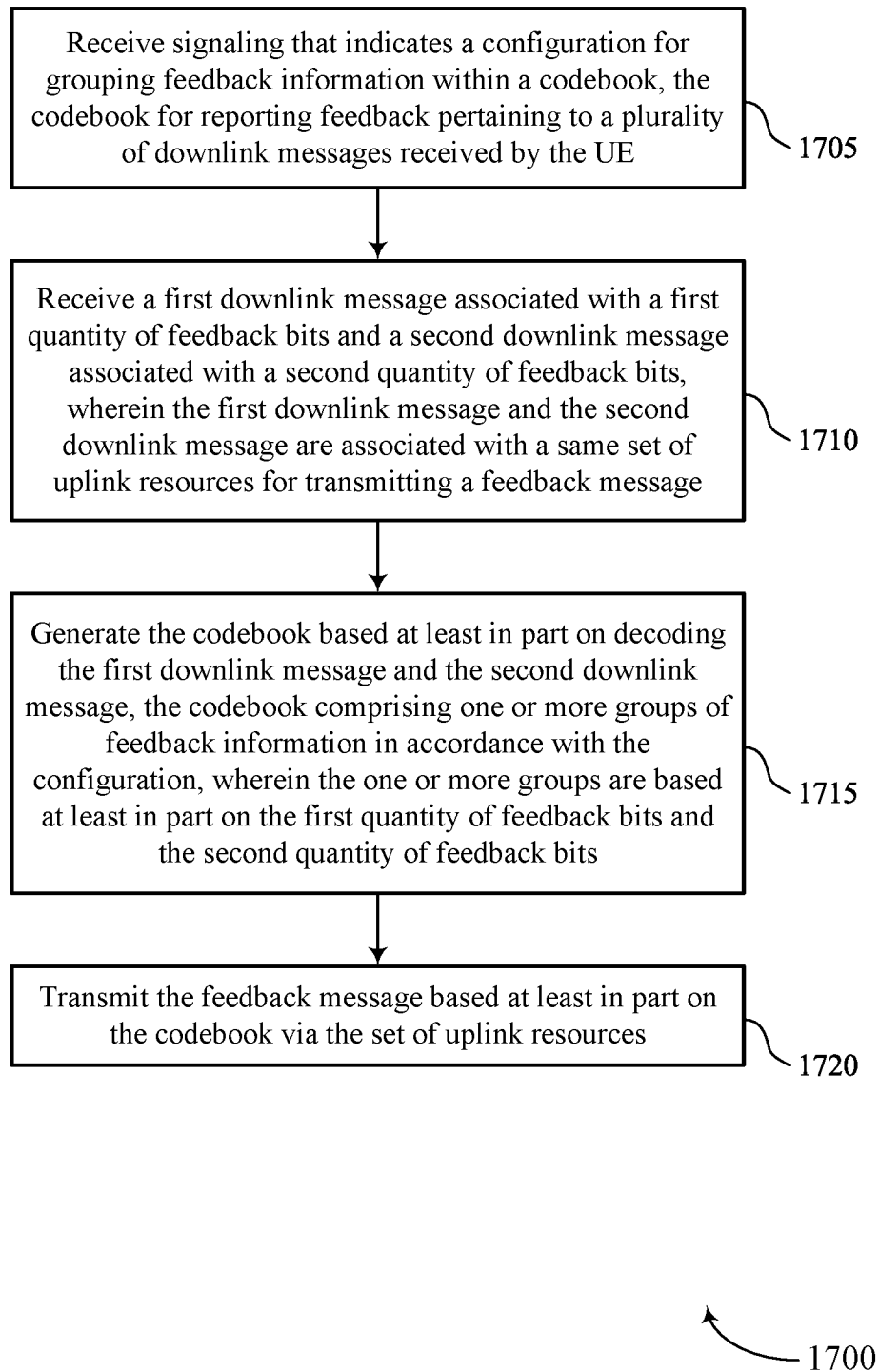
FIGS. 17 through 20 show flowcharts illustrating methods that support multiplexing multi-bit feedback and single-bit feedback on an uplink shared channel in accordance with aspects of the present disclosure.

FIG. 17 shows a flowchart illustrating a method 1700 that supports multiplexing multi-bit feedback and single-bit feedback on an uplink shared channel in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving signaling that indicates a configuration for grouping feedback information within a codebook, the codebook for reporting feedback pertaining to a set of multiple downlink messages received by the UE. The operations of 1705 may be performed in accordance with examples as disclosed herein. In some examples, aspects of the operations of 1705 may be performed by a signaling component 1125 as described with reference to FIG. 11.

At 1710, the method may include receiving a first downlink message associated with a first quantity of feedback bits and a second downlink message associated with a second quantity of feedback bits, where the first downlink message and the second downlink message are associated with a same set of uplink resources for transmitting a feedback message. The operations of 1710 may be performed in accordance with examples as disclosed herein. In some examples, aspects of the operations of 1710 may be performed by a downlink message component 1130 as described with reference to FIG. 11.

At 1715, the method may include generating the codebook based on decoding the first downlink message and the second downlink message, the codebook including one or more groups of feedback information in accordance with the configuration, where the one or more groups are based on the first quantity of feedback bits and the second quantity of feedback bits. The operations of 1715 may be performed in accordance with examples as disclosed herein. In some examples, aspects of the operations of 1715 may be performed by a codebook component 1135 as described with reference to FIG. 11.

At 1720, the method may include transmitting the feedback message based on the codebook via the set of uplink resources. The operations of 1720 may be performed in accordance with examples as disclosed herein. In some examples, aspects of the operations of 1720 may be performed by a feedback component 1140 as described with reference to FIG. 11.

Figure 18:
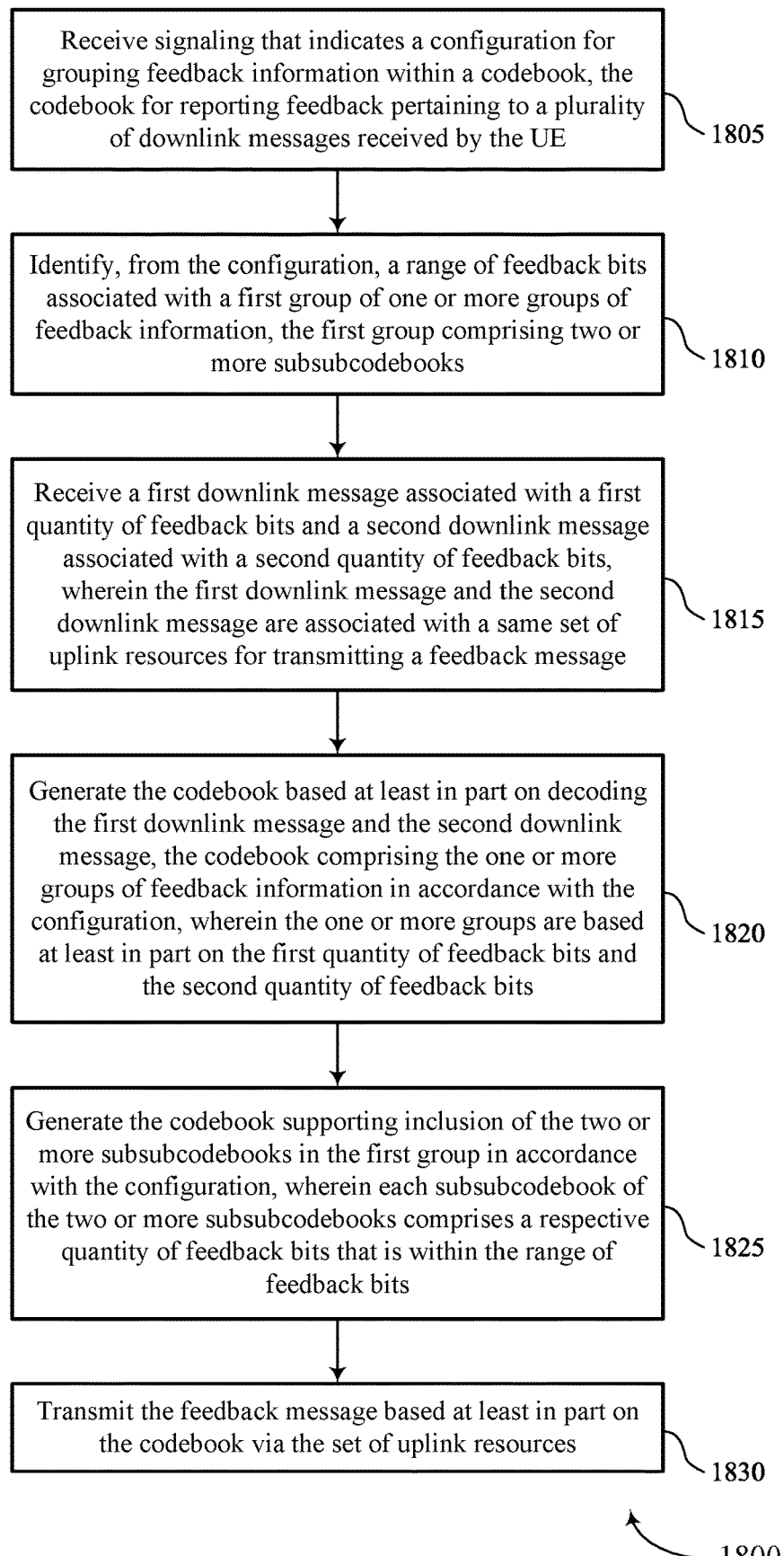

FIG. 18 shows a flowchart illustrating a method 1800 that supports multiplexing multi-bit feedback and single-bit feedback on an uplink shared channel in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving signaling that indicates a configuration for grouping feedback information within a codebook, the codebook for reporting feedback pertaining to a set of multiple downlink messages received by the UE. The operations of 1805 may be performed in accordance with examples as disclosed herein. In some examples, aspects of the operations of 1805 may be performed by a signaling component 1125 as described with reference to FIG. 11.

At 1810, the method may include identifying, from the configuration, a range of feedback bits associated with a first group of one or more groups of feedback information, the first group including two or more subsubcodebooks. The operations of 1810 may be performed in accordance with examples as disclosed herein. In some examples, aspects of the operations of 1810 may be performed by a grouping component 1145 as described with reference to FIG. 11.

At 1815, the method may include receiving a first downlink message associated with a first quantity of feedback bits and a second downlink message associated with a second quantity of feedback bits, where the first downlink message and the second downlink message are associated with a same set of uplink resources for transmitting a feedback message. The operations of 1815 may be performed in accordance with examples as disclosed herein. In some examples, aspects of the operations of 1815 may be performed by a downlink message component 1130 as described with reference to FIG. 11.

At 1820, the method may include generating the codebook based on decoding the first downlink message and the second downlink message, the codebook including the one or more groups of feedback information in accordance with the configuration, where the one or more groups are based on the first quantity of feedback bits and the second quantity of feedback bits. The operations of 1820 may be performed in accordance with examples as disclosed herein. In some examples, aspects of the operations of 1820 may be performed by a codebook component 1135 as described with reference to FIG. 11.

At 1825, the method may include generating the codebook supporting inclusion of the two or more subsubcodebooks in the first group in accordance with the configuration, where each subsubcodebook of the two or more subsubcodebooks includes a respective quantity of feedback bits that is within the range of feedback bits. The operations of 1825 may be performed in accordance with examples as disclosed herein. In some examples, aspects of the operations of 1825 may be performed by a grouping component 1145 as described with reference to FIG. 11.

At 1830, the method may include transmitting the feedback message based on the codebook via the set of uplink resources. The operations of 1830 may be performed in accordance with examples as disclosed herein. In some examples, aspects of the operations of 1830 may be performed by a feedback component 1140 as described with reference to FIG. 11.

Figure 19:
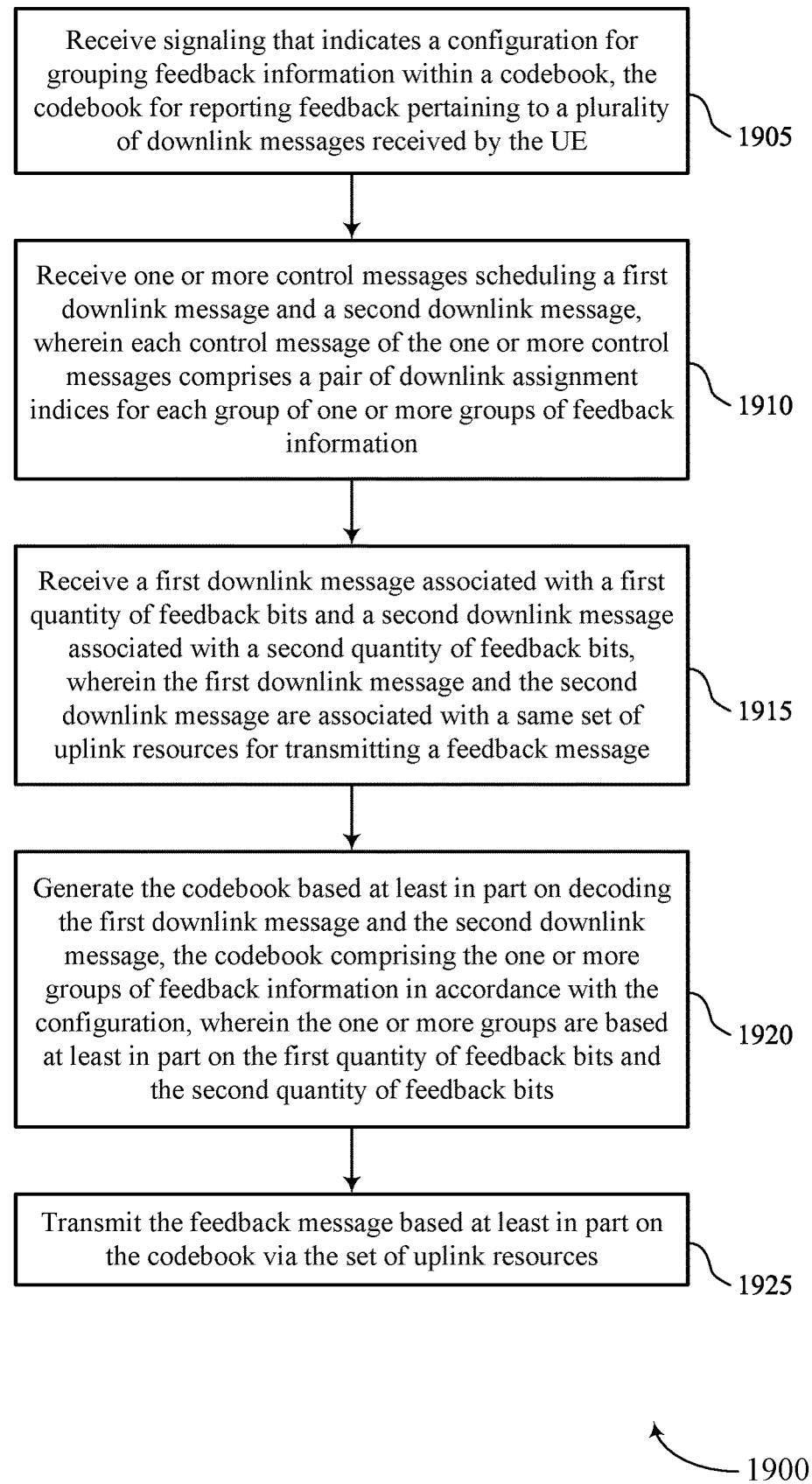

FIG. 19 shows a flowchart illustrating a method 1900 that supports multiplexing multi-bit feedback and single-bit feedback on an uplink shared channel in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving signaling that indicates a configuration for grouping feedback information within a codebook, the codebook for reporting feedback pertaining to a set of multiple downlink messages received by the UE. The operations of 1905 may be performed in accordance with examples as disclosed herein. In some examples, aspects of the operations of 1905 may be performed by a signaling component 1125 as described with reference to FIG. 11.

At 1910, the method may include receiving one or more control messages scheduling the first downlink message and the second downlink message, where each control message of the one or more control messages includes a pair of DAIs for each group of the one or more groups of feedback information. The operations of 1910 may be performed in accordance with examples as disclosed herein. In some examples, aspects of the operations of 1910 may be performed by a control message component 1150 as described with reference to FIG. 11.

At 1915, the method may include receiving a first downlink message associated with a first quantity of feedback bits and a second downlink message associated with a second quantity of feedback bits, where the first downlink message and the second downlink message are associated with a same set of uplink resources for transmitting a feedback message. The operations of 1915 may be performed in accordance with examples as disclosed herein. In some examples, aspects of the operations of 1915 may be performed by a downlink message component 1130 as described with reference to FIG. 11.

At 1920, the method may include generating the codebook based on decoding the first downlink message and the second downlink message, the codebook including one or more groups of feedback information in accordance with the configuration, where the one or more groups are based on the first quantity of feedback bits and the second quantity of feedback bits. The operations of 1920 may be performed in accordance with examples as disclosed herein. In some examples, aspects of the operations of 1920 may be performed by a codebook component 1135 as described with reference to FIG. 11.

At 1925, the method may include transmitting the feedback message based on the codebook via the set of uplink resources. The operations of 1925 may be performed in accordance with examples as disclosed herein. In some examples, aspects of the operations of 1925 may be performed by a feedback component 1140 as described with reference to FIG. 11.

Figure 20:
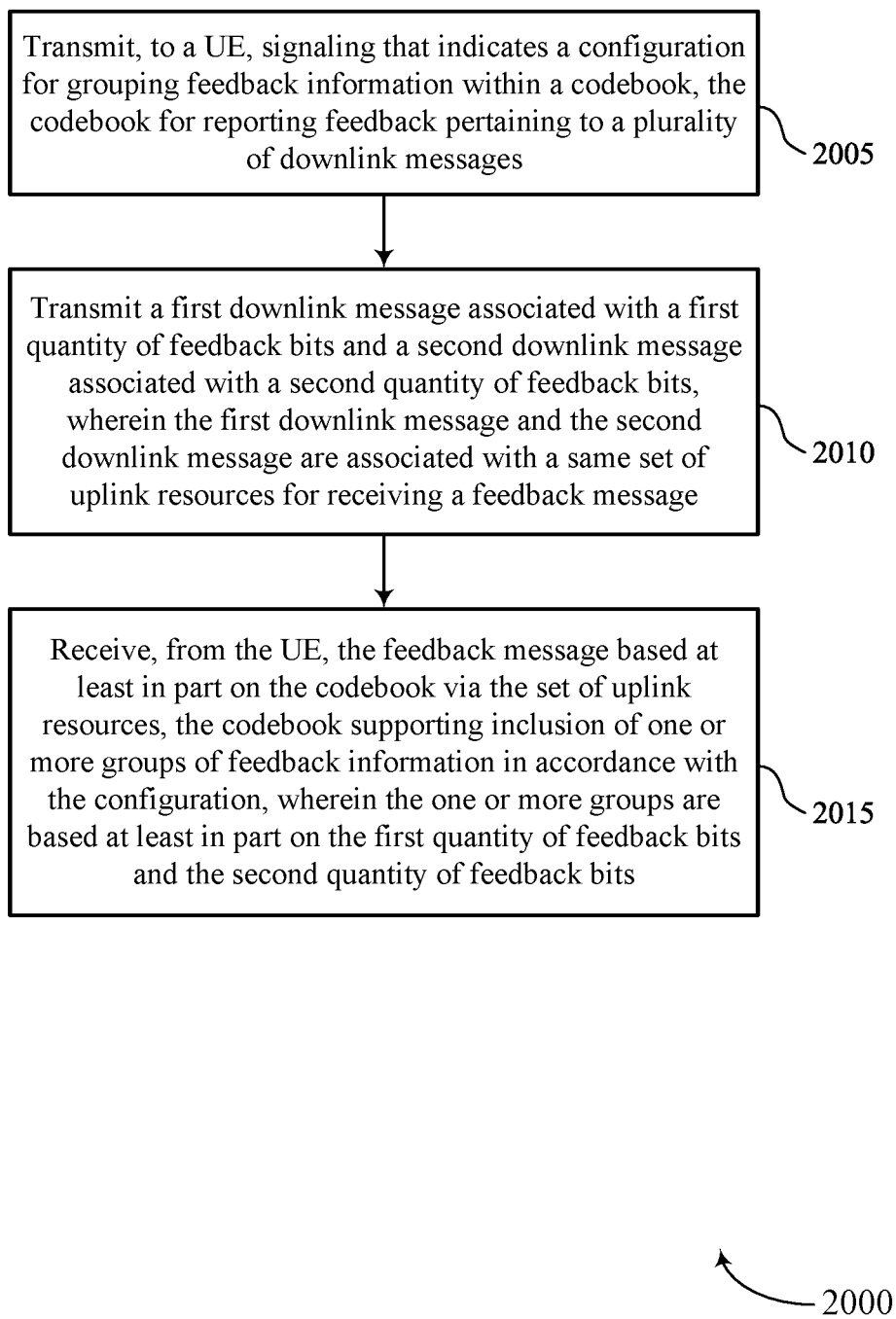

FIG. 20 shows a flowchart illustrating a method 2000 that supports multiplexing multi-bit feedback and single-bit feedback on an uplink shared channel in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2005, the method may include transmitting, to a UE, signaling that indicates a configuration for grouping feedback information within a codebook, the codebook for reporting feedback pertaining to a set of multiple downlink messages. The operations of 2005 may be performed in accordance with examples as disclosed herein. In some examples, aspects of the operations of 2005 may be performed by a signaling component 1525 as described with reference to FIG. 15.

At 2010, the method may include transmitting a first downlink message associated with a first quantity of feedback bits and a second downlink message associated with a second quantity of feedback bits, where the first downlink message and the second downlink message are associated with a same set of uplink resources for receiving a feedback message. The operations of 2010 may be performed in accordance with examples as disclosed herein. In some examples, aspects of the operations of 2010 may be performed by a downlink message component 1530 as described with reference to FIG. 15.

At 2015, the method may include receiving, from the UE, the feedback message based on the codebook via the set of uplink resources, the codebook supporting inclusion of one or more groups of feedback information in accordance with the configuration, where the one or more groups are based on the first quantity of feedback bits and the second quantity of feedback bits. The operations of 2015 may be performed in accordance with examples as disclosed herein. In some examples, aspects of the operations of 2015 may be performed by a feedback component 1535 as described with reference to FIG. 15.

The following provides an overview of aspects of the present disclosure:

Aspect 1: A method for wireless communication at a UE, comprising: receiving signaling that indicates a configuration for grouping feedback information within a codebook, the codebook for reporting feedback pertaining to a plurality of downlink messages received by the UE; receiving a first downlink message associated with a first quantity of feedback bits and a second downlink message associated with a second quantity of feedback bits, wherein the first downlink message and the second downlink message are associated with a same set of uplink resources for transmitting a feedback message; generating the codebook based at least in part on decoding the first downlink message and the second downlink message, the codebook comprising one or more groups of feedback information in accordance with the configuration, wherein the one or more groups are based at least in part on the first quantity of feedback bits and the second quantity of feedback bits; and transmitting the feedback message based at least in part on the codebook via the set of uplink resources.

Aspect 2: The method of aspect 1, further comprising: identifying, from the configuration, a range of feedback bits associated with a first group of the one or more groups, the first group comprising two or more subsubcodebooks, wherein generating the codebook comprises: generating the codebook supporting inclusion of the two or more subsubcodebooks in the first group in accordance with the configuration, wherein each subsubcodebook of the two or more subsubcodebooks comprises a respective quantity of feedback bits that is within the range of feedback bits.

Aspect 3: The method of aspect 1, wherein generating the codebook comprises: generating the codebook including at least a first subcodebook and a second subcodebook, wherein the first subcodebook comprises a first group of subsubcodebooks that each include feedback information for one or more downlink messages having the first quantity of feedback bits, and wherein the second subcodebook comprises a second group of subsubcodebooks that each include feedback information for one or more other downlink messages having the second quantity of feedback bits.

Aspect 4: The method of aspect 3, wherein the first subcodebook, the second subcodebook, or both correspond to multi-bit feedback information, single-bit feedback information, TB-based feedback information, CBG-based feedback information, or a combination thereof.

Aspect 5: The method of aspect 1, wherein generating the codebook comprises: generating the codebook comprising at least a first subcodebook and a second subcodebook, wherein the first subcodebook supports inclusion of a first group of feedback information for one or more downlink messages each having respective first quantities of feedback bits within a first range of feedback bits, and wherein the second subcodebook supports inclusion of a second group of feedback information for one or more other downlink messages each having respective second quantities of feedback bits within a second range of feedback bits.

Aspect 6: The method of aspect 5, wherein the first quantity of feedback bits is within the first range of feedback bits associated with the first subcodebook, and the second quantity of feedback bits is within the second range of feedback bits associated with the second subcodebook, the first subcodebook comprising feedback for the first downlink message and the second subcodebook comprising feedback for the second downlink message.

Aspect 7: The method of any of aspects 5 through 6, wherein the configuration indicates the first range of feedback bits and the second range of feedback bits.

Aspect 8: The method of any of aspects 5 through 7, wherein the first subcodebook, the second subcodebook, or both correspond to multi-bit feedback information, single-bit feedback information, TB-based feedback information, CBG-based feedback information, or a combination thereof.

Aspect 9: The method of any of aspects 1 through 8, further comprising: receiving one or more control messages scheduling the first downlink message and the second downlink message, wherein each control message of the one or more control messages comprises a pair of DAIs for each group of the one or more groups of feedback information.

Aspect 10: The method of any of aspects 1 through 9, further comprising: receiving a control message scheduling the set of uplink resources, the control message including a plurality of DAIs, wherein each DAI of the plurality of DAIs indicates a quantity of bits for respective subsubcodebooks of the codebook.

Aspect 11: The method of any of aspects 1 through 10, further comprising: receiving a control message scheduling the set of uplink resources, the control message including a DAI that indicates a total quantity of feedback bits for a plurality of subsubcodebooks of the codebook, wherein generating the codebook comprises: generating the codebook supporting inclusion of the total quantity of feedback bits in accordance with the DAI, wherein the total quantity of feedback bits comprises at least the first quantity of feedback bits for the first downlink message concatenated with the second quantity of feedback bits for the second downlink message.

Aspect 12: The method of aspect 11, further comprising: performing an operation based at least in part on a value of the DAI, a result of the operation corresponding to the total quantity of feedback bits of the codebook.

Aspect 13: The method of aspect 12, further comprising: appending one or more bits to the codebook based at least in part on the value of the DAI and the operation.

Aspect 14: The method of any of aspects 1 through 10, further comprising: receiving a control message scheduling the set of uplink resources, the control message including a first DAI and a second DAI, wherein the first DAI indicates a third quantity of feedback bits corresponding to a first group of the one or more groups, and wherein the second DAI indicates a fourth quantity of feedback bits corresponding to a second group of the one or more groups, wherein generating the codebook comprises: generating the codebook supporting inclusion of the first group and the second group based at least in part on the third quantity of feedback bits and the fourth quantity of feedback bits, wherein the first group comprises at least the first quantity of feedback bits for the first downlink message and the second quantity of feedback bits for the second downlink message.

Aspect 15: The method of aspect 14, wherein the configuration indicates that the first group comprises a first subset of subcodebooks of a plurality of subcodebooks of the codebook and that the second group comprises a second subset of subcodebooks of the plurality of subcodebooks.

Aspect 16: The method of any of aspects 14 through 15, further comprising: estimating, based at least in part on decoding one or more downlink messages including at least the first downlink message, a first number of missing bits for a first subcodebook of the first group and a second number of missing bits for a second subcodebook of the first group, wherein the first subcodebook and the second subcodebook are each associated with respective feedback bit quantities.

Aspect 17: The method of aspect 16, further comprising: appending one or more bits to the first subcodebook, or the second subcodebook, or both.

Aspect 18: The method of any of aspects 1 through 17, wherein receiving the signaling comprises: receiving the signaling via RRC signaling, or DCI, or a MAC-CE, or any combination thereof.

Aspect 19: The method of any of aspects 1 through 18, wherein generating the codebook comprises: generating a first subcodebook comprising feedback for the first downlink message and a second subcodebook comprising feedback for the second downlink message, the method further comprising: determining that a first PUCCH resource for the first subcodebook at least partially overlaps with a second PUCCH resource for the second subcodebook; and multiplexing the first subcodebook and the second subcodebook on the set of uplink resources based at least in part on the determination, the set of uplink resources associated with a PUCCH.

Aspect 20: The method of any of aspects 1 through 18, wherein generating the codebook comprises: generating a first subcodebook comprising feedback for the first downlink message and a second subcodebook comprising feedback for the second downlink message, the method further comprising: determining that a first PUCCH resource for the first subcodebook at least partially overlaps with a second PUCCH resource for the second subcodebook; multiplexing the first subcodebook and the second subcodebook on a third PUCCH resource based at least in part on the determination; and transmitting the codebook comprising the first subcodebook and the second subcodebook via the set of uplink resources based at least in part on the multiplexing, the set of uplink resources comprising PUSCH resources that are at least partially overlapping with the third PUCCH resource.

Aspect 21: The method of any of aspects 1 through 20, wherein the codebook supports inclusion of single-bit feedback information corresponding to the first downlink message multiplexed with multi-bit feedback information corresponding to the second downlink message, the first quantity of feedback bits comprises the single-bit feedback information and the second quantity of feedback bits comprises the multi-bit feedback information.

Aspect 22: A method for wireless communication at a base station, comprising: transmitting, to a UE, signaling that indicates a configuration for grouping feedback information within a codebook, the codebook for reporting feedback pertaining to a plurality of downlink messages; transmitting a first downlink message associated with a first quantity of feedback bits and a second downlink message associated with a second quantity of feedback bits, wherein the first downlink message and the second downlink message are associated with a same set of uplink resources for receiving a feedback message; and receiving, from the UE, the feedback message based at least in part on the codebook via the set of uplink resources, the codebook supporting inclusion of one or more groups of feedback information in accordance with the configuration, wherein the one or more groups are based at least in part on the first quantity of feedback bits and the second quantity of feedback bits.

Aspect 23: The method of aspect 22, further comprising: determining a range of feedback bits associated with a first group of the one or more groups, the first group comprising two or more subsubcodebooks, wherein the configuration indicates the range of feedback bits associated with the first group, and wherein the codebook includes the two or more subsubcodebooks in the first group in accordance with the configuration, and each subsubcodebook of the two or more subsubcodebooks comprises a respective quantity of feedback bits that is within the range of feedback bits.

Aspect 24: The method of aspect 22, wherein the codebook includes at least a first subcodebook and a second subcodebook, the first subcodebook supporting inclusion of a first group of subsubcodebooks that each include feedback information for one or more downlink messages having the first quantity of feedback bits, and the second subcodebook supporting inclusion of a second group of subsubcodebooks that each include feedback information for one or more other downlink messages having the second quantity of feedback bits.

Aspect 25: The method of aspect 24, wherein the first subcodebook, the second subcodebook, or both correspond to multi-bit feedback information, single-bit feedback information, TB-based feedback information, CBG-based feedback information, or a combination thereof.

Aspect 26: The method of aspect 22, wherein the codebook comprises at least a first subcodebook and a second subcodebook, the first subcodebook supports inclusion of a first group of feedback information for one or more downlink messages each having respective first quantities of feedback bits within a first range of feedback bits, and the second subcodebook supports inclusion of a second group of feedback information for one or more other downlink messages each having respective second quantities of feedback bits within a second range of feedback bits.

Aspect 27: The method of aspect 26, wherein the first quantity of feedback bits is within the first range of feedback bits associated with the first subcodebook, and the second quantity of feedback bits is within the second range of feedback bits associated with the second subcodebook, the first subcodebook comprising feedback for the first downlink message and the second subcodebook comprising feedback for the second downlink message.

Aspect 28: The method of any of aspects 26 through 27, wherein the configuration indicates the first range of feedback bits and the second range of feedback bits.

Aspect 29: The method of any of aspects 26 through 28, wherein the first subcodebook, the second subcodebook, or both correspond to multi-bit feedback information, single-bit feedback information, TB-based feedback information, CBG-based feedback information, or a combination thereof.

Aspect 30: The method of any of aspects 22 through 29, further comprising: transmitting one or more control messages scheduling the first downlink message and the second downlink message, wherein each control message of the one or more control messages comprises a pair of DAIs for each group of the one or more groups of feedback information.

Aspect 31: The method of any of aspects 22 through 30, further comprising: transmitting a control message scheduling the set of uplink resources, the control message including a plurality of DAIs, wherein each DAI of the plurality of DAIs indicates a quantity of bits for respective subsubcodebooks of the codebook.

Aspect 32: The method of any of aspects 22 through 31, further comprising: transmitting a control message scheduling the set of uplink resources, the control message including a DAI that indicates a total quantity of feedback bits for a plurality of subsubcodebooks of the codebook, wherein the codebook includes the total quantity of feedback bits in accordance with the DAI, and wherein the total quantity of feedback bits comprises at least the first quantity of feedback bits for the first downlink message concatenated with the second quantity of feedback bits for the second downlink message.

Aspect 33: The method of aspect 32, further comprising: performing an operation based at least in part on a value of the DAI, a result of the operation corresponding to the total quantity of feedback bits of the codebook.

Aspect 34: The method of any of aspects 32 through 33, wherein the codebook comprises one or more bits appended to the codebook based at least in part on a value of the DAI and a modular operation.

Aspect 35: The method of any of aspects 22 through 31, further comprising: transmitting a control message scheduling the set of uplink resources, the control message including a first DAI and a second DAI, wherein the first DAI indicates a third quantity of feedback bits corresponding to a first group of the one or more groups, wherein the second DAI indicates a fourth quantity of feedback bits corresponding to a second group of the one or more groups, wherein the codebook includes the first group and the second group based at least in part on the third quantity of feedback bits and the fourth quantity of feedback bits, and wherein the first group comprises at least the first quantity of feedback bits for the first downlink message and the second quantity of feedback bits for the second downlink message.

Aspect 36: The method of aspect 35, wherein the configuration indicates that the first group comprises a first subset of subcodebooks of a plurality of subcodebooks of the codebook and that the second group comprises a second subset of subcodebooks of the plurality of subcodebooks.

Aspect 37: The method of any of aspects 35 through 36, wherein the first group, the second group, or both, are based at least in part on a function of a least common multiples of respective feedback bit quantities of subcodebooks in the respective group.

Aspect 38: The method of any of aspects 22 through 37, wherein transmitting the signaling comprises: transmitting the signaling via RRC signaling, or DCI, or a MAC-CE, or any combination thereof.

Aspect 39: The method of any of aspects 22 through 38, wherein the codebook comprises a first subcodebook comprising feedback for the first downlink message and a second subcodebook comprising feedback for the second downlink message, and the feedback message is received over a set of resources associated with a PUCCH and includes the first subcodebook multiplexed with the second subcodebook.

Aspect 40: The method of any of aspects 22 through 39, wherein the codebook comprises single-bit feedback information corresponding to the first downlink message multiplexed with multi-bit feedback information corresponding to the second downlink message, the first quantity of feedback bits comprises the single-bit feedback information and the second quantity of feedback bits comprises the multi-bit feedback information.

Aspect 41: An apparatus for wireless communication at a UE, comprising a processor; memory coupled with the processor; and instructions stored in the memory and executable by the processor to cause the apparatus to perform a method of any of aspects 1 through 21.

Aspect 42: An apparatus for wireless communication at a UE, comprising at least one means for performing a method of any of aspects 1 through 21.

Aspect 43: A non-transitory computer-readable medium storing code for wireless communication at a UE, the code comprising instructions executable by a processor to perform a method of any of aspects 1 through 21.

Aspect 44: An apparatus for wireless communication at a base station, comprising a processor; memory coupled with the processor; and instructions stored in the memory and executable by the processor to cause the apparatus to perform a method of any of aspects 22 through 40.

Aspect 45: An apparatus for wireless communication at a base station, comprising at least one means for performing a method of any of aspects 22 through 40.

Aspect 46: A non-transitory computer-readable medium storing code for wireless communication at a base station, the code comprising instructions executable by a processor to perform a method of any of aspects 22 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
at least one processor; and
memory coupled with the at least one processor, wherein the UE is configured to:
receive signaling that indicates a configuration for grouping feedback information within a codebook, the codebook for reporting feedback pertaining to a plurality of downlink messages received by the UE;
receive a first downlink message associated with a first quantity of feedback bits and a second downlink message associated with a second quantity of feedback bits, wherein the first downlink message and the second downlink message are associated with a same set of uplink resources for transmitting a feedback message;
generate the codebook based at least in part on decoding the first downlink message and the second downlink message, the codebook comprising a plurality of groups of feedback information in accordance with the configuration, wherein an amount of the feedback information that is included in each group of the plurality of groups of feedback information in the codebook is based at least in part on quantities of feedback bits associated with the first downlink message and the second downlink message, the quantities of feedback bits comprising the first quantity of feedback bits and the second quantity of feedback bits, and wherein each group of the plurality of groups comprises respective feedback information associated with at least two types of feedback and with a same quantity of feedback bits of the quantities of feedback bits, wherein the at least two types of feedback comprise a transport block feedback type and a code block group feedback type; and
transmit the feedback message based at least in part on the codebook via the set of uplink resources.

2. The UE of claim 1, wherein the UE is configured to:
identify, from the configuration, a range of feedback bits associated with a first group of the plurality of groups, the first group comprising two or more subsubcodebooks, wherein, to generate the codebook, the UE is configured to:
generate the codebook supporting inclusion of the two or more subsubcodebooks in the first group in accordance with the configuration, wherein each subsubcodebook of the two or more subsubcodebooks comprises a respective quantity of feedback bits that is within the range of feedback bits.

3. The UE of claim 1, wherein the UE is configured to:
generate the codebook including at least a first subcodebook and a second subcodebook, wherein the first subcodebook comprises a first group of subsubcodebooks that each include feedback information for one or more downlink messages having the first quantity of feedback bits, and wherein the second subcodebook comprises a second group of subsubcodebooks that each include feedback information for one or more other downlink messages having the second quantity of feedback bits.

4. The UE of claim 3, wherein the first subcodebook, the second subcodebook, or both correspond to multi-bit feedback information, single-bit feedback information, transport block-based feedback information, code block group-based feedback information, or a combination thereof.

5. The UE of claim 1, wherein, to generate the codebook, the UE is configured to:
generate the codebook comprising at least a first subcodebook and a second subcodebook, wherein the first subcodebook supports inclusion of a first group of feedback information for one or more downlink messages each having respective first quantities of feedback bits within a first range of feedback bits, and wherein the second subcodebook supports inclusion of a second group of feedback information for one or more other downlink messages each having respective second quantities of feedback bits within a second range of feedback bits.

6. The UE of claim 5, wherein the first quantity of feedback bits is within the first range of feedback bits associated with the first subcodebook, and the second quantity of feedback bits is within the second range of feedback bits associated with the second subcodebook, the first subcodebook comprising feedback for the first downlink message and the second subcodebook comprising feedback for the second downlink message.

7. The UE of claim 5, wherein the configuration indicates the first range of feedback bits and the second range of feedback bits.

8. The UE of claim 5, wherein the first subcodebook, the second subcodebook, or both correspond to multi-bit feedback information, single-bit feedback information, transport block-based feedback information, code block group-based feedback information, or a combination thereof.

9. The UE of claim 1, wherein the UE is configured to:
receive one or more control messages scheduling the first downlink message and the second downlink message, wherein each control message of the one or more control messages comprises a pair of downlink assignment indices for each group of the plurality of groups of feedback information.

10. The UE of claim 1, wherein the UE is configured to:
receive a control message scheduling the set of uplink resources, the control message including a plurality of downlink assignment indices, wherein each downlink assignment index of the plurality of downlink assignment indices indicates a quantity of bits for respective subsubcodebooks of the codebook.

11. The UE of claim 1, wherein the UE is configured to:
receive a control message scheduling the set of uplink resources, the control message including a downlink assignment index that indicates a total quantity of feedback bits for a plurality of subsubcodebooks of the codebook, wherein, to generate the codebook, the UE is configured to:
generate the codebook supporting inclusion of the total quantity of feedback bits in accordance with the downlink assignment index, wherein the total quantity of feedback bits comprises at least the first quantity of feedback bits for the first downlink message concatenated with the second quantity of feedback bits for the second downlink message.

12. The UE of claim 11, wherein the UE is configured to: perform an operation based at least in part on a value of the downlink assignment index, a result of the operation corresponding to the total quantity of feedback bits of the codebook.

13. The UE of claim 12, wherein the UE is configured to: append one or more bits to the codebook based at least in part on the value of the downlink assignment index and the operation.

14. The UE of claim 1, wherein the UE is configured to: receive a control message scheduling the set of uplink resources, the control message including a first downlink assignment index and a second downlink assignment index, wherein the first downlink assignment index indicates a third quantity of feedback bits corresponding to a first group of the plurality of groups, and wherein the second downlink assignment index indicates a fourth quantity of feedback bits corresponding to a second group of the plurality of groups, wherein, to generate the codebook, the UE is configured to:
generate the codebook supporting inclusion of the first group and the second group based at least in part on the third quantity of feedback bits and the fourth quantity of feedback bits, wherein the first group comprises at least the first quantity of feedback bits for the first downlink message and the second quantity of feedback bits for the second downlink message.

15. The UE of claim 14, wherein the configuration indicates that the first group comprises a first subset of subcodebooks of a plurality of subcodebooks of the codebook and that the second group comprises a second subset of subcodebooks of the plurality of subcodebooks.

16. The UE of claim 14, wherein the UE is configured to: estimate, based at least in part on decoding one or more downlink messages including at least the first downlink message, a first number of missing bits for a first subcodebook of the first group and a second number of missing bits for a second subcodebook of the first group, wherein the first subcodebook and the second subcodebook are each associated with respective feedback bit quantities.

17. The UE of claim 16, wherein the UE is configured to: append one or more bits to the first subcodebook, or the second subcodebook, or both.

18. The UE of claim 1, wherein the UE is configured to: receive the signaling via radio resource control signaling, or downlink control information, or a medium access control-control element, or any combination thereof.

19. The UE of claim 1, wherein the UE is configured to: generate a first subcodebook comprising feedback for the first downlink message and a second subcodebook comprising feedback for the second downlink message, wherein the UE is configured to:
determine that a first physical uplink control channel resource for the first subcodebook at least partially overlaps with a second physical uplink control channel resource for the second subcodebook; and
multiplex the first subcodebook and the second subcodebook on the set of uplink resources based at least in part on the determination, the set of uplink resources associated with a physical uplink control channel.

20. The UE of claim 1, wherein, to generate the codebook, the UE is configured to:
generate a first subcodebook comprising feedback for the first downlink message and a second subcodebook comprising feedback for the second downlink message, wherein the UE is configured to:
determine that a first physical uplink control channel resource for the first subcodebook at least partially overlaps with a second physical uplink control channel resource for the second subcodebook;
multiplex the first subcodebook and the second subcodebook on a third physical uplink control channel resource based at least in part on the determination; and
transmit the codebook comprising the first subcodebook and the second subcodebook via the set of uplink resources based at least in part on the multiplexing, the set of uplink resources comprising physical uplink shared channel resources that are at least partially overlapping with the third physical uplink control channel resource.

21. The UE of claim 1, wherein the codebook supports inclusion of single-bit feedback information corresponding to the first downlink message multiplexed with multi-bit feedback information corresponding to the second downlink message, the first quantity of feedback bits comprises the single-bit feedback information, and the second quantity of feedback bits comprises the multi-bit feedback information.

22. A network entity for wireless communication, comprising:
at least one processor; and
memory coupled with the at least one processor, wherein the network entity is configured to:
transmit, to a user equipment (UE), signaling that indicates a configuration for grouping feedback information within a codebook, the codebook for reporting feedback pertaining to a plurality of downlink messages;
transmit a first downlink message associated with a first quantity of feedback bits and a second downlink message associated with a second quantity of feedback bits, wherein the first downlink message and the second downlink message are associated with a same set of uplink resources for receiving a feedback message; and
receive, from the UE, the feedback message based at least in part on the codebook via the set of uplink resources, the codebook supporting inclusion of a plurality of groups of feedback information in accordance with the configuration, wherein an amount of the feedback information that is included in each group of the a plurality of groups of feedback information in the codebook is based at least in part on quantities of feedback bits associated with the first downlink message and the second downlink message, the quantities of feedback bits comprising the first quantity of feedback bits and the second quantity of feedback bits, and wherein each group of the a plurality of groups comprises respective feedback information associated with at least two types of feedback and with a same quantity of feedback bits of the quantities of feedback bits, wherein the at least two types of feedback comprise a transport block feedback type and a code block group feedback type.

23. The network entity of claim 22, wherein the network entity is configured to:
determine a range of feedback bits associated with a first group of the plurality of groups, the first group comprising two or more subsubcodebooks, wherein the configuration indicates the range of feedback bits associated with the first group, and wherein the codebook includes the two or more subsubcodebooks in the first group in accordance with the configuration, and each subsubcodebook of the two or more subsubcodebooks comprises a respective quantity of feedback bits that is within the range of feedback bits.

24. The network entity of claim 22, wherein the codebook includes at least a first subcodebook and a second subcodebook, the first subcodebook supporting inclusion of a first group of subsubcodebooks that each include feedback information for one or more downlink messages having the first quantity of feedback bits, and the second subcodebook supporting inclusion of a second group of subsubcodebooks that each include feedback information for one or more other downlink messages having the second quantity of feedback bits.

25. The network entity of claim 24, wherein the first subcodebook, the second subcodebook, or both correspond to multi-bit feedback information, single-bit feedback information, transport block-based feedback information, code block group-based feedback information, or a combination thereof.

26. The network entity of claim 22, wherein the codebook comprises at least a first subcodebook and a second subcodebook, the first subcodebook supports inclusion of a first group of feedback information for one or more downlink messages each having respective first quantities of feedback bits within a first range of feedback bits, and the second subcodebook supports inclusion of a second group of feedback information for one or more other downlink messages each having respective second quantities of feedback bits within a second range of feedback bits.

27. The network entity of claim 26, wherein the first quantity of feedback bits is within the first range of feedback bits associated with the first subcodebook, and the second quantity of feedback bits is within the second range of feedback bits associated with the second subcodebook, the first subcodebook comprising feedback for the first downlink message and the second subcodebook comprising feedback for the second downlink message.

28. The network entity of claim 26, wherein the configuration indicates the first range of feedback bits and the second range of feedback bits.

29. The network entity of claim 26, wherein the first subcodebook, the second subcodebook, or both correspond to multi-bit feedback information, single-bit feedback information, transport block-based feedback information, code block group-based feedback information, or a combination thereof.

30. The network entity of claim 22, wherein the network entity is configured to:
transmit one or more control messages scheduling the first downlink message and the second downlink message, wherein each control message of the one or more control messages comprises a pair of downlink assignment indices for each group of the plurality of groups of feedback information.

31. The network entity of claim 22, wherein the network entity is configured to:
transmit a control message scheduling the set of uplink resources, the control message including a plurality of downlink assignment indices, wherein each downlink assignment index of the plurality of downlink assignment indices indicates a quantity of bits for respective subsubcodebooks of the codebook.

32. The network entity of claim 22, wherein the network entity is configured to:
transmit a control message scheduling the set of uplink resources, the control message including a downlink assignment index that indicates a total quantity of feedback bits for a plurality of subsubcodebooks of the codebook, wherein the codebook includes the total quantity of feedback bits in accordance with the downlink assignment index, and wherein the total quantity of feedback bits comprises at least the first quantity of feedback bits for the first downlink message concatenated with the second quantity of feedback bits for the second downlink message.

33. The network entity of claim 32, wherein the network entity is configured to:
perform an operation based at least in part on a value of the downlink assignment index, a result of the operation corresponding to the total quantity of feedback bits of the codebook.

34. The network entity of claim 32, wherein the codebook comprises one or more bits appended to the codebook based at least in part on a value of the downlink assignment index and a modular operation.

35. The network entity of claim 22, wherein the network entity is configured to:
transmit a control message scheduling the set of uplink resources, the control message including a first downlink assignment index and a second downlink assignment index, wherein the first downlink assignment index indicates a third quantity of feedback bits corresponding to a first group of the plurality of groups, wherein the second downlink assignment index indicates a fourth quantity of feedback bits corresponding to a second group of the plurality of groups, wherein the codebook includes the first group and the second group based at least in part on the third quantity of feedback bits and the fourth quantity of feedback bits, and wherein the first group comprises at least the first quantity of feedback bits for the first downlink message and the second quantity of feedback bits for the second downlink message.

36. The network entity of claim 35, wherein the configuration indicates that the first group comprises a first subset of subcodebooks of a plurality of subcodebooks of the codebook and that the second group comprises a second subset of subcodebooks of the plurality of subcodebooks.

37. The network entity of claim 35, wherein the first group, the second group, or both, are based at least in part on a function of a least common multiples of respective feedback bit quantities of subcodebooks in the respective group.

38. The network entity of claim 22, wherein, to transmit the signaling, the network entity is configured to:
transmit the signaling via radio resource control signaling, or downlink control information, or a medium access control-control element, or any combination thereof.

39. The network entity of claim 22, wherein the codebook comprises a first subcodebook comprising feedback for the first downlink message and a second subcodebook comprising feedback for the second downlink message, and the feedback message is received over a set of resources associated with a physical uplink control channel and includes the first subcodebook multiplexed with the second subcodebook.

40. The network entity of claim 22, wherein the codebook comprises single-bit feedback information corresponding to the first downlink message multiplexed with multi-bit feedback information corresponding to the second downlink message, the first quantity of feedback bits comprises the single-bit feedback information, and the second quantity of feedback bits comprises the multi-bit feedback information.

41. A method for wireless communication at a user equipment (UE), comprising:
receiving signaling that indicates a configuration for grouping feedback information within a codebook, the codebook for reporting feedback pertaining to a plurality of downlink messages received by the UE;
receiving a first downlink message associated with a first quantity of feedback bits and a second downlink message associated with a second quantity of feedback bits, wherein the first downlink message and the second downlink message are associated with a same set of uplink resources for transmitting a feedback message;
generating the codebook based at least in part on decoding the first downlink message and the second downlink message, the codebook comprising a plurality of groups of feedback information in accordance with the configuration, wherein an amount of the feedback information that is included in each group of the plurality of groups of feedback information in the codebook is based at least in part on quantities of feedback bits associated with the first downlink message and the second downlink message, the quantities of feedback bits comprising the first quantity of feedback bits and the second quantity of feedback bits, and wherein each group of the plurality of groups comprises respective feedback information associated with at least two types of feedback and with a same quantity of feedback bits of the quantities of feedback bits, wherein the at least two types of feedback comprise a transport block feedback type and a code block group feedback type; and
transmitting the feedback message based at least in part on the codebook via the set of uplink resources.

42. The method of claim 41, further comprising:
identifying, from the configuration, a range of feedback bits associated with a first group of the plurality of groups, the first group comprising two or more subsubcodebooks, wherein generating the codebook comprises:
generating the codebook supporting inclusion of the two or more subsubcodebooks in the first group in accordance with the configuration, wherein each subsubcodebook of the two or more subsubcodebooks comprises a respective quantity of feedback bits that is within the range of feedback bits.

43. The method of claim 41, wherein generating the codebook comprises:
generating the codebook including at least a first subcodebook and a second subcodebook, wherein the first subcodebook comprises a first group of subsubcodebooks that each include feedback information for one or more downlink messages having the first quantity of feedback bits, and wherein the second subcodebook comprises a second group of subsubcodebooks that each include feedback information for one or more other downlink messages having the second quantity of feedback bits.

44. The method of claim 43, wherein the first subcodebook, the second subcodebook, or both correspond to multi-bit feedback information, single-bit feedback information, transport block-based feedback information, code block group-based feedback information, or a combination thereof.

45. The method of claim 41, wherein generating the codebook comprises:
generating the codebook comprising at least a first subcodebook and a second subcodebook, wherein the first subcodebook supports inclusion of a first group of feedback information for one or more downlink messages each having respective first quantities of feedback bits within a first range of feedback bits, and wherein the second subcodebook supports inclusion of a second group of feedback information for one or more other downlink messages each having respective second quantities of feedback bits within a second range of feedback bits.

46. A method for wireless communication at a network entity, comprising:
transmitting, to a user equipment (UE), signaling that indicates a configuration for grouping feedback information within a codebook, the codebook for reporting feedback pertaining to a plurality of downlink messages;
transmitting a first downlink message associated with a first quantity of feedback bits and a second downlink message associated with a second quantity of feedback bits, wherein the first downlink message and the second downlink message are associated with a same set of uplink resources for receiving a feedback message; and
receiving, from the UE, the feedback message based at least in part on the codebook via the set of uplink resources, the codebook supporting inclusion of a plurality of groups of feedback information in accordance with the configuration, wherein an amount of the feedback information that is included in each group of the plurality of groups of feedback information in the codebook is based at least in part on quantities of feedback bits associated with the first downlink message and the second downlink message, the quantities of feedback bits comprising the first quantity of feedback bits and the second quantity of feedback bits, and wherein each group of the plurality of groups comprises respective feedback information associated with at least two types of feedback and with a same quantity of feedback bits of the quantities of feedback bits, wherein the at least two types of feedback comprise a transport block feedback type and a code block group feedback type.

47. The method of claim 46, further comprising:
determining a range of feedback bits associated with a first group of the plurality of groups, the first group comprising two or more subsubcodebooks, wherein the configuration indicates the range of feedback bits associated with the first group, and wherein the codebook includes the two or more subsubcodebooks in the first group in accordance with the configuration, and each subsubcodebook of the two or more subsubcodebooks comprises a respective quantity of feedback bits that is within the range of feedback bits.

48. The method of claim 46, further comprising:
transmitting one or more control messages scheduling the first downlink message and the second downlink message, wherein each control message of the one or more control messages comprises a pair of downlink assignment indices for each group of the plurality of groups of feedback information.

49. The method of claim 46, further comprising:
transmitting a control message scheduling the set of uplink resources, the control message including a plurality of downlink assignment indices, wherein each downlink assignment index of the plurality of downlink assignment indices indicates a quantity of bits for respective subsubcodebooks of the codebook.

50. The method of claim 46, further comprising:
transmitting a control message scheduling the set of uplink resources, the control message including a downlink assignment index that indicates a total quantity of feedback bits for a plurality of subsubcodebooks of the codebook, wherein the codebook includes the total quantity of feedback bits in accordance with the downlink assignment index, and wherein the total quantity of feedback bits comprises at least the first quantity of feedback bits for the first downlink message concatenated with the second quantity of feedback bits for the second downlink message.

* * * * *